(12) United States Patent
Arruda

(10) Patent No.: US 6,447,278 B1
(45) Date of Patent: Sep. 10, 2002

(54) APPARATUS FOR PROCESSING BLOWN TUBE FILMS

(75) Inventor: William C. Arruda, Hoboken, NJ (US)

(73) Assignee: Polymer Processing, Inc., Hoboken, NJ (US)

(*) Notice: Subject to any disclaimer, the term of this patent is extended or adjusted under 35 U.S.C. 154(b) by 0 days.

(21) Appl. No.: 09/084,573

(22) Filed: May 26, 1998

(51) Int. Cl.[7] .............................................. B29C 53/20
(52) U.S. Cl. ................ 425/12.1; 425/326.1; 425/387.1; 425/392
(58) Field of Search ........................... 425/72.1, 326.1, 425/387.1, 392, 367; 264/566

(56) References Cited

U.S. PATENT DOCUMENTS

| | | |
|---|---|---|
| 2,433,937 A | 1/1948 | Tornberg |
| 2,461,976 A | 2/1949 | Schenk |
| 2,529,897 A | 11/1950 | Bailey et al. |
| 2,720,680 A | 10/1955 | Gerow |
| 2,955,318 A | 10/1960 | Cook et al. |
| 2,976,567 A | 3/1961 | Jones et al. |
| 3,061,875 A | 11/1962 | Gerow |
| 3,141,912 A | 7/1964 | Goldman et al. |
| 3,142,865 A | 8/1964 | Richie et al. |
| 3,144,494 A | 8/1964 | Gerow |
| 3,157,720 A | 11/1964 | Ahlich et al. |
| 3,170,012 A | 2/1965 | Stinchcombe |
| 3,231,642 A | 1/1966 | Goldman et al. |
| 3,231,643 A | 1/1966 | Goldman et al. |
| 3,258,516 A | 6/1966 | Ewing, Jr. |
| 3,284,552 A | 11/1966 | Haley |
| 3,304,352 A | 2/1967 | Gerow |
| 3,305,615 A | 2/1967 | McGregor |
| 3,313,870 A | 4/1967 | Yazawa |
| 3,426,113 A | 2/1969 | Yazawa |
| 3,655,846 A | 4/1972 | Kanoh et al. |
| 3,678,545 A | 7/1972 | Hino et al. |
| 3,737,495 A | 6/1973 | Nagano et al. |
| 3,852,386 A | 12/1974 | Behr |
| 4,117,054 A | * 9/1978 | Salo ........................ 264/40.1 |
| 4,170,624 A | 10/1979 | Dawson |
| 4,201,741 A | 5/1980 | Pannenbecker |
| 4,246,212 A | 1/1981 | Upmeir et al. |
| 4,330,501 A | 5/1982 | Jones et al. |
| 4,434,128 A | 2/1984 | Okada et al. |
| 4,479,766 A | * 10/1984 | Planeta ..................... 425/72 R |
| 4,760,627 A | 8/1988 | Schele |
| 5,437,544 A | * 8/1995 | Achelpohl ................. 425/72.1 |
| 5,756,041 A | * 5/1998 | Arruda ...................... 264/566 |
| 6,045,349 A | * 4/2000 | Ishida et al. ................ 425/335 |

FOREIGN PATENT DOCUMENTS

WO 97/20672 * 6/1997 ................. 425/335

* cited by examiner

Primary Examiner—Tim Heitbrink
Assistant Examiner—Donald Heckenberg
(74) Attorney, Agent, or Firm—Frost Brown Todd LLC

(57) ABSTRACT

Methods and apparatus for the processing of a continuous blown film undergoing collapsing in which a plurality of differential elements of the film follow respective streamline paths which are approximately equal in length to the path of the longest streamline thereby substantially equalizing circumferentially varying shape change induced machine direction stresses and reducing the residence time variations within higher thermal energy regions so as to significantly minimize the commonly rather large magnitudes of variations of gauge, energy to break and machine direction lengths of the solidified material. The method and apparatus provide the potential to structure more uniformly the macromolecular arrangements existing within the material and allow the blown film extrusion of higher modulus materials than have heretofore been possible.

26 Claims, 39 Drawing Sheets

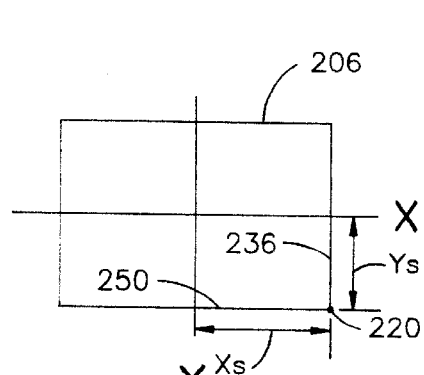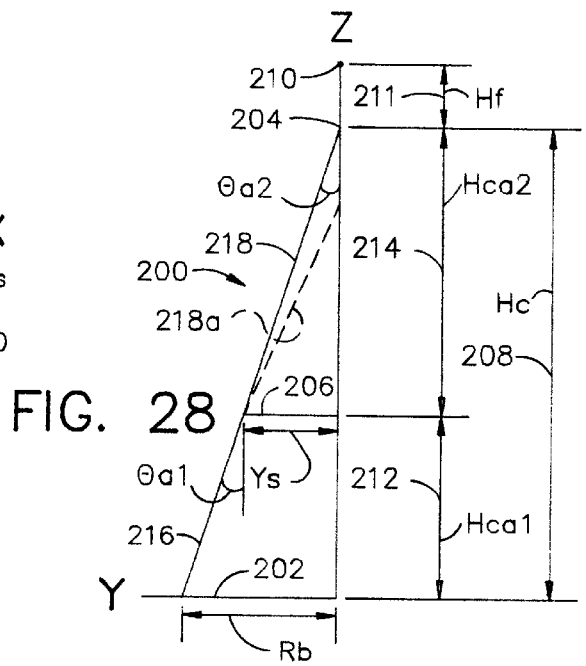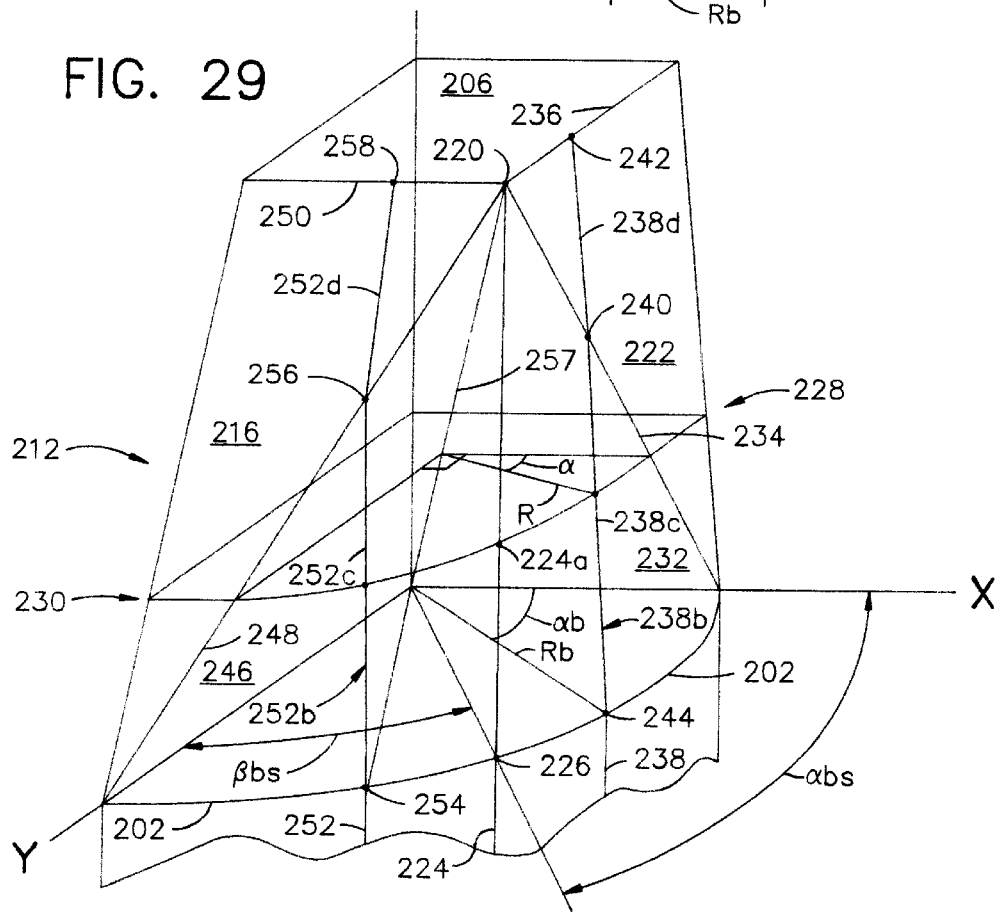

FIG. 52
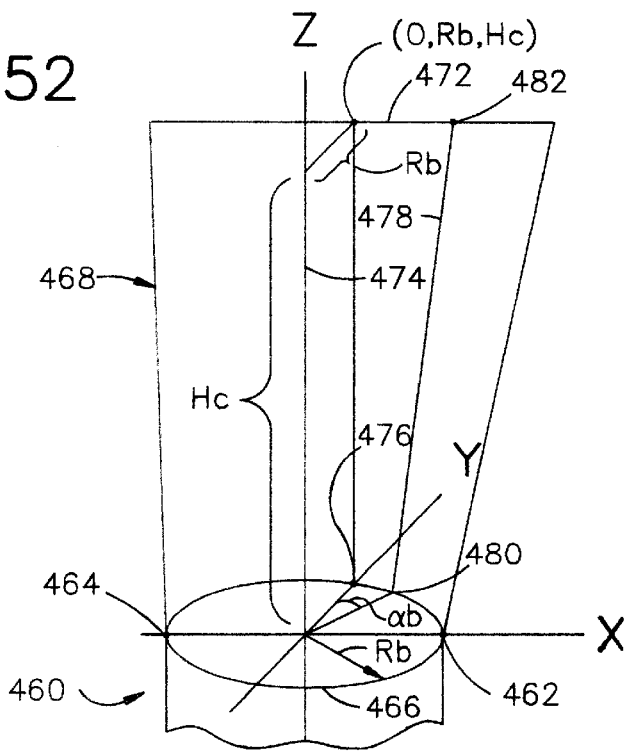
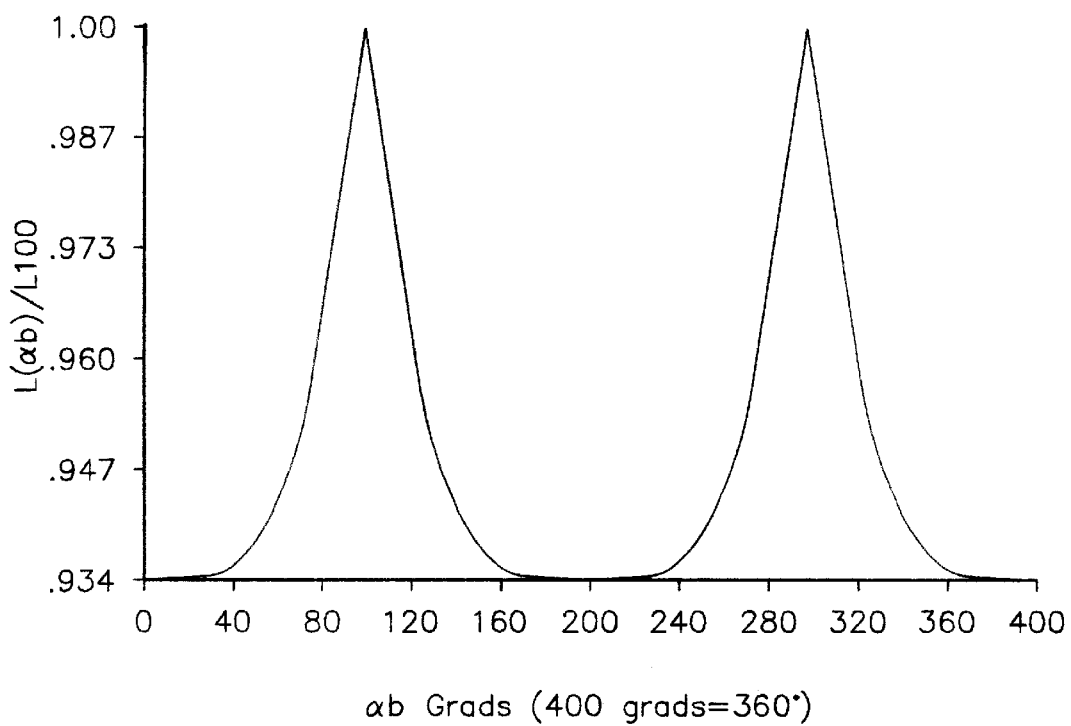
αb Grads (400 grads=360°)
FIG. 53

US 6,447,278 B1

APPARATUS FOR PROCESSING BLOWN TUBE FILMS

TECHNICAL FIELD

This invention relates generally to the processing of blown tube films and is particularly directed to processing of blown tube films in which the film undergoes a change in shape either from a generally circular cross-section to the layflat shape, or from the layflat shape to a generally circular cross-sectional shape. The invention will be specifically disclosed in connection with a method and apparatus which, through the approximation and equalization of circumferentially varying streamline lengths, substantially equalizes circumferentially varying shape change induced machine direction stresses, thereby reducing the residence time variations within higher thermal energy regions of streamline elements within those regions and the concomitant variations of material properties of the product issuing from the tension isolated region including significantly minimizing the commonly rather large magnitudes of variations of gauge, energy to break, and machine direction lengths of the solidified material. Further, through the minimization of the magnitude of variation of the circumferentially varying machine direction stresses and the gradients associated with those stresses, thereby improving the uniformity of the residence time of material elements within any higher thermal energy states of material elements which might occur within any tension isolated region of the process, there is offered, thereby, potential to structure more uniformly the macromolecular arrangements existing within the material issuing from the process plus allowing the blown film extrusion of higher modulus materials than have heretofore been possible.

BACKGROUND OF THE INVENTION

The blown film process is well known. The process generally includes the continuous extrusion of molten polymeric material through an annular die opening, which is the beginning of the blown film process. The molten polymeric material exits the die opening at a diameter approximately equal to the diameter of the die opening. Most commonly, the diameter of the blown film tube then undergoes a significant increase as the material advances due to the circumferential component of pneumatic pressure exerted by air encapsulated within the film against the inside surface of the draw region of the blown film tube. Alternatively, the diameter increase may be effected by drawing the circular film over an internally disposed mandrel. Another alternative is that the interior surface of the tube may be left open to the atmospheric pressure and cooled such that the final diameter of solidified material is less than the diameter of the die.

The melted blown tube film undergoes cooling upon exiting the die opening, which may typically be enhanced by directing a flow of cooling air about the periphery of the tube. As the advancing tube expands in diameter, it reaches an equilibrium state at which the material solidifies sufficiently so as to prevent any further inelastic deformation thereof. The solidification of the blown tube film occurs in a known as the frost band. The region between the terminus of the frost band (i.e. the point at which the blown tube film is completely solidified about its circumference, and no longer deforms inelastically in any direction) and the die exit is known as the draw region, and the region downstream of the frost band terminus may be referred to as the solid material region.

In order to handle the continuously moving blown tube film, it is typically collapsed from its generally circular cross-sectional shape to what is know as the layflat shape in which its cross-sectional shape is essentially a straight line whose width is equal to one half the circumference of the tube. The blown tube film in the layflat configuration may be advanced by or around rollers and processed further immediately, or stored as a roll for further processing at a later time. Several different prior art collapsing geometries are described below for effecting the shape change of the blown tube film from circular to layflat.

One method of processing a previously collapsed blown tube film includes the expansion of the layflat film back to a circular cross-sectional shape for various purposes. For example, the layflat film may be expanded into the circular cross-section, heated so as to allow the diameter of the tube to increase further, cooled and then recollapsed into a wider layflat configuration.

There are several commonly acknowledged problems existent in blown film products or processes. One problem is that blown film has very large gauge, or thickness, variations. Blown film typically has randomly located gauge variations greater than tl5% of the mean gauge of the film. Such gauge variation has a notable undesirable effect on both quality and cost of products made from such blown film, as well as limits those products which can be made from blown film.

Another problem is the wide variation of strength of random samples of the same blown tube film. The strength of blown film is measured by a standard test generally referred to as the dart drop test. To conduct the test, a portion of the blown film is secured within a framework, and a standard dart is dropped onto the film from a specified height to analyze the energy necessary to break the blown film. The energy to break of different portions of blown tube film consistently yields even greater variations in energy to break results than the gauge thickness variations present in the blown film. Such energy to break variations result in constant quality problems in products manufactured from the blown film process.

Another problem is also manifested by blown film in the wound roll condition. It has been observed that wound rolls of blown film consistently exhibit "softness" at the center web of the roll, with a hard "band" located a distance approximately 10% to 15% of the total width of the layflat roll from each edge. The edge regions themselves are softer than these hard band regions, although not as soft as the center region of the wound roll.

Additionally, certain problems occur in dependence upon the material being processed. In particular, high density polyethylene (HDPE) materials, which have a high modulus of elasticity in comparison to other materials such as low density polyethylene (LDPE), are well known for the difficulties which occur in attempting to utilize them in the blown film process. One example of such problems is the occurrence of excess sag in the center region of the layflat web. This sag makes post processing of HDPE blown film very difficult. When more than 4 or 5 slit-seal lanes are run from slit seal towers toward bag machines being operated in line with contemporaneously blown film extrusion when processing HDPE, time related center lane increasing sag coupled with contemporaneously increasing tension in the edge lanes cause increasing levels of operational difficulties as the number of slit-seal lanes are increased. Running of more than four lanes yields unfavorable production costs due to the increasing magnitude of and the operating control problems associated with this center sag, edge tension problem. Web sag, edge curl, and edge sag may also be present to a greater or lesser degree in processed blown film, depending upon the modulus of the material being run.

There is a processing problem which exists in the collapsing of the blown film tubes. The change of geometric shape from a circular cross-section to a layflat configuration, particularly in a continuously moving blown film, causes length variations of streamlines as the shape is changed to the layflat configuration. A streamline, as used in the specification and the claims herein, is the path followed by any differential element of the blown tube film as it is processed, for example, as it advances from the frost band terminus to the initial layflat configuration. The problem exists whenever the shape of the blown film is changed from circular to layflat, or from layflat to circular. In this patent, web shape change from either tubular to layflat shape or from layflat shape to tubular shape will be herein referred to as "collapsing", and the geometric shaping device accomplishing such shape change are herein referred to as the "collapser". Unequal streamline lengths have been identified in the prior art as causing inelastic stretching and bagging of the final film, thereby frequently producing unusable film, or severely limiting the uses which can be made of the film.

As mentioned above, there are several collapsing geometries known in the prior art for changing the generally circular cross-sectional shape of the blown tube film to the layflat configuration. As used herein, and in the claims, "collapsing geometry" includes the structure which directly contacts the blown tube film so as to effect such shape change and the support structure thereof. One of the most frequently used collapsing geometries is known as an A-Frame collapser, which as most commonly adopted, has developed to a design which combines the features of two patents. The nip roll feature of U.S. Pat. No. 2,461,976 to B. H. Schenk, which discloses the use of large diameter nip rolls to both haul film away from the die and to collapse the tube shape to the layflat film shape, has, in current practice, been combined with the A-Frame portion of the collapsing arrangement disclosed in U.S. Pat. No. 2,529,897 to Bailey, et al. The A-Frame collapsing geometry includes two spaced apart converging plane surface planes which are parallel to each other at any height of the A-Frame section, and located adjacent the blown tube film so as to change its shape from circular cross-section to layflat. These two planes define the collapsing geometry boundary for A-Frame collapsing.

The completed layflat configuration may occur at the exit of the A-Frame collapser, where the spaced apart frames are closest to each other, or may occur adjacent nip rolls which are located downstream of the A-Frame collapser so as to advance the blown tube film. An A-Frame may also be used to effect the shape change of a blown tube film from layflat to circular cross-section.

U.S. Pat. No. 2,461,976 to Schenk describes what is referred to herein as nip roll collapsing. In this configuration, the change in shape of blown tube film occurs as the result of its contact with a pair of nip rolls located in the processing line downstream of the frost line. However, as described above in reference to A-Frame collapsing, nip rolls may be used with any other collapsing geometric.

Another method of collapsing the generally circular cross-sectional tube to the layflat configuration is shown in U.S. Pat. Nos. 2,720,680, 3,061,875, 3,144,494, and 3,304,352, all to Gerow. In this type of collapsing, identified herein as spreader collapsing, the shape change of the tube is effected by a spreader located inside of the tube which contacts the inner surface of the tube and "spreads" it to a width approximating the layflat width. The closeness of the web to the completed layflat configuration depends upon the dimensions of the collapsing "arms" of the spreader collapser. The transformation to the layflat configuration is then completed by a pair of nip rollers located downstream of the spreader collapser.

U.S. Pat. No. 3,426,113 to Yazawa discloses a collapsing geometry which is referred to herein as unwrap flattening. In unwrap flattening, the continuously moving tube is slit along a streamline and the "open" tube is unwrapped and laid flat in a configuration which has a total width equal to the total circumference of the tube. The unwrapped film passes over a roller or a pair of nip rollers which are located on the center axis of the tube. An alternative method is to locate the roller or nip rollers offset from the central axis of the tube, which is herein referred to as unwrap offset flattening. A similar collapsing configuration is shown in U.S. Pat. No. 3,313,870 to Yazawa in which the tube is slit at locations spaced apart 180° from each other, and the resulting two pieces of film are laid flat by passing them over rollers or between nip rollers which are not located on the axis of the tube. Such collapsing as identified in U.S. Pat. No. 3,313,870 is referred to herein as two unwrap offset flattening. All of the above-described collapser geometries, i.e., A-Frame collapsing, nip roll collapsing, spreader collapsing, unwrap flattening, unwrap offset flattening, two unwrap offset flattening, have inherent variations between the circumferentially positioned streamline lengths as a result of the shape change.

U.S. Pat. No. 4,170,624 to Dawson discloses a modification of the A-Frame collapsing geometry, referred to herein as "articulated collapsing", which reduces, but does not eliminate, variations in streamline lengths of a tube undergoing flattening. Dawson utilizes the conclusion taught by U.S. Pat. No. 3,258,516 to Ewing, that the streamline lengths of a rectangular cross-sectional shaped tube being changed from one rectangular shape to any other rectangular shape are equal. Dawson discloses the addition of a second, truncated A-Frame collapser, which collapses opposed segments of the circular tube that are located between the two collapsing frames of the first A-Frame collapser. All four frames cooperate to collapse the circular tube into a rectangular shape, more specifically disclosed as a square cross-section. The disclosure in Dawson indicates that the collapsing of a tube from a circular cross-section to a flat cross-section causes uneven stresses to be imposed on or set up in the film in the collapsing region, producing stretching and bagging of the final film. However, articulated collapsing as disclosed by Dawson does nothing to minimize variations between streamline lengths which occur when the cross-sectional shape is changed from circular to square or rectangular "boxed" shapes, the sides of which are straight line segments and are perpendicular to the adjoining sides. Nor does the teaching of Dawson account for the nip rolls located downstream of the articulated collapser exit.

U.S. Pat. Nos. 2,461,976, 2,529,897, 2,720,680, 3,061, 875, 3,144,494, 3,304,352, 3,426,113, 3,313,870 and 4,170, 624 are incorporated herein by reference.

In general, while there has been a recognition that streamline length variations exist in blown tube films undergoing collapsing shape change between generally circular cross-sections to layflat cross-sections, the prior art has not correctly and properly identified the direct results of such length variations, as well as the mechanisms through which problems are thus created.

The prior art has virtually ignored the importance of the fact that within any tension isolated region of the processing of tubular circumferentially contiguous material, manufactured either contemporaneously (in-line) or non-contemporaneously (off-line) with film extrusion in the blown film process, where, within such tension isolated region, when the material is in a generally circular cross-sectional shape and under internal pneumatic pressure, and the material within the tension isolated region also undergoes one or more collapsings, there exist circumferentially varying collapsing streamline path lengths through each and every collapsing which may occur within that tension isolated region. The prior art has not recognized that these varying collapsing streamline lengths of the solidified material passing through the collapser induce into the material within the tension isolated region significantly large circumferentially varying collapsing induced machine direction stresses which are several orders of magnitude larger than any pneumatically induced machine direction stress which may exist as a result of the differential gauge pressure above atmospheric pressure of the air internally encapsulated by the contiguous web surface of that tension isolated region of the process. The length of any collapsing region streamline above the shortest collapsing streamline length which exists in that collapser is, in reality, a machine direction elongation of the solidified material web passing through that collapser. Further, the elongation of any solid streamline divided by the solidified length of that streamline is the elastic strain of that streamline induced by that collapser. The stress magnitude due to the strain of the solidified material of a solid streamline is proportional to the amount of elastic strain experienced by the solidified portion of the streamline material multiplied by the tensile modulus of the solidified material.

These circumferentially varying collapsing induced machine direction tension stresses (1-1 streamline direction collapsing stresses) in the web along each streamline, in turn, combine with the pneumatically induced circumferentially uniform machine direction tension stress (pneumatic pressure streamline direction (1-1 direction) stress) to draw the material away from whatever upstream tension isolating device exists at the start of the tension isolated segment. The upstream tension isolating device may be a nip roll or other similar web normal pressure tension isolating device, or, at the occasion of the start of the blown film process (i.e., at the blown film extruder) the machine direction tension isolating device is the blown film extrusion die efflux exit. Thus, the combined circumferentially varying collapsing induced machine direction stress plus the circumferentially uniform pneumatic pressure induced machine direction stress produce a circumferentially varying streamline direction combined stress pattern which is induced in the web material at any streamline all the way from the upstream tension isolating device at the start of any tension isolated region of any blown film process to the downstream tension isolating device of that tension isolated region.

Thermal energy cooling devices are normally positioned adjacent draw regions at the start of the blown film process, such as internal and/or external air rings and/or cooled mandrels, in order to cool web material temperatures within the draw region to values low enough so as to cause a change in the phase of the material from an elongationally drawable melt state at the start of the draw region to a solidified state at the terminus of the frost band of the draw region. Since there are material temperature gradients in the thickness normal direction (3-3 direction) of the web material as well as in the streamline direction (1-1 direction) of the web material within all of the draw region, then the collapsing induced circumferentially varying residence time of material differential elements within the draw region, and the gradients of those material residence times between adjacent streamline material elements within the draw region, coupled with the presence of solidification and orientation of solidifying structural elements of the material within the frost band region of the draw region of that tension isolated region of the process, all combine to cause deleterious material unit structure arrangements (orientations) within web materials, cause deleterious process effects, and, thereby, cause deleterious material properties effects within the products issuing from the start of the blown film process.

It is to be further noted that these deleterious collapsing effect—material structure interrelationships exist not only at the start of the blown film process, but also exist within any tension isolated region of blown film processing where both collapsing exists and sufficient material internal energy is added to the solid processing material from any external heat source to a degree sufficient as to allow either solid material ordered structure growth or realignment of relative positions of solid material ordered structure units to be influenced by the circumferentially varying machine direction stress pattern induced by collapsing. Both of these material structure changes result in collapsing influenced deleterious material structure orientations. Thus, even when materials are processed within a tension isolated region at temperatures below melt temperature, collapsing induces previously unrecognized detrimental orientations within the structure of the material issuing from that tension isolated region.

Examples of deleterious in-line process effects caused by collapsing induced problems are the processing difficulties normally encountered upon attempts at blown film extrusion of higher modulus polymeric materials, the circumferential direction (2-2 direction) variations of the surface temperatures of materials within draw regions of the process, web sag, wrinkles, edge curls, and in-line processing tension control difficulties associated with control of in-line downstream tension isolated regions when multiple lane slit configurations are obtained from single layflat master webs during in-line processing.

Examples of non-contemporaneous processing difficulties experienced due to collapsing effects in blown film materials are the difficulties encountered by slitting machine operators in controlling tension at individual slit lane winding spools during off-line slitting of blown film extruded webs, and the wrinkling and sag problems normally associated with blown film webs when they are run through off-line flexographic and rotogravure printing presses.

Examples of deleterious product effects in materials issuing from the blown film process are the hard and soft regions of roll stock issuing from the process, gauge variations, material energy to break variations, solidified machine direction length variations, and the low values of transverse direction modulus of blown film materials when compared to the machine direction modulus of the same web extruded from the blown film process. Further, with regard to impact testing, the impact failure direction of blown film extruded material when subjected to dart drop testing is, generally, anisotropic in nature in that regardless of the blow up ratio (blown film radius to die radius ratio) utilized at the start of blown film extrusion, the failure direction of the rupture of the film within blown film product materials when subjected to dart drop tests rather consistently propagate near to or directly in the streamline direction of blown film product materials.

Since the magnitude of the variations with each of these deleterious quality effects are associated with collapsing induced stress, and, since the stress associated with any given elongation amount is proportional to the tensile modulus of the material being processed, then materials of higher modulus than LDPE are to be expected to run with more difficulty through the blown film process, and, further, it is to be expected that the blown film processing of higher modulus materials will produce materials with greater magnitudes of variation of deleterious process and product problems than will blown film extrusion processing of LDPE.

SUMMARY OF THE INVENTION

The present invention includes a method for processing blown film which includes approximating the shape change induced machine direction stresses present at the frost band terminus and reducing them to nearly zero. The present invention also includes a method for approximating the reference streamline path lengths of circumferentially disposed streamlines for various collapsing geometries and for causing the streamlines to follow paths which are approximately equal in length. The invention further includes an apparatus for defining the streamline paths so as to cause them to be approximately equal in length.

Accordingly, it is a primary object of the present invention to provide a method and apparatus for processing blown film in which collapsing induced machine direction stresses at the frost band terminus are approximately equalized and thereby minimized.

It is another object of the present invention to provide a method and apparatus for processing blown film in which streamline lengths are approximately equalized so as to minimize collapsing induced machine direction stresses.

It is yet another object of the present invention to provide a method for processing blown film which includes approximating collapsing induced machine direction stresses which exist at the frost band terminus and causing the differential elements of the solidified film to follow streamline paths which are approximately equal in length so as to reduce the collapsing induced stresses to nearly zero.

Yet another object of the present invention is to provide methods for processing blown film which include approximating the streamline reference path lengths in a variety of collapsing geometries and causing the differential elements of the solidified film to follow streamline paths which are approximately equal to the length of the longest solidified streamline.

It is another object of this invention to provide methods and apparatuses for use with various collapsing geometries to minimize gauge variations and other deleterious quality affects as described herein by causing the differential elements of the solidified film to follow paths which are approximately equal in length.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, there is provided a method for processing a continuous blown film which includes the steps of advancing the film between first and second locations which define a tension isolated region, the film including an orientation region with a terminus, collapsing the film to a layflat line within a collapsing region, the collapsing being effected by a collapsing geometry boundary defined by a collapsing geometry, and causing a plurality of differential elements of the film to follow respective streamline paths between the terminus and the second location which are approximately equal in length to the path of the longest streamline between the terminus and the second location.

In accordance with a further aspect of the present invention, the method includes the step of approximating the lengths of at least a segment of the respective reference paths of a plurality of streamlines within the tension isolated region.

In yet another aspect of the invention, the segments of the respective reference paths lie entirely within the collapsing region.

In a still further aspect of the present invention, the entrance of the collapsing region defines an entrance plane and the streamlines are assumed to enter the collapsing region generally perpendicular to the entrance plane.

According to a still further aspect of the invention, the cross-sectional shape of the film at the entrance of the collapsing region is assumed to be generally circular.

In yet another aspect of the invention, the segment of each respective streamline which extends between its respective contact point with the collapsing geometry boundary and the layflat line is assumed to lie in respective planes which are generally perpendicular to the layflat line.

According to a further aspect of the invention, the length of the lateral cross-sectional perimeter of the film is assumed to be constant within the collapsing region.

In yet another aspect of the invention, the lateral cross-sectional shape of the film within the collapsing region is assumed to be obround.

In accordance with yet another aspect of the invention, the lateral cross-sectional shape of the film within the collapsing region is assumed to be oblate obround.

In yet another aspect of the invention, the lengths of the segments of the reference paths of each streamline between the entrance and the respective streamline contact point with the collapsing geometry boundary is assumed to be equal to the length of a straight line between the intersection of the respective streamline with the entrance and the respective streamline contact point.

In accordance with a further aspect of the present invention, the reference streamline lengths between the terminus and the collapsing region entrance are assumed to be equal.

According to further aspects of the present invention, the collapsing of the film is effected by specifically identified collapsers, with collapser dependent formulas provided for approximating the lengths of various segments of the reference paths of the streamlines.

In accordance to another aspect of the present invention, the lateral cross-sectional shape of the film within the collapsing region is assumed to be elliptical for a spreader collapser.

In a still further aspect of the invention, a method for processing a continuous blown film is provided which includes the steps of advancing the film between first and second locations which define a tension isolated region, the film including an orientation region with a terminus, collapsing the film to at least one unwrap line within a collapsing region located within the tension isolated region, the collapsing being effected through an unwrap flattening process, and causing a plurality of differential elements of the film to follow respective streamline paths between the terminus and the second location which are approximately equal in length to the length of the longest streamline path between the terminus and the second location.

In accordance with another aspect of the present invention, the unwrap line is assumed to be offset from the central axis of the film.

According to a still further aspect of the present invention, a method of processing a continuous blown film is provided which includes steps of advancing the film between first and second locations which define a tension isolated region, the film including an orientation region within the tension isolated region, changing the cross-section shape of the film within a collapsing region located within the tension isolated region, and causing a plurality of differential elements of the film to follow respective paths between the terminus and the second location such that shape change induced machine direction stresses within the film at the terminus of the orientation region are approximately equal.

In yet a further aspect of the present invention, the shape change induced machine direction stresses at the terminus of the orientation region are approximately zero.

According to a still further aspect of the invention, specific formulas are provided for the approximation of stresses and reference stresses existent in the film.

In a still further aspect of the invention, an apparatus for minimizing the shape change induced stresses in a blown tube film includes a collapsing geometry structure for modifying the film shape between generally circular and generally layflat configurations as the film is advanced between first and second locations, the collapsing structure defining a collapsing geometry boundary adapted to contact variable segmental portions of the film, and being operative to cause advancing portions of the film that are in contact with the collapsing geometry boundary to follow predetermined streamline paths, and further including means for causing streamlines in those portions of the film which are not in contact with the collapsing geometry boundary to follow respective paths such that the lengths of the respective paths between the orientation region terminus and the second location are approximately equal.

In yet another aspect of the invention, an apparatus for causing streamlines of a continuously moving blown tube film to follow paths which are approximately equal in length is provided which includes a plurality of spaced apart internal film restricting surfaces and a respective external film restricting surface aligned between adjacent internal film restricting surfaces, the external film restricting surface being operable to cause the film to follow a serpentine path between the internal film restricting surfaces.

In accordance with a further aspect of the present invention, the external film restricting surface is movable between a first position at which it does not engage the film and a second position at which it does engage the film.

According to a still further aspect of the present invention, the internal film restricting surfaces are shaped complementary to the film.

According to yet another aspect of the present invention, the internal film restricting surfaces are disposed within the tube region.

According to another aspect of the present invention, the internal film restricting surfaces are. disposed within the collapsing region.

In accordance to yet another aspect of this invention, the internal film restricting surfaces are shaped complementary to the sail sections of the film.

In still another aspect of the invention, the external restricting surface cooperates with the internal restricting surfaces to cause the streamlines to follow respective serpentine paths whose lengths vary in dependence upon the circumferential position of the respective streamlines.

According to another aspect of the present invention, a device for defining the paths of streamlines of a continuously moving blown film is provided which includes a plurality of spaced apart idler rolls disposed adjacent the film in a layflat region and at least one streamline path defining roll disposed on the opposite side of the film from the idler rolls and aligned with the gap therebetween, the path defining roll being operable to engage the film so as to cause differential elements of the film to follow respective serpentine paths between adjacent idler rolls, the respective lengths of the respective serpentine paths varying in dependence upon the circumferential position of the differential elements.

In still a further aspect of the present invention, the path defining roll is movable between a first position at which it does not engage the film and a second position at which does engage the film.

In accordance with another aspect of the present invention, the path defining roll comprises at least two rolls whose positions relative to each other may be varied.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 27 is a cross-sectional view of the rectangular polygon shape of the blown tube film of FIG. 26 located at the interface between the lower collapsing region and the upper collapsing region.

FIG. 28 is a diagrammatic elevational side view of the blown tube film of FIG. 26.

FIG. 29 is a diagrammatic perspective view of the lower collapsing region of the blown tube film of FIG. 26.

FIG. 52 is a diagrammatic perspective view of a portion of a blown tube film undergoing two unwrap offset flattening.

FIG. 53 is a graph illustrating the variation in the ratio of the streamline reference path lengths to the longest streamline reference path length, based on my chordal approximation method, as a function of angular position of the streamline for two unwrap offset flattening.

Reference will now be made in detail to the present preferred embodiment of the invention, an example of which is illustrated in the accompanying drawings.

DETAILED DESCRIPTION OF THE PREFERRED EMBODIMENT

Figure 1:
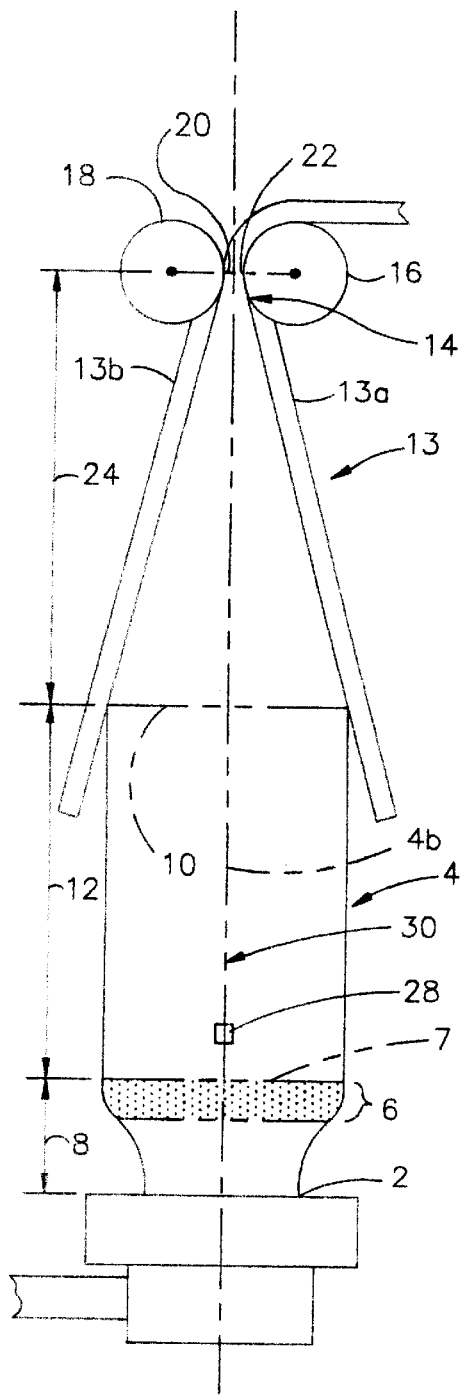
FIG. 1 is a diagrammatic elevational side view view of a blown tube film undergoing A-Frame with nip roll collapsing.

FIG. 1 shows a diagrammatic view of a blown tube film undergoing A-Frame with nip roll collapsing. Molten material, such as LDPE is continuously extruded through annular die opening 2, thereby producing a continuously moving tubular film, generally indicated as 4. As the molten material moves in the predetermined machine direction (upwardly in the configuration shown) through the melt draw region 8, it has a generally circular cross-sectional shape which increases in diameter prior to final solidification of the material. This increase in the diameter of the tube is typically effected by an entrained pocket of fluid, such as air, captured within the hollow tube. Alternatively, it is also known to expand the molten tube by drawing it over frustoconically shaped mandrel (not shown) located inside of the tube.

Figure 4:
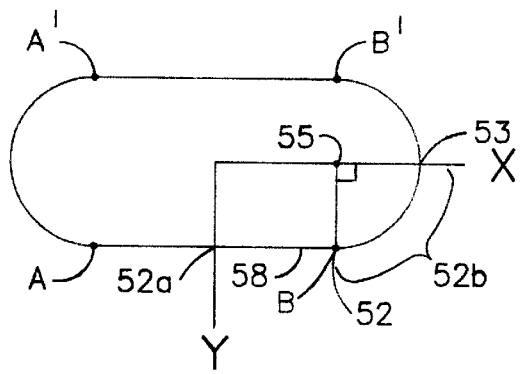
FIG. 4 is a cross-sectional view of the blown tube film of FIG. 2 in the collapsing region taken perpendicular to the Z axis at elevation Zc above the base circle.

Melt draw region 8 of film 4 is an orientation region. An orientation region, as used herein, is a region in which the internal energy of the material is sufficient so as to allow an orientation change of material structural units and aggregates of these which range in size from molecular to macromolecular levels in either amorphous or crystalline regions of the material volume. Within the orientation region, the material structure orientation can change, becoming fixed at or before the terminus of the orientation region. The terminus of the orientation regions occurs at the downstream elevation or location of the region at which the orientations of all of the structural units of material have become fixed. In the case of the initial creation of the blown tube film, the frost band, as described herein, is both a solidification and orientation region. Examples of this and other types of orientation regions not located within a melt draw region are shown in FIGS. 1 and 4 of U.S. Pat. No. 3,337,665 to Underwood et al. Although the principles and teachings of my invention are specifically described herein below with reference to collapsing which is located downstream of a melt draw region which includes an associated frost band, it should be noted that the principles and teachings of my invention apply to collapsing located downstream or upstream of any orientation region.

As illustrated in FIG. 1 herein, the continuously moving molten tube undergoes solidification in frost band 6 within draw region 8. Within frost band 6, blown film tube 4 is undergoing both solidification and elongational deformation in both the machine and transverse directions while undergoing a decrease in thickness. Frost band 6 starts at the elevation in which solidification first occurs, which, it is believed, is where local surface of the material divergence reaches a maximum value. Within frost band 6, since the material is being cooled, the amount of material which is solidified increases in the downstream direction of flow while solidified structural units are dynamically oriented and reoriented according to local stress fields transmitted to and acting upon those structural units of that material. At frost band terminus 7 (which is the terminus of the orientation region), blown tube film 4 has reached its final diameter and is completely solidified and no further orientation is effected.

Cooling air rings (not shown) may be located adjacent to the interior and/or exterior of film 4 in draw region 8 to enhance the rate of cooling of film 4. Film 4 is advanced upwardly from frost band 6 to base circle 10, which occurs at the location where film 4 first contacts the collapsing geometry or begins to change shape from a generally circular cross-section. Base circle 10 lies in and defines the entrance plane of the collapsing region.

Film 4 is advanced upwardly in the configuration shown generally concentrically about its central longitudinal axis 4a. The cross-sectional shape of film 4, perpendicular to central longitudinal axis 4a is generally circular at any point between frost band terminus 7 and base circle 10. Base circle 10 is located at the point of first contact between film 4 and the collapsing geometry, which in FIG. 1 is an A-Frame with nip roll collapser. Base circle 10 is assumed to be generally circular, as will be more fully described below. The portion of film 4 located between base circle 10 and frost band terminus 7 is referred herein as the tube region 12.

The collapsing geometry diagrammatically shown in FIG. 1 includes A-Frame collapser 13, having two opposed, spaced apart, collapsing frames 13a and 13b that are inclined toward each other which cause the shape of the continuously moving film 4 to change from a generally circular cross-section at base circle 10 to an obround shape at exit 14 of A-Frame collapser 13. The intersections of the two frames with any given cross section above and parallel to base circle 10 are parallel lines.

The continuously moving film 4 exits A-Frame collapser 13 at exit 14 and comes into contact with two nip rollers 16 and 18, passing therebetween. At nip line 20, film 4 reaches its complete layflat configuration having cross-sectional shape which is essentially a straight line whose longest dimension is substantially equal to one half the circumference of film 4. The point at which film 4 becomes substantially completely laid flat, i.e., at nip line 20 of nip rollers 16 and 18 in this configuration, is also referred to herein as layflat line 22. It should be noted that depending on the specific collapsing geometry, layflat line 22 may occur prior to nip line 20.

The shape change region is the region in which a film undergoes a change in shape from generally circular to the layflat configuration (collapsed), or alternatively from the layflat configuration to a generally circular shape (expanded). In the process described herein, this region is more specifically called the collapsing region, indicated at 24, although the principles and formulas described herein below are applicable regardless of whether film 4 is being collapsed or expanded. The use herein of "shape change region" or "collapsing region" shall be understood to include the collapsing and expanding of film 4.

In collapsing region 24, the cross-sectional shape changes from a generally circular cross-section at base circle 10, which forms the interface between tube region 12 and collapsing region 24 at the entrance of the collapsing structure and of the collapsing region, to the complete layflat configuration at layflat line 22. The exact cross-sectional shape of film 4 perpendicular to central longitudinal axis 4a at any particular location in collapsing region 24 along central longitudinal axis 4a depends upon the specific collapsing geometry utilized, and will be more fully described below.

An infinite number of differential elements comprise film 4, with each of these streamline passes through base circle 10. Shown in FIG. 1, is differential element 28 of film 4, and streamline 30 which represents the path that differential element 28 travels as film 4 advances. As illustrated, differential element 28 falls on what is known as the layflat edge, and, in the view presented in FIG. 1, is aligned with central longitudinal axis 4a and appears to follow a straight line. As will become apparent, the segment of streamline 30 in collapsing region 24 appears as a foreshortened line in FIG. 1. For the analysis and practice of my invention, the segments of all streamlines which lie in tube region 12 have been assumed to be perpendicular to base circle 10, passing generally perpendicularly into the entrance plane and base circle 10.

For purposes of analysis herein, the blown tube film can be modeled as initially comprising 400 equally angularly spaced streamlines. Since theoretically streamlines have no width, an infinite number of streamline lengths could be modeled and analyzed in between each of the 400 equally spaced streamlines. However, such extensive analysis is not always necessary to achieve the desired results of my invention, particularly when combined with the method and apparatus according to my invention for increasing, and thereby equalizing, the lengths of a plurality of streamline paths. There is a physical limit to the precision, the angular location and the width between the streamline path length corrections. The use of 400 streamline locations is not a requirement, as more or less streamlines may in fact be analyzed and/or corrected in length, as the particular process dictates. In the preferred embodiment of my invention, streamlines were modeled and analyzed between some of the adjacent 400 equally angularly (i.e. circumferentially) spaced streamlines in order to identify and approximate maxima and minima streamlines. For each set of adjacent streamlines whose lengths indicated a relative maximum or minimum, additional streamlines in excess of the initial 400 streamlines were modeled therebetween in order to resolve the true locations and lengths of the maximum or minimum streamlines.

Figure 2:
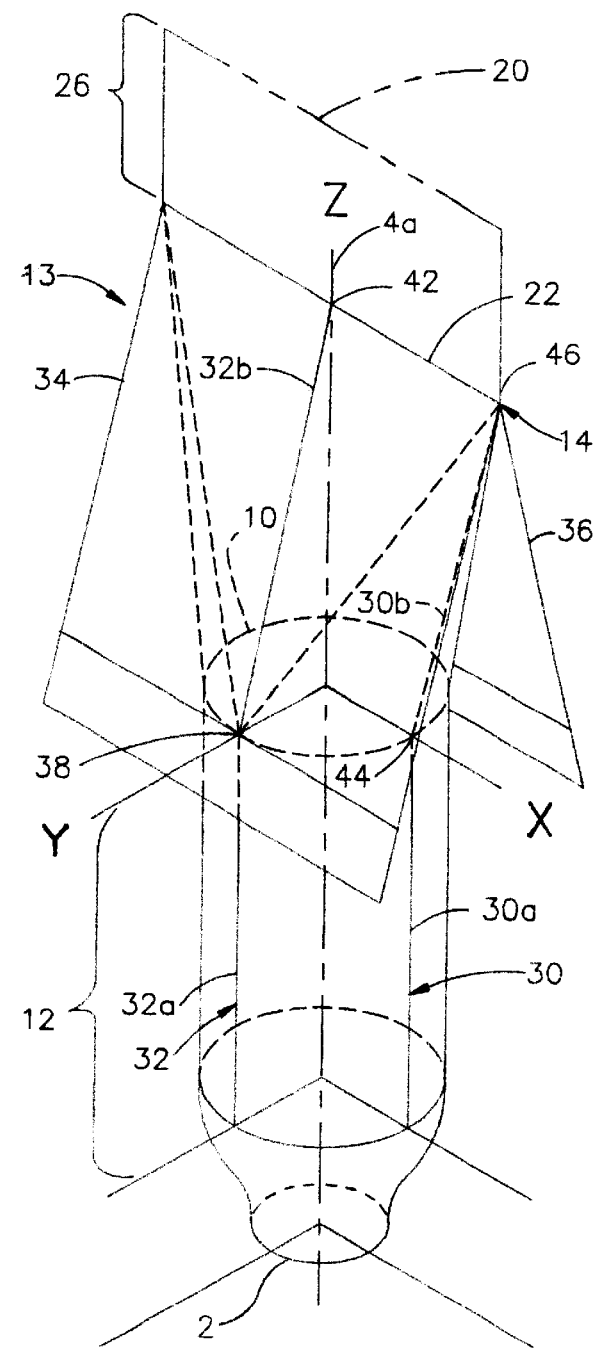
FIG. 2 is a diagrammatic perspective view of a blown tube film undergoing A-Frame collapsing.

Referring now to FIG. 2, there is shown a diagrammatic perspective view of film 4 undergoing a change in geometric shape through an A-Frame collapser (without nip rolls adjacent the A-Frame exit). In contrast to A-Frame with nip roll collapsing as shown in FIG. 1, in the pure A-Frame collapsing configuration shown in FIG. 2, layflat line 22 occurs at exit 14, which acts to trap the internal air bubble upstream of exit 14 without isolating the tension in film 4. To advance film 4 through collapser 13, nip rolls (not shown) are located downstream of exit 14, creating nip line 20 in film 4. The region between layflat line 22 and nip line 20 is herein referred to as layflat region 26, having a length of Hf. So long as nip line 20 is parallel to layflat line 22, and film 4 passes perpendicularly through both without twisting, all streamline lengths in layflat region 26 are considered to be equal in length.

Streamline 30 is illustrated as being composed of segment 30a, which lies within tube region 12, and segment 30b which lies within collapsing region 24. As mentioned above, streamline 30 forms what is known as the layflat edge which is the edge of the layflat web once film 4 reaches the layflat configuration at layflat line 20. Streamline 32 is shown as composed of tube region streamline 32a lying within tube region 12, and collapsing region streamline 32b which lies within collapsing region 24.

For simplification herein, the streamlines are identified by their angular position from the positive X axis at the base circle. Thus, streamline 30 falls at 0°, while streamline 32 falls at 90°. For purposes of analysis, each quadrant has been broken into 100 grads, such that one grad equals 0.9°. The base circle 10 lies in the entrance plane which is an XY plane located at z=O. The X and Y axes at the base circle intersect at central longitudinal axis 4a of the blown tube film 4. The Z axis also passes perpendicularly through the center of layflat line 22, coincidental with central longitudinal axis 4a. The X axis is parallel to layflat line 22. The height of tube region (12), i.e. the z distance between frost band terminus 7 and base circle 10, is referred to herein as Ht. The height of collapsing region 24, i.e. the z distance between base circle 10 and layflat line 22 (and, in this configuration collapser exit 14), is referred to herein as Ha. For reference, the machine direction of film 4 in tube region 12 is the direction which is parallel to the Z axis, and it is noted that each streamline travels in the machine direction.

STRESSES

In the blown film process, where a continuously moving flexible tube is undergoing a change of shape, such as from a circular cross-sectional shape to the layflat shape or from the layflat shape to the circular cross-sectional shape, there exists variation in the lengths of each streamline in dependence upon the streamline's circumferential base circle location as identified by αb with respect to the X axis (and concomitantly with respect to the layflat axis because of parallelism of the X axis to the layflat line). The prior art has briefly identified and treated circumferentially varying streamline lengths resulting from the collapsing of the continuously moving blown tube film as causing stretching and bagging of the film resulting from uneven stresses in the film as it goes from a circular cross-section to the layflat configuration. However, according to the methods and apparatus of my invention, the circumferentially varying, unequal streamline lengths have a greater and more direct impact on the quality of the final product than previously recognized.

Stresses are induced in the blown tube film due to a variety of causes such as material weight, friction, internal pressure, and collapsing. Of these stresses, those created by internal pressure and collapsing are the largest and the major stresses in evidence in the draw region, with the collapsing induced stresses, also referred to herein and in the claims as shape change induced stresses, being several orders of magnitude larger than the machine direction stress produced by internal pressure of the fluid (in this case, gas) contained within the volume enclosed by the contiguous film surface which exists within the tension isolated region. In contrast to the shape change induced stresses, the internal pressure induced stresses do not vary circumferentially for a uniform thickness tube.

The shape change induced stresses result from unequal streamline lengths within the collapsing region. The circumferentially varying unequal streamline lengths, which occur when the geometric shape of the film is changed in any particular shape change process, induce stresses which are proportional to the differences in their lengths above the shortest streamline length found within the collapsing region. These induced stresses exist along the entire length of the film from the upstream tension isolating device to the downstream tension isolating device. In the specific case of the initial creation of the blown tube film, the unequal streamline lengths occasioned and produced by the change in shape effected by the collapsing geometry create unequal machine direction (streamline direction) stresses in the solidified material at the frost band terminus, thereby causing non-uniform machine direction extensional flow and unequal residence time of molten material differential elements below the frost band terminus as well as causing undesirable orientations and structure of the solidified material flowing past the frost band terminus. This produces wide variations of gauge thickness, as well as creating non-uniform material residual stresses, strains and strain rates in the material during solidification within the draw region. By equalizing the machine direction stresses occurring at the frost band terminus, the gauge thickness variation, non-uniform extensional flow patterns, orientation and structure variations, and the unequal material residence time of material elements within the draw region can be virtually eliminated.

Such equalization is equally applicable for process regions other than at the film blowing region which exists at the inception of the blown film process. Equalization of stresses has advantages for any tension isolated region of a process where blown tube films undergoing a change in shape where somewhere in the tension isolated region there also exists a higher energy level which allows a orientation change in the structure of the material, i.e. an orientation change region.

The collapsing induced machine direction stresses in the blown tube film may be approximated by treating the film as a thin-walled circumferentially contiguous structure undergoing elastic elongation downstream of the frost band terminus. (As used herein, a method of approximating a parameter may yield the exact and precise value of that parameter, notwithstanding the identification of that method as a method of approximating.) This elastic elongation is the result of the unequal streamline lengths which occur due to the change of shape occurring in the collapsing region. Although, as will be detailed below, the streamline lengths are approximated as equal between the frost band terminus and the base circle, with the actual elongation of the streamlines occurring in the collapsing region between the base circle and the layflat line, the elastic strains resulting from these elongations occur along the entire length of any solidified streamline which exists within the tension isolated region. Further, since the material is a continuum within the tension isolated region, while the streamline path lengths, as described below, are unequal only in their collapsing region, the elastic strains and the corresponding collapsing induced machine direction stresses occur along the entire lengths of solidified material streamlines which exist within the tension isolated region.

According to my invention, by considering the continuously moving blown tube downstream of the frost band terminus and up to the nip line (the downstream tension isolating mechanism) to be a thin walled structure undergoing elastic strain in both the longitudinal (machine) direction and the transverse (circumferential) direction as influenced by stresses induced by the pneumatic pressure of the column of air encapsulated within the tube which induces material stress in both the machine and transverse directions and, in addition, by the material stresses induced by the elastic strains produced from varying solidified material streamline lengths in passage of the material through a collapsing geometry (these corresponding induced elastic strains and the concomitant stresses occur only in the machine direction), the orthogonal stresses existing on any solidified streamline element may be approximated as described herein. Since the transverse direction stress is only due to pneumatic pressure, the circumferential stress and strain are essentially constant in magnitude from frost band terminus elevation to layflat line elevation. The longitudinal stress at any streamline is approximated to be the sum of the longitudinal components resultant from pneumatic pressure plus the collapsing strain induced longitudinal stress on the streamline in passage through the collapser geometry. The collapsing induced elongation at any given streamline position (as identified by its collapsing base circle streamline position, $\alpha b$) may be approximated by determining the length of the solidified portion of the particular streamline within the tension isolated region, i.e. from the frost band terminus to the nip line, and subtracting from the streamline length thus found the length of the shortest streamline found by analysis of streamline lengths around the circumference of the film. The elastic strain of the particular streamline can then be approximated as the elongation divided by the total solidified streamline length at the ab base circle streamline location or, alternately, divided by the minimum total solidified streamline length found around the circumference. These approaches yield the following relations:

$$\varepsilon_{11}(\alpha b) = \frac{L(\alpha b) - Lmin}{L(\alpha b) + Ht + Hf} \tag{E1}$$

where:

$\varepsilon_{11}(\alpha b)$ is the elastic strain in the 1-1 (machine direction) at any streamline identified base circle position, $\alpha b$;

$L(\alpha b)$ is the length of the streamline through the collapsing region at $\alpha b$ streamline position;

Lmin is the length of the minimum streamline length through the collapsing region;

Ht is the tube height from frost band terminus to base circle; and

Hf is the length from the layflat line to the nip line.

An alternate relation to (E1) is:

$$\varepsilon_{11}(\alpha b) = \frac{L(\alpha b) - Lmin}{Lmin + Ht + Hf} \tag{E2}$$

wherein Lmin rather than $L(\alpha b)$ is used to determine the elastic strain ratio.

Once the strain has been approximated, then the shape change induced machine direction stress at any identified streamline may be approximated according to my invention by the formula:

$$\sigma_{11}(\alpha b) = \varepsilon_{11}(\alpha b) \times E, \tag{E3}$$

where:

$\sigma_{11}(\alpha b)$ is the collapsing stress induced in the machine direction by streamline strain at $\alpha b$; and E is the material's modulus of elasticity in tension.

According to this approximation, the larger the modulus of elasticity, the greater the stress induced at any particular location along a particular streamline for any given strain, and, in particular, the greater the stress induced at the frost band terminus. When the variation in stress from streamline to streamline, as well as total variation of maximum stress to minimum stress about the circumference of the blown tube film at the frost band terminus become great, problems occur in running the material by such a process. Thus, for higher modulus materials, such as HDPE, PP (polypropylene) and PET(polyethylene terephthalate) and rigid rod/liquid crystal polymers and their blends, the total stresses at the frost band terminus are not only greater than with low modulus materials but the circumferential stress gradients between streamlines are also greater for a given collapsing structure. While minimizing the machine direction stresses at the frost band terminus is beneficial, it is more important according to my invention to equalize these machine direction stresses. Once stresses have been equalized, the attendant problems with the blown film process and its products, in particular process draw region residence time distribution, product gauge, length, and energy to break variations and the associated difficulties with higher modulus materials, diminish.

According to my method of approximating stress at the frost band terminus, in order to equalize substantially those stresses within an acceptable tolerance range, the total length of each streamline path followed by differential elements from the terminus of the orientation region to the terminus of the tension isolated region, i.e. from the frost band terminus to the nip line, must be substantially equal, thereby reducing the shape change induced machine direction stresses to nearly zero at the frost band terminus. Since the longest streamline path between the frost band terminus and the nip line is the result of the collapsing geometry and cannot effectively be shortened while maintaining the same collapsing geometry, my invention teaches that the paths of a plurality of other (and preferably all other) streamlines which, under traditional collapsing geometry configurations (i.e. without implementation of the teachings of my invention), are shorter than the longest streamline, must be modified to cause the streamlines to follow respective paths within solid material portions of a tension isolated region (which extend from the orientation change region terminus to the tension isolated region terminus), i.e. between the frost band terminus and the nip line, whose respective lengths are approximately equal in length to the longest streamline in order to equalize the collapsing induced machine direction stresses about the circumference of the blown tube film at the frost band terminus by reducing the shape change induced stresses to nearly zero. As identified above, this approximate equalization of stresses by the approximate equalization of streamline path lengths produces the desired effects in the blown film process, namely minimizing gauge variation as well as minimizing residual machine direction stresses and permanent circumferentially varying collapsing induced deleterious orientations resident in the formed materials.

The complete equalization of stresses, as well as the complete equalization of streamline lengths require that the lengths between the terminus of the orientation region and the terminus of the tension isolated region of all streamlines be exactly identical in magnitude. Although exact path equalization of every circumferentially disposed streamline is desirable, the desired affect on the process, gauge variation, residual stresses and the ability to handle high modulus materials, can be achieved if the shape change induced machine direction stresses along a plurality of streamlines are reduced to nearly zero. The degree of improvement in the processing of blown film and the accompanying improvement in gauge, orientation and draw region residence time variations and other deleterious blown film quality characteristics is dependent upon how close to total equalization of all actual streamline path lengths is attained by path modifying devices. For example, equalization of three streamlines angularly spaced from each other will improve the processing, but not optimize it. Preferably, subject to the limits of machining and practical consideration, all that can be done to make streamline path lengths exactly equal around the circumference of the film should be done.

My methods of approximating the shape change induced machine direction reference stresses (i.e. stresses which would exist using traditional collapsing geometry configurations without implementation of the teachings of my invention) on a plurality of streamlines at a cross-section of the film located between the nip line and the frost band terminus and causing a plurality of the differential elements to follow streamline paths such that the shape change induced machine direction stresses are approximately zero can be used in the processing of any film undergoing a solid material shape change, regardless of the geometry used to effect the shape change, and may in fact be used with any geometry. The use of my methods is independent of whether the film is being collapsed to the layflat configuration or expanded to a generally circular cross-sectional shape. My methods may be used to process high modulus materials which heretofore could not be processed by the blown film process.

In order to utilize my specific formulas for approximating the shape change induced machine direction stresses according to my methods, the lengths of the streamlines need to be approximated, although my method may still be practiced according to my invention by utilizing other methods and/or means to approximate the shape change induced machine direction stresses. In order to approximate the streamline lengths between the terminus of the orientation region and the terminus of the tension isolated region, the respective path of each streamline must be determined. According to some of the aspects of my invention, I have modeled specific streamline paths and approximated specific streamline path lengths. These specific streamline paths and path length approximations depend on the specific collapsing geometry used in the processing of the blown film.

The starting point for the detailed description of the various aspects of my invention is the modeling and analysis of the streamline paths followed by differential elements of film being processed in accordance with state-of-the-art blown film processing as it existed prior to my invention detailed herein. The streamline paths followed by differential elements of prior-art-process film for various collapsing geometries are referred herein as reference paths. The lengths of these reference paths are referred to herein as reference path lengths. According to various aspects of my invention, various models and relationships are taught for approximating the reference paths and the reference path lengths. Once the reference paths and/or reference path lengths can be determined, the additional teachings of my invention may be implemented so as to cause the differential elements to follow respective streamline paths between the orientation region terminus and the tension isolated region terminus which are approximately equal in length. The teachings of my invention provide for the approximation of the lengths of these new streamline paths. The successful implementation of the teachings of my invention results in a plurality of the differential elements following streamline paths which are different, in at least some segment, from the corresponding streamline paths of prior-art-processed-film, with the reference paths and reference path lengths being the starting points utilized to implement my invention. The collapsing induced machine direction stresses, when approximated based on the reference path lengths, are referred to herein as reference stresses.

Turning now to the approximation of the reference path lengths, according to one aspect of my invention the reference paths of the segments of streamlines between the frost band terminus (or, more generally, the orientation region terminus) and the base circle, i.e. the tube region, are assumed to be straight lines of equal length despite the presence of machine direction elastic strain. The reference path lengths of the streamlines within the tube region is denoted hereinafter as Ht, which is the perpendicular distance along the central longitudinal axis between the frost band terminus and the entrance plane or base circle, and is independent of the collapsing geometry.

The reference paths of the segments of the streamlines within the collapsing region is dependent completely upon the collapsing geometry, and detailed methods for approximating the reference path lengths through the collapsing region for various collapsing geometries are described. It is noted that the parametric equations for approximating the reference path lengths of the streamlines are based on Rb, $\alpha b$, $\beta_b$, and z, where Rb is the radius of the base circle, $\alpha b$ represents the angular location at the base circle of the streamline being analyzed with respect to the X axis which is parallel to the layflat line and passes through the base circle, $\beta_b$ is the complementary angle to $\alpha b (\alpha b + \beta b = \pi/2)$, and z is the elevation above the entrance base circle. As will be appreciated, the approximation of the reference path lengths may also be accomplished according to the methods of my invention by utilizing parametric equations based on Cartesian coordinates, x, y and z.

A-Frame Collapsing

FIG. 2 illustrates diagrammatically a blown tube film 4 undergoing collapsing effected by an A-Frame collapser with the nip rolls (not shown) located downstream of exit 14. The A-Frame collapser includes two spaced apart collapsing frames which are inclined toward each other so as to effect the change in shape of the tubular film 4. These two collapsing frames (also called tents, a term derived from their combined shape when viewed perpendicular to the YZ plane) are not illustrated, but are represented as two inclined, intersecting planes 34 and 36. Planes 34 and 36 represent the "collapsing geometry boundaries" which define the "effective" shape of the collapser. With A-Frame collapsers, the frames may be made of rollers, slats or other configurations, which do not present a continuous surface to the blown film tube. Nonetheless, the blown film tube may be modeled as being collapsed by the "effective" shape of the collapser, i.e. the collapsing geometry boundary. The portion of any blown film tube which is modeled as being coincidental with the collapsing geometry boundary is referred to herein as the face section. It is noted that, when the collapser is made of rollers, slats, or other discontinuous surfaces, the film web may bulge and not be planar. U.S. Pat. No. 3,689,609 to Robinson describes a collapsing geometry which presents a continuous planar surface to the film, and provides air flow adjacent the film to "lubricate" the passage of the film through the collapser. Such a planar collapser is believed to be preferable. The face section of the web undergoing A-Frame collapsing is modeled herein as planar.

For the analysis of pure A-Frame collapsing, it is assumed that layflat line 22 occurs at exit 14 of the A-Frame collapser, the intersection of planes 34 and 36, and that the exit functions to isolate pressure, thereby preventing the entrained air bubble from flowing downstream past exit 14. The downstream tension isolating line, nip line 20, is located downstream of exit 14. As with all length approximation methods described herein, the X-Y plane is located at the base circle coincidental with the entrance plane, which is located at the point of first contact by the film with a collapsing geometry boundary, i.e. adjacent the beginning of the collapsing region where the cross-sectional shape first changes, with the Z axis being coincidental with central longitudinal axis 4a of film 4. Layflat line 22 intersects the Z axis perpendicular thereto, and is parallel to the X axis.

As is customary, all cross-sectional shapes of film 4 referred to herein are those cross-sections which are taken along planes parallel to the X-Y plane, i.e. perpendicular to the Z axis/central longitudinal axis 4a. The portion of each cross-section within the collapsing region which corresponds to the face section exists as a lateral straight line segment, as will be described below.

Figure 3:
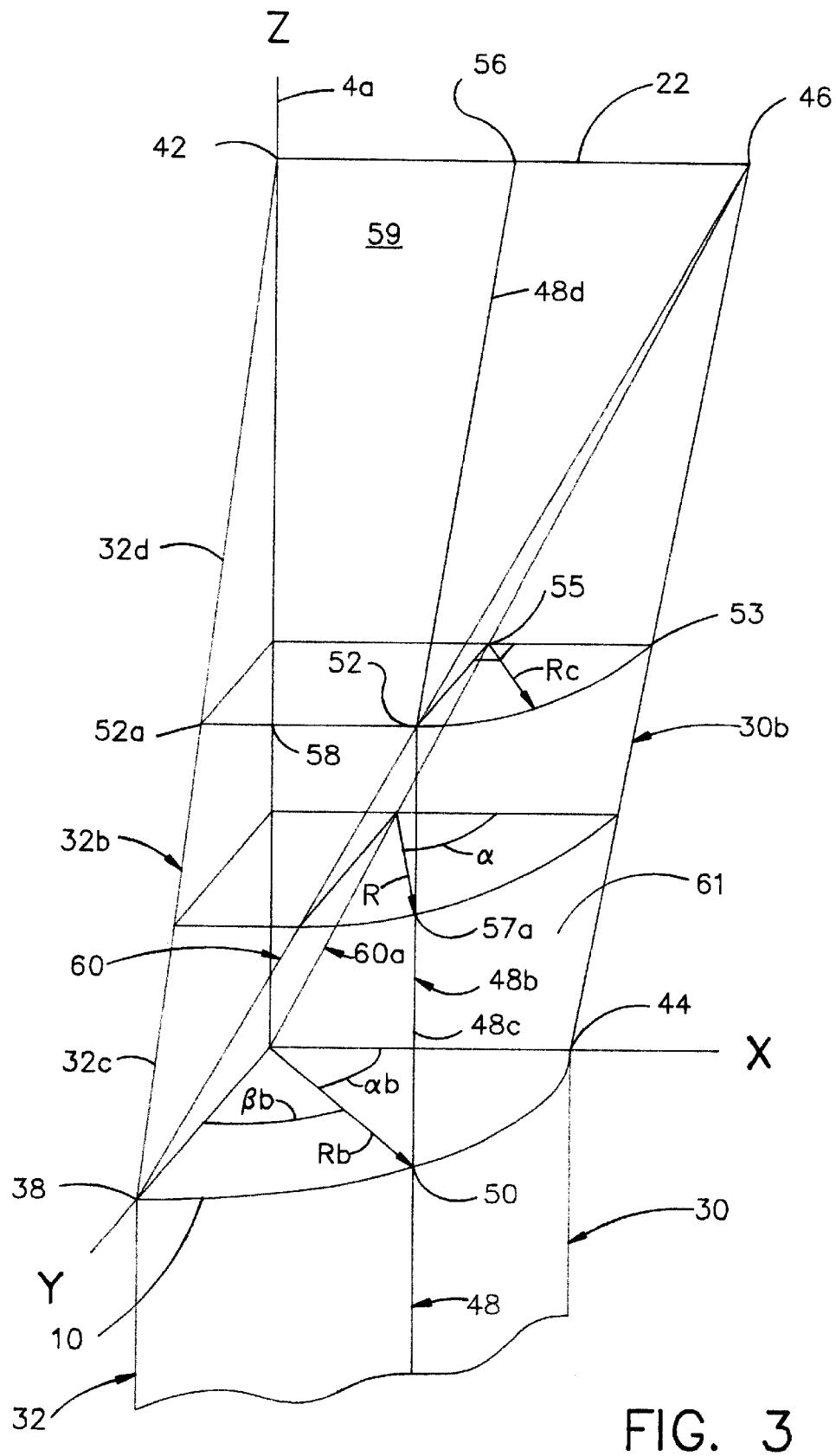
FIG. 3 is a diagrammatic perspective view of a quadrant of the blown tube film of FIG. 2 undergoing A-Frame collapsing, showing the sail section and the face section of the collapsing region between the base circle and the layflat line.

As illustrated in FIG. 2, the continuously moving film 4 initially contacts the collapsing geometry boundaries 34 and 36 at base circle 10. Film 4 has a generally circular cross-sectional shape at this location, which establishes the base circle 10, having a radius identified as Rb (FIG. 3). Only one of these two initial points of contact 38 is shown in FIG. 2, which occurs at 90°, or 100 grads, from the X axis. (The other initial point of contact is obscured by the film in FIG. 2 and is not shown in hidden lines for clarity). It is at initial point of contact 38 where streamline 32 located at 100 grads (SL(100)) makes its respective transition from being part of a generally circular cross-sectional shape of film 4 to being part of a face section lateral segment (as described in detail below). Streamline SL(100) 32 is assumed to be constrained by collapsing geometry to boundary plane 34 to follow a straight line reference path 32b within collapsing region 24 between initial point of contact 38 and its intersection with layflat line 22 at point 42. Edge streamline SL(0) 30 follows reference path 30b within collapsing region 24 between point 44 on base circle 10 to point 46 on layflat line 22, contacting the collapsing geometry boundary only at point 46.

Some basic relationships for A-Frame collapsing are:

$$Lfw = Rb * \left(\frac{\pi}{2}\right) \quad (E4)$$

$$L0 = \sqrt{\left[\frac{\pi}{2} - 1\right]^2 * Rb^2 + Ha^2} \quad (E5)$$

$$L100 = \sqrt{Rb^2 + Ha^2} \quad (E6)$$

where
Lfw is the layflat width;
L0 is the length of SL(0); and
L100 is the length of SL(100)

Referring to FIG. 3, which is a diagrammatic view of the positive X, positive Y, positive Z quadrant of the blown tube film between base circle 10 and layflat line 22. (The layflat region is not shown for clarity). It will be recognized that this quadrant has mirror image symmetry with each adjacent quadrant. Between base circle 10 and layflat line 22, the reference path for each streamline is uniquely dependent upon its angular position at base circle 10 αb referenced from the X axis. In FIG. 3, streamline SL(αb) 48 represents any streamline within the quadrant shown, and comprises collapsing region streamline 48b within collapsing region 24. Collapsing region streamline 48b begins at point 50 on base circle 10 and follows its reference path to contact point 52 at which location streamline SL(αb) 48 initially contacts collapsing geometry boundary 34 and becomes part of face section 59. From contact point 52, collapsing region streamline 48b follows, according to my method, a reference path which is assumed to be straight, along collapsing geometry boundary 34 (not shown in FIG. 3) to point 56 on layflat line 22. As used herein, contact point means the location at which a respective streamline first reaches the collapsing geometry boundary and becomes part of the face section. The shape of the face section is directly influenced by the collapsing geometry boundary shape.

Each cross-section of film 4 in collapsing region 24 includes a portion of the perimeter which is substantially straight. This straight portion lies in face section 59 and is referred to herein as a face section lateral segment. Half of one such face section lateral segment 58 is illustrated in FIG. 3 by the straight line between contact point 52 and point 52a on SL(100) 32. (The half of this particular face section lateral segment 58 which lies in the negative X—positive Y quadrant is depicted in FIG. 4.) The lengths of the face section lateral segments become progressively longer as the continuously moving tubular film advances upwardly, eventually becoming equal to the layflat width at the location where face section 59 terminates coincidental with layflat line 22.

Contact point 52 forms one end of face section lateral segment 58. In this collapsing geometry, each streamline has a contact point, including edge streamline SL(0) 30 whose contact point corresponds to point 46, which is one end of layflat line 22. Thus, for edge streamline SL(0) 30, its respective face section lateral segment is coincidental with layflat line 22. The locus of each contact point of all streamlines between the positive X and positive Y axis shown in FIG. 3 forms contact line 60, extending from point 38 to point 46.

The section of film 4 between contact line 60 and base circle 10 is referred to herein as sail section 61. The sail section segment of any particular streamline is that segment of the streamline between the entrance plane or base circle and the respective contact point of the streamline.

As previously mentioned, the section between contact line 60 and layflat line 22 is referred to as face section 59. The face section segment of any particular streamline is that segment of the streamline between the streamline's respective contact point and the streamline's point of intersection with the layflat line. Thus, collapsing region streamline 48b of SL(αb) 48 includes face section segment 48d and sail section segment 48c. The collapsing region streamline 30b of edge streamline SL(0) 30 is comprised of only a sail section segment while collapsing region streamline 32b of SL(100) 32 is comprised of only a face section segment. The reference paths of all face section segments in face section 59 are, according to one aspect of my method, assumed to be parallel to the reference path of face section segment 32b of SL(100) 32. Thus, each streamline reference path in face section 59 lies in a plane which is parallel to the Y-Z plane.

The length of the reference path of face section segment 48d of collapsing region streamline 48b of SL($\alpha$b)48, according to my method, is assumed to be equal to the length of the reference path of upper corresponding portion 32d of face section segment 32b of SL(100) 32. The reference paths of all portions of face section segments of streamlines within face section 59 from any particular face section lateral segment to nip line 22 are assumed to be equal in length, and parallel to each other. The length of the reference path of face section segment 48d from contact point 52 to point 56 is equal to the length of the reference path of upper corresponding portion 32d of face section segment 32b, which extends from point 52a (the corresponding point on face section segment 32b which lies on the same cross-section as contact point 52) to point 42. Thus, the difference between the reference path lengths may be approximated as the difference between the reference path length of sail section segment 48c and the length of the reference path of lower corresponding portion 32c of face section segment 32b of SL(100) 32 between the base circle and the cross-section in which contact point 52 lies. The reference path of lower corresponding portion 32c which corresponds to sail section segment 48c terminates at face section lateral segment 58 of which contact point 52 of SL($\alpha$b) 48 forms one end.

According to one aspect of my method, the reference path of each respective streamline from its respective contact point to the layflat line, i.e. face section segment, L2($\alpha$b), is modeled as a straight line, and the reference path length is approximated as equal to the length given by the formula:

$$L2(\alpha b) = \left[\frac{\alpha b}{\frac{\pi}{2}}\right] * L100 \tag{E7}$$

It is noted that when angles, such as $\alpha$b, are used in formulas herein for multiplication or division, the angles are expressed in radians, rather than grads or degrees.

Sail section segment 48c follows its reference path in the absence of any path modifying surfaces. For at least some collapsing geometries, if not all, it is believed that the length of the reference path of sail section segment 48c is always shorter than the length of the reference path of lower corresponding portion 32c of SL(100) 32b, which extends from point 38 to point 52a. Thus, it is believed that the length of the reference path of SL(100) is the longest streamline length within the collapsing region, and, therefore, that the length of the reference path of SL(100) is the longest within the tension isolated region.

According to one aspect of my invention, the reference path of sail section segment 48c is modeled as a straight line between points 50 and 52. When the length of the sail section segment of any particular streamline is approximated as a straight line between the point of intersection of that streamline with the base circle and the respective contact point of that streamline, such analysis is referred to herein as the chordal approximation method.

In general, the length of a straight line between any two points in space is given by the Pythagorean theorem. As it applies to the length of a straight line between a point on base circle 10 and a contact point, the length is given by the formula:

$$L1(\alpha b)c = \sqrt{[Xc-Xb]^2 + [Yc-yb]^2 + [Zc-Zb]^2} \tag{E8}$$

Since the origin of the reference frame lies on the entrance plane with the base circle, i.e. Zb=0, equation (E8) becomes:

$$L1(\alpha b)c = \sqrt{[Xc-Xb]^2 + [Yc-Yb]^2 + Zc^2} \tag{E9}$$

When equation (E8) is expressed as a function of Rb and $\alpha$b to give the reference path length of the chordal approximation of sail section segment 48c, L1($\alpha$b)c, the reference path length is given by the formula:

$$L1(\alpha b)c = \tag{E10}$$

$$\sqrt{Rb^2 * \left\{[\beta b - COS(\alpha b)]^2 + \left[\left[\frac{\alpha b}{\frac{\pi}{2}}\right] - SIN(\alpha b)\right]^2\right\} + \left[\frac{\beta b}{\frac{\pi}{2}}\right]^2 * Ha^2}$$

A second method for approximating the reference path length of the sail segment 48c of SL($\alpha$) 48, L1($\alpha$b)i, is referred to herein as the integral approximation method, is given by the equation:

$$L1(\alpha b)i = \int_{z=0}^{z=Zc} \sqrt{\left(\frac{d(X(z))}{dz}\right)^2 + \left(\frac{d(Y(z))}{dz}\right)^2 + 1} \, dz \tag{E11}$$

where $$Zc = Ha * \left[\frac{\beta b}{\frac{\pi}{2}}\right] \tag{E12}$$

where, Zc is the z component of the streamline contact point coordinates.

Thus, if the equation for the reference path of sail section segment 48c is known, its length may be approximated by integrating formula (E11).

It is believed that the chordal method yields the most accurate approximation of the path length of a streamline whenever the collapsing stress affects dominate the internal bubble pressure effects. For all collapsing geometries, the chordal approximation of the reference length of a sail section segment will be shorter than or equal to the integral approximation of the same sail section segment reference path length.

According to one aspect of my methods of approximating the reference path length of sail section segment 48c, the length of the perimeter of any particular cross-section in the collapsing region may be assumed to be constant throughout the collapsing region. In addition, the shape of any collapsing region cross-section may be assumed to be obround at any given elevation, as shown in full cross-section in FIGS. 4 and 5. The X and Y axes shown in FIGS. 4 and 5 bound the quadrant illustrated in FIG. 3. An obround shape consists of two equal length spaced apart parallel segments (corresponding to the face section lateral segment located at that cross-section) which are connected to each other at their respective ends by a 180° arc of a constant radius (the sail section lateral arcs), the radius of each arc being equal to one half the gap between the two straight segments. As depicted in FIG. 4, the two face section lateral segments of the full cross-section extend between points A and B and A' and B', both of which lie in respective face sections. Within the quadrant shown in FIG. 3, each such face section lateral segment is the locus of the intersections of all streamlines with the obround cross-section at the $\alpha$b contact elevation, Zc, for all streamlines having a base circle angular position greater than $\alpha$b. Similarly, each sail section lateral arc within the quadrant shown in FIG. 3 is the locus of the intersections of all streamlines with the obround shape cross-section at the contact elevation, Zc, for all streamlines having a base circle angular position less than $\alpha$b.

Comparing FIGS. 3 and 4, the obround cross-section of FIG. 4 represents the cross-section of film 4 taken at contact point 52 of SL(αb) 48. Contact point 52 is one end of face section lateral segment 58 which lies in face section 59.

For every base circle position αb there exists an obround cross-sectional shape at an elevation, Zc, such that the length of any given face section lateral segment at that cross-section is equal to the base circle arc length between initial point of contact 38 (i.e. the intersection of the YZ plane with base circle 10) and the intersection with base circle 10 of the streamline located at αb. Thus, the lengths of any given face section lateral segment is given by the formula $$Xc = Rb * \beta b \quad (E13)$$

This represents the x coordinate, Xc, for the contact point which forms an end of the particular face section lateral segment (e.g. contact point 52).

The y coordinate, Yc, of any contact point is equal to the radius of the corresponding sail section lateral arc lying within the same cross-section. Thus, $$Yc = Rb * \left[\frac{\alpha b}{\frac{\pi}{2}}\right] \quad (E14)$$

The corresponding face section lateral segment is located at a distance Yc from the XZ plane, along its entire length.

Equations (E13) and (E14) do not change for any other collapsing geometry wherein the film has an obround cross-section within the collapsing region shape. These equations are valid for A-Frame collapsing, nip roll collapsing, and A-Frame with nip roll collapsing (discussed below). However, the z coordinate of the contact point, Zc, depends on the collapsing geometry. For A-Frame collapsing, Zc is given by equation (E12) above.

Referring still to FIGS. 3 and 4, contact point 52 is also one end of sail section lateral arc 52b which lies between contact line 60 of face section 59 and point 53 on the XZ plane. At any given cross-section, sail section lateral arc 52b has a constant radius, Rc, which is equal to Yc for that cross section elevation. Sail section lateral arc 52b subtends an angle of π/2. Sail section lateral arc 52b is equal in length to the length of the base circle arc between point 50 and point 44 (i.e. the length of the base circle arc between the X axis and streamline SL(αb) 48 (which passes through one end of arc 52b)). The length of base circle arc between points 44 and 50, and concomitantly, the length of sail section lateral arc 52b, is given by Rb×αb. Center 55 of the radius of arc 52a is located on the projection, line 60a, of contact line 60 on the XZ plane. Line 60a is the locus of the centers of all sail section lateral arc radii.

Figure 5:
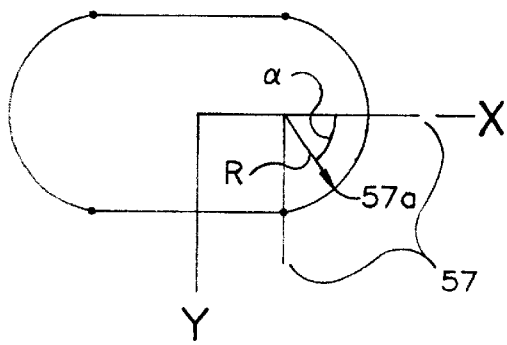
FIG. 5 illustrates the cross-sectional shape of the blown tube film of FIG. 2 at a height z above the base circle, where z<Zc.

FIG. 5 illustrates a typical obround cross-section taken at any height z between base circle 10 and contact point 52 of collapsing region streamline 48b, i.e. 0<z<Zc. Since z<Zc, collapsing region streamline 48b passes through sail section lateral arc 57, intersecting at point 57a at an angle, α, which varies as a function of z. For A-Frame collapsing, α is given by the formula:

$$\alpha = \left[\frac{Ha}{Ha-z}\right] * \alpha b \quad (E15)$$

The radius, R, of arc 57 is centered on line 60a and for A-Frame collapsing also varies as a function of z, according to the formula:

$$R = \left[\frac{Ha-z}{Ha}\right] * Rb \quad (E16)$$

The Cartesian coordinate components, as a function of angular position αb and elevation z, for the location of any point along a sail section segment for A-Frame collapsing is given by the following equations:

$$X = \frac{\pi}{2} * \frac{Rb}{Ha} * z + \frac{Rb}{Ha} * (Ha-z) * \cos\left(\frac{Ha}{Ha-z} * \alpha b\right) \quad (E17)$$

$$Y = \frac{Rb}{Ha} * (Ha-z) * \sin\left(\frac{Ha}{Ha-z} * \alpha b\right) \quad (E18)$$

For any given collapsing geometry wherein the cross-sectional shape of the film is assumed to be obround and have a constant perimeter length, equation (E11) becomes:

$$Ll(\alpha b)i = \quad (E19)$$
$$\int_{z=0}^{z=Zc} \sqrt{R^2 * \left\{1 + \left[\frac{\pi}{2}\right]^2 + \alpha^2 - \pi * [\alpha * \sin\alpha + \cos\alpha]\right\} + 1} \, dz$$

Both R' and α are dependent on the specific collapsing geometry and the elevation, and must be evaluated as a function of z for the specific collapsing geometry being analyzed.

Solving equation (E19) for A-Frame collapsing based on these assumptions, i.e., constant perimeter length and obround cross-sectional shape, the reference path length, L1(αb)i, of sail section segment 48c may be approximated as equal to the length given by the formula:

$$Ll(\alpha b)i = \quad (E20)$$
$$\int_{z=0}^{z=Zc} \sqrt{\left[\frac{Rb}{Ha}\right]^2 * \left\{1 + \left[\frac{\pi}{2}\right]^2 + \alpha^2 - \pi * [\alpha * \sin\alpha + \cos\alpha]\right\} + 1} \, dz$$

The total reference path length of collapsing region streamline SL(αb) 48b within the collapsing region is equal to the sum of the reference path length of sail section segment 48c plus the reference path length of face section segment 48d. This is given by the formula:

$$L(\alpha b) = L1(\alpha b) + L2(\alpha b) \quad (E21)$$

As should be understood the total length of any streamline reference path within any region is the sum of the reference path lengths of the individual segments within the region. This of course holds true even if there are more than two segments for a given streamline being considered for any given geometry, and is given generally by the equation:

$$L(\alpha b) = \sum_{k=1}^{k=n} Lk(\alpha b) \quad (E22)$$

where n=total number of segments within the region.

For simplicity, formula (E22) will not be repeated below, it being understood that it is applicable to all analysis herein.

Figure 6:
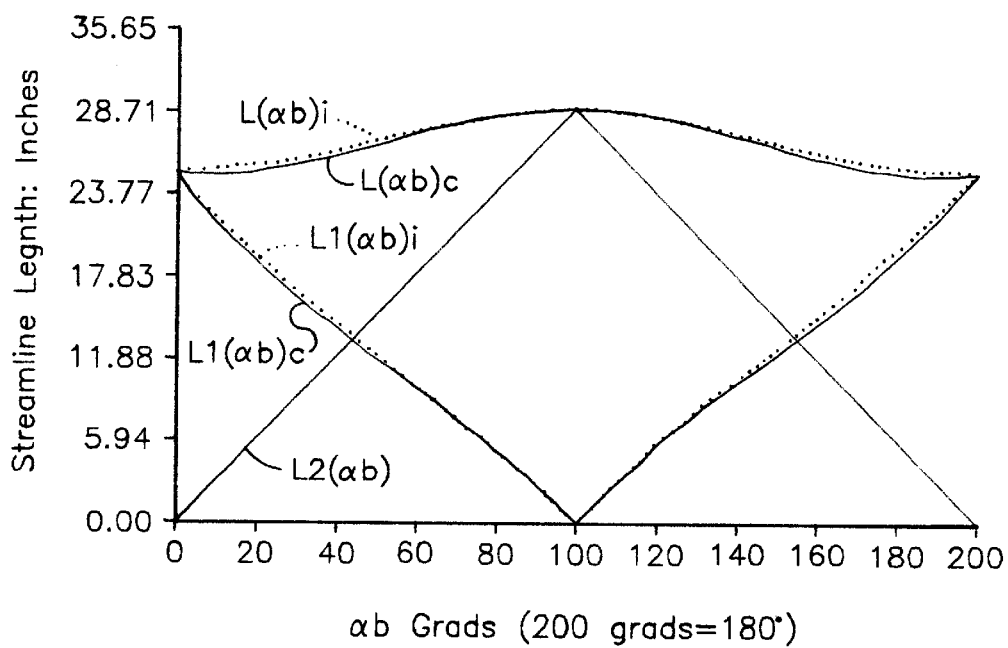
FIG. 6 is a graph illustrating the variation in the reference path lengths of streamlines within the collapsing region approximated according to my chordal and my integral approximation methods, based on the angular location of the streamlines, for A-Frame collapsing.

FIG. 6 illustrates the reference path lengths of the face section segments and the sail section segments as approximated by both the chordal and integral approximation methods, and the total reference path lengths of the streamlines in the collapsing region, for an A-Frame collapser with an 80° included angle between the collapsing frames, a 60 inch layflat width, a 22.76 inch height and a base circle radius of 19.10 inches. The graph illustrates the difference between the two methods of approximation, indicating that for both methods it is believed that the maximum reference path length occurs at SL(100), with minimum points near, but not at, the layflat edge. For the chordal method, the local minimum point occurred at α=10.692448 grads. For the integral method the minimum point occurred at αb=2.50000 grads for analytical tolerance limits of 0.001 inches. As the graph shows, the integral approximation results in longer or equal reference path lengths at all points when compared to the results obtained with chordal approximation.

Figure 7:
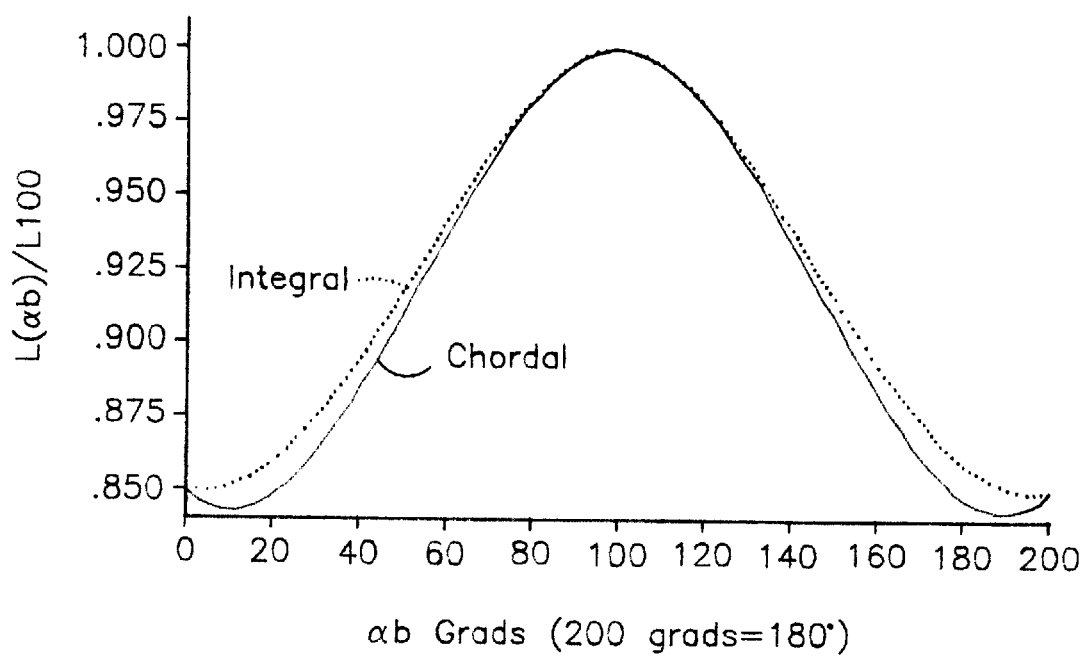
FIG. 7 is a graph illustrating the ratio of streamline reference path lengths to the longest streamline reference path length, approximated according to my chordal and integral approximation methods, as a function of the angular position of the streamlines, for the same A-Frame collapsing as depicted in FIG. 6.

FIG. 7 illustrates the ratio of the circumferentially varying reference path lengths in the collapsing region to the maximum reference path length in the collapsing region (which occurs at SL(100)) for the A-Frame collapser of FIG. 6.

Figure 8:
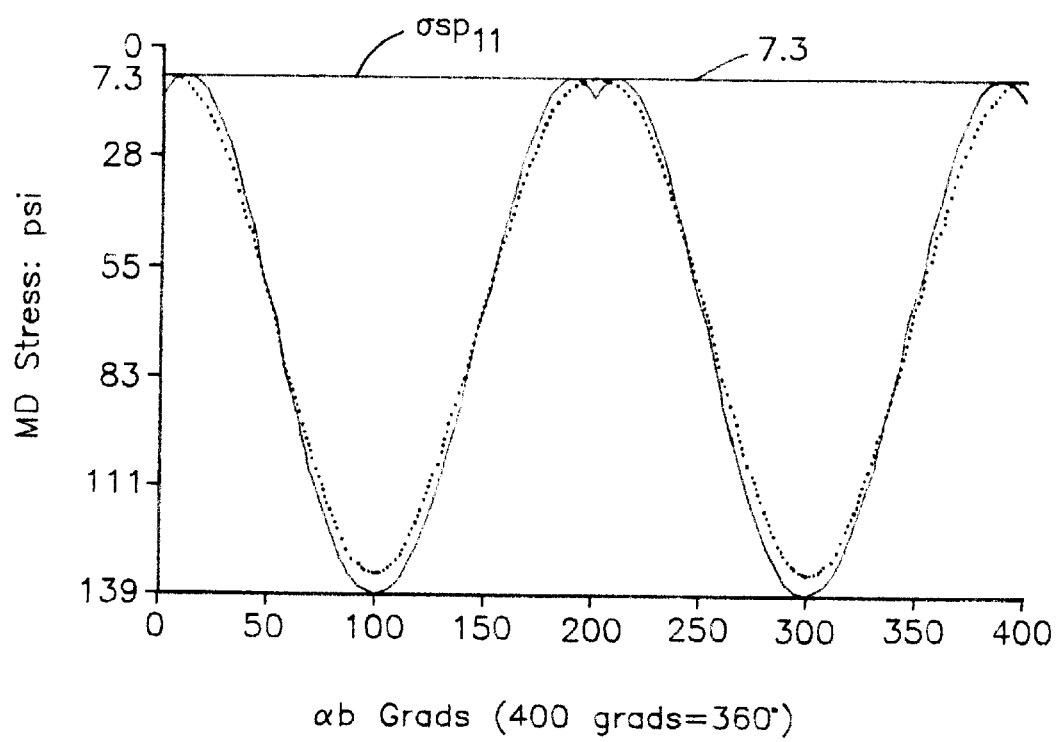
FIG. 8 is a graph illustrating reference stresses at the frost band terminus approximated according to my methods of approximating stress and my methods of approximating streamline reference path lengths using chordal and integral approximation methods, as a function of the angular position of the streamlines, for the same A-Frame collapsing as depicted in FIG. 6.

FIG. 8 shows the reference machine direction stresses in LDPE Film (E=17,500 psi) at the frost band terminus for integral and chordal approximation methods based on my approximations of stresses which are based on my approximations of reference path streamline lengths for the A-Frame collapser of FIG. 6. The integral approximation method stresses are shown by the dotted line. The machine direction stress due to the internal static pressure within the film, $\sigma sp_{11}$, is 7.3 psi, shown by the horizontal line. The total machine direction stress ranges from 7.3 psi to 139 psi.

Nip Roll Analysis

Figure 9:
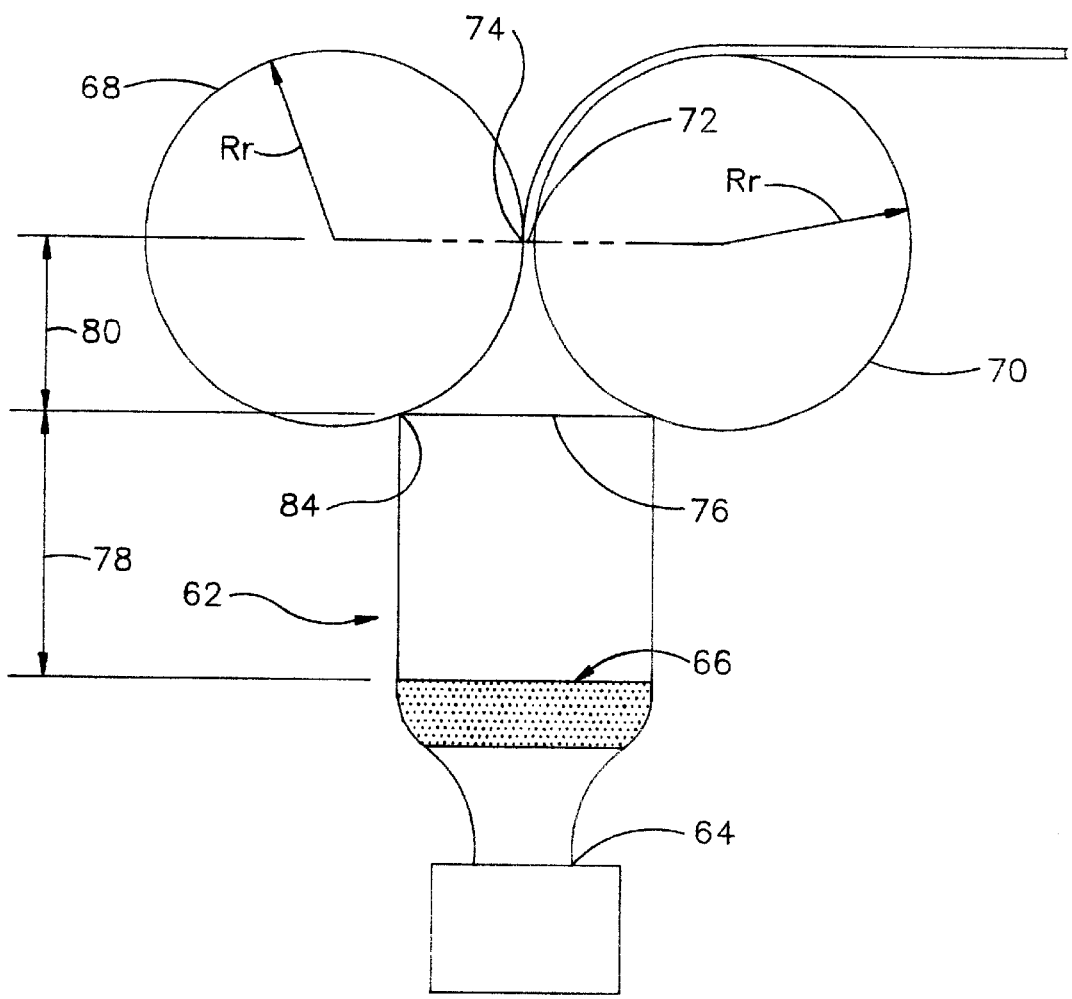
FIG. 9 is a diagrammatic elevational side view of a blown tube film undergoing nip roll collapsing.

FIG. 9 shows a continuously moving blown tube film 62 which has been extruded from die 64 and blown up to its final diameter, with complete solidification occurring at frost band terminus 66, and downstream collapsing between nip rollers 68 and 70. In pure nip roll collapsing, the nip rolls constitute the collapser, with the layflat line 72 coinciding with nip-line 74, located between rollers 68 and 70. Film 62 has a generally circular cross-sectional shape at base circle 76, which is located at the entrance plane between tube region 78 and collapsing region 80, where film 62 initially contacts nip rollers 68 and 70. The height of tube region 78 is denoted Ht, and the height of collapsing region 80 is denoted Hr. The cross-sectional shape of film 62 at layflat line 72 is essentially a straight line, having a width equal to one-half the circumference of film 62. Layflat line 72 occurs at the interface between collapsing region 80 and the layflat region, which, in nip roll collapsing, occurs coincidentally with layflat line 72 at nip line 74.

Figure 10:
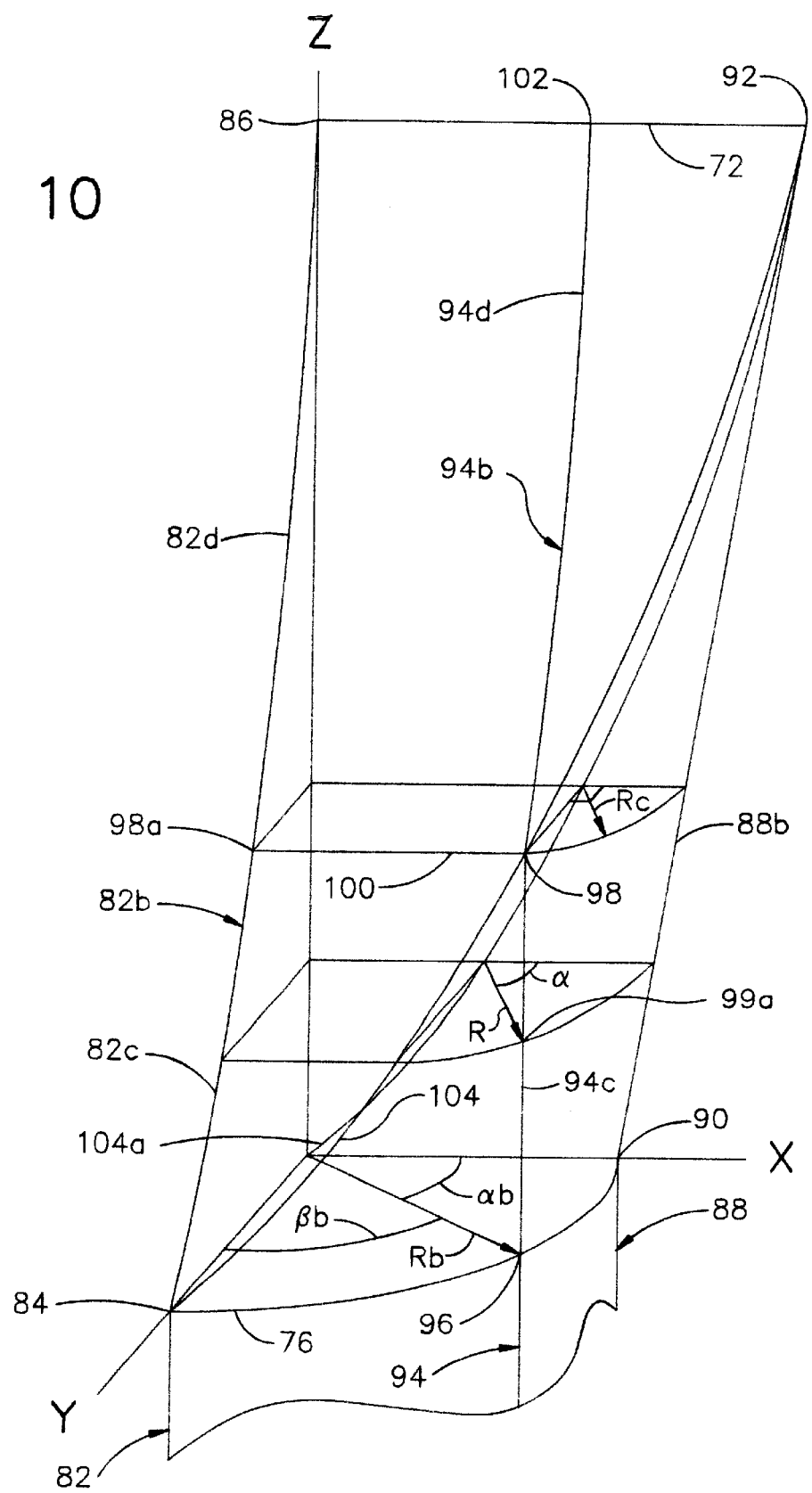
FIG. 10 is a diagrammatic perspective view of a quadrant of the blown tube film illustrated in FIG. 9.

FIG. 10 diagrammatically illustrates the positive X, positive Y. positive Z quadrant of collapsing region 80. The reference path of streamline SL(100) 82 passes through the YZ plane, initially contacting nip roll 68 (FIG. 9) at point 84 on base circle 76. The reference path of SL(100) 82 includes arcuate face section segment 82b within collapsing region 80, extending between contact point 84 to point 86 on layflat line 72. The reference path of arcuate face section segment 82b is defined by the radius Rr of nip roll 68, and lies in the Y-Z plane.

Within collapsing region 80, the reference path of SL(0) 88 includes sail section segment 88b which extends from point 90 on base circle 76 to contact point 92 on layflat line 72. The reference path of sail section segment 88b of SL(0) 88 does not contact the collapsing geometry boundary until it reaches layflat line 72 at point 92.

Streamline SL(αb) 94 represents any streamline within the quadrant shown, and includes collapsing region streamline 94b located within collapsing region 80. Collapsing region streamline 94b is located at an angle αb from the positive X axis, and passes through base circle 76 at point 96. Collapsing region streamline 94b includes sail section segment 94c and face section segment 94d. The reference path of sail section segment 94c extends from point 96 to contact point 98, at which the reference path of collapsing region portion 94b first contacts the collapsing geometry boundary as defined by nip roll 68. Contact point 98 forms one end of lateral face chord 100, half of which is shown in FIG. 10, with the other half extending symmetrically into the negative X positive Y positive Z quadrant (not shown). The reference path of face section segment 94d follows an arcuate path of radius Rr along the collapsing geometry boundary from contact point 98 to point 102 on layflat line 72. The locus of all contact points is curved contact line 104 which forms the boundary between the sail section and the face section of film 82.

According to my method, the reference paths of all face section segments of the streamlines are assumed to be arcuate, coincidental with the collapsing geometry boundary which has a radius Rr, and lie in respective planes which are perpendicular to layflat line 72. In FIG. 10, the reference path length of face section segment 94d from contact point 98 to point 102 on layflat line 72 is assumed equal to the reference path length of upper corresponding portion 82d of face section segment 82b, extending from point 98a to point 86.

The reference path lengths of all sail section segments are believed to be shorter than the reference path length of lower corresponding portion 82c of face section segment 82b extending from point 84 to point 98a on face section lateral segment 100. End 98 of face section lateral segment 100 corresponds to the end of sail section segment 94c. Since, according to one aspect of my invention, the reference path lengths of all face section segments of the streamlines are assumed to be equal to the reference path length of respective upper corresponding portion 82d of face section segment 82b, the difference between the total reference path length of SL(αb) 94 and the total reference path length of SL(100) 82 may be approximated as being equal to the difference between the reference path length of sail section segment 94c and the reference path length of lower corresponding portion 82c.

Figure 11:
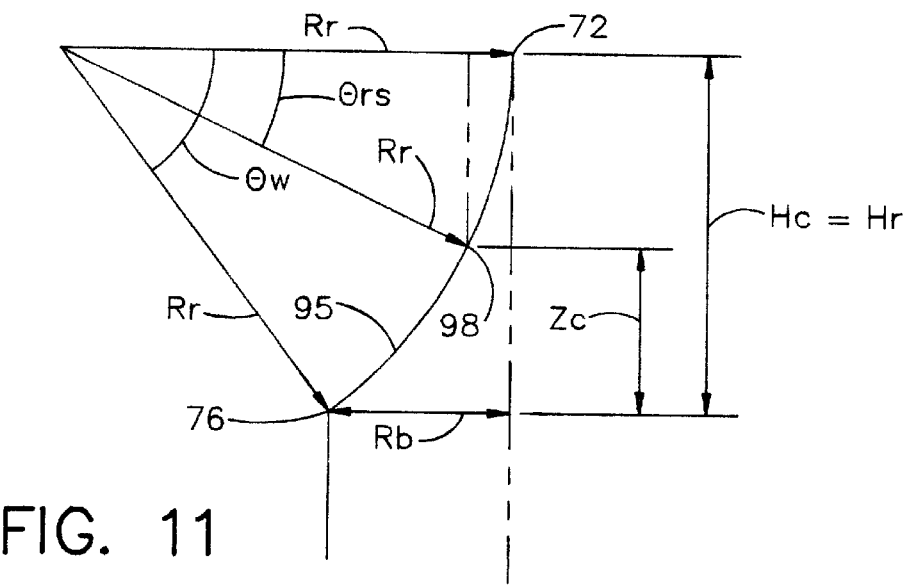
FIG. 11 is a diagrammatic elevational side view of a tube undergoing nip roll collapsing.

Referring to FIG. 11, collapsing geometry boundary 95 is shown extending between base circle 76 and nip line 72 with a radius Rr, which is the radius of the nip rolls. The height of collapsing region 80 is given by the formula:

$$Hr = Rr * SIN(\theta w) \tag{E23}$$

The wrap angle of the reference path of collapsing region streamline 82b of SL(100) 82, θw, is given by the formula:

$$\theta w = COS^{-1}\left[1 - \frac{Rb}{Rr}\right] \tag{E24}$$

Concomitantly, the reference path length of collapsing region streamline 82b of SL(100) 82 is given by:

$$L100 = Rr * \theta w \tag{E25}$$

and the reference path length of collapsing region streamline 88b of SL(0) 88 (FIG. 10) is given by:

$$L0 = \sqrt{\left[\frac{\pi}{2} - 1\right]^2 * Rb^2 + Hr^2} \quad (E26)$$

Comparing FIG. 10 and FIG. 11, for the reference path of collapsing region streamline 94b of any given streamline SL(αb) 94 passing through base circle 7b at an angle αb, contact point 98 occurs a height Zc above base circle 76 as indicated by the dimension lines of FIG. 11. This height is given by the formula:

$$Zc = Hr - \sqrt{\left[Rb * \left[\frac{\alpha b}{\frac{\pi}{2}}\right]\right]} * \sqrt{\left[2 * Rr - Rb * \left[\frac{\alpha b}{\frac{\pi}{2}}\right]\right]} \quad (E27)$$

The x and y coordinates (Xc, Yc) of contact point 98 are given by formulas (E13) and (E14), as described above.

Referring to FIG. 10, the reference path of face section segment 94d between its respective contact point 98 and layflat line 72 is modeled as a planar, arcuate line. The reference path length, L2r(αb), is approximated as equal to the length given by the formula:

$$L2r(\alpha b) = Rr * \theta rs \quad (E28)$$

where θrs is the angle of wrap for the reference path of a streamline at αb, given by the formula:

$$\theta_{rs} = \text{TAN}^{-1}\left[\frac{Hr - Zc}{Rr - Yc}\right]$$

According to my chordal approximation method, the reference path of sail section segment 94c, between base circle 76 and its respective contact point 98, is modeled as a straight line between point 96 and contact point 98. The reference path length, L1(αb)c, is approximated as equal to the length given by the formula:

$$L1(\alpha b)c = \quad (E29)$$

$$\sqrt{Rb^2 * \left\{\beta b^2 - 2 * \beta b * \text{COS}(\alpha b) - 2 * \left[\frac{\alpha b}{\frac{\pi}{2}}\right] * \text{SIN}(\alpha b) + 1\right\} + 2 * Rr * Rb * \left[\frac{\alpha b}{\frac{\pi}{2}}\right] - 2 * Hr * \sqrt{Yc} * \sqrt{N} + Hr^2}$$

$$\text{where, } N = 2 * Rr - Rb * \left[\frac{\alpha b}{\frac{\pi}{2}}\right]$$

My integral approximation method for modeling the reference path of sail section segment 94c includes assuming that the length of the perimeter of film 62 is constant and that the shape of each cross-section of film 62 in collapsing region 80 is obround.

Figure 12:
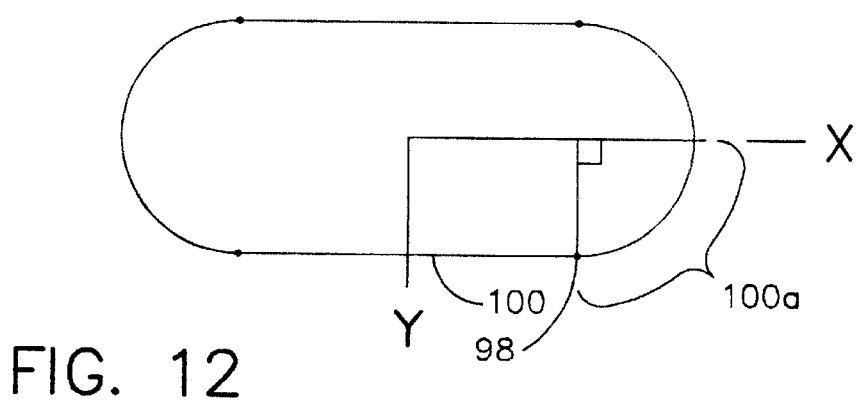
FIG. 12 is a cross-sectional view of the blown tube film of FIG. 9 in the collapsing region taken perpendicular to the Z axis at elevation Zc above the base circle.

FIG. 12 illustrates the assumed obround cross-section at height Zc, where the reference path of streamline SL(αb) 94 first contacts the collapsing geometry boundary. By analogy, the cross-section shown in FIG. 12 is similar to that shown in FIG. 4 for A-Frame collapsing. Contact point 98 forms the end of face section lateral segment 100 as well as the end of sail section lateral arc 100a. Sail section lateral arc 100a subtends an angle of π/2 and has a constant radius Rc, which is equal to Yc as described above (see equation (E14)). The radius is c entered on line 104a, which is the projection of contact line 104 on the XZ plane.

Figure 13:
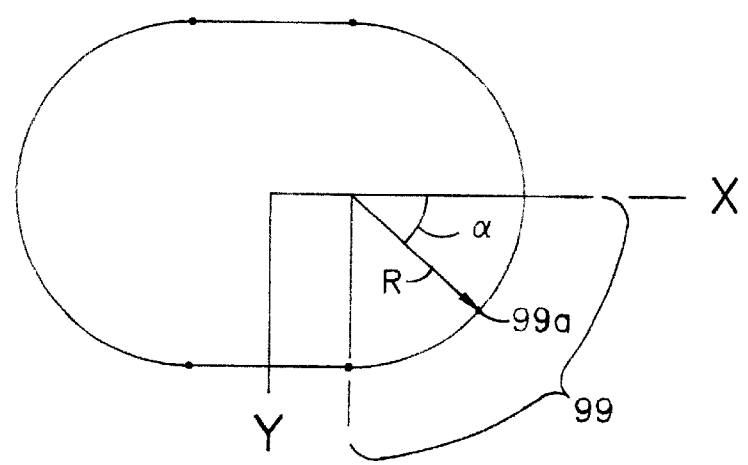
FIG. 13 illustrates the cross-sectional shape of the blown tube film of FIG. 9 at a height z above the base circle, where z<Zc.

FIG. 13 illustrates a typical obround cross-section taken at any height z between base circle 76 and contact point 98 of SL(αb) 94, i.e., 0<z<Zc. Since z<Zc, the reference path collapsing region streamline 94b passes through sail section lateral arc 99, intersecting at point 99a (see also FIG. 10), at an angle α, which varies as a function of z. For nip roll collapsing, α is given by the formula:

$$\alpha = \frac{Rb * \alpha b}{Rr - \sqrt{Rr^2 - [Hr - z]^2}} \quad (E30)$$

The radius, R, of sail section lateral arc 99 is centered on line 104a (FIG. 10), the locus of the center of all sail section lateral arcs. The radius varies as a function of z, according to the formula:

$$R = Rr - \sqrt{Rr^2 - [Hr - z]^2} \quad (E31)$$

Solving equation (E11) or (E19) for nip roll collapsing based on these assumptions of constant perimeter length and obround cross-sectional shape, the reference path length of sail section segment 94c, L1r(αb)i, is approximated as being equal to the length given by the formula:

$$L1r(\alpha b)i = \quad (E32)$$

$$\int_{z=0}^{z=Zc} \sqrt{\left[\frac{Hr - z}{\sqrt{Rr^2 - (Hr - z)^2}}\right]^2 * \left\{1 + \alpha^2 + \left[\frac{\pi}{2}\right]^2 - \pi * [\alpha * \text{SIN}\alpha + \text{COS}\alpha]\right\} + 1} \, dz$$

Figure 14:
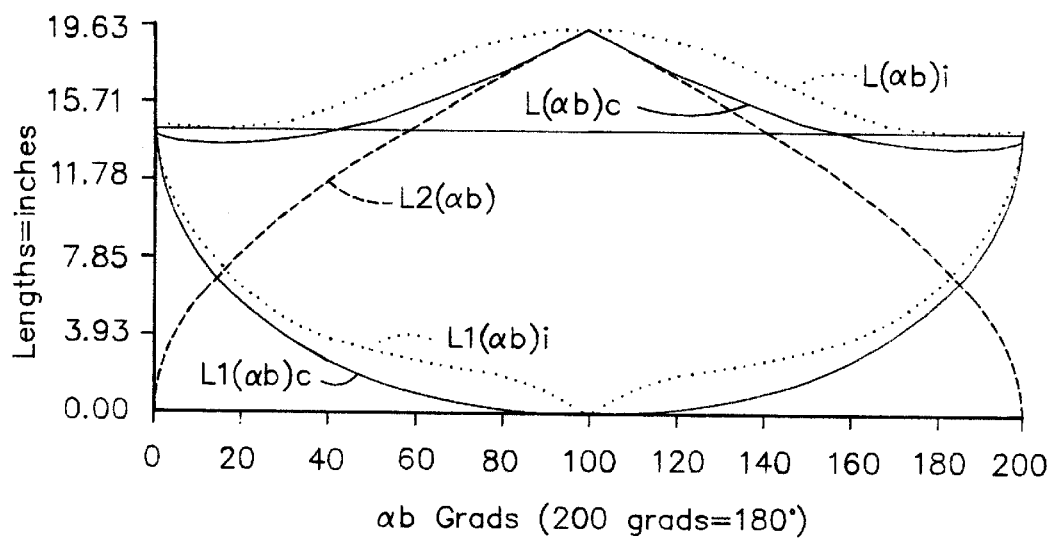
FIG. 14 is a graph illustrating the variation of streamline reference path lengths of a blown tube film undergoing nip roll collapsing, based on my chordal and integral approximation methods, as a function of the angular position of the streamlines.

FIG. 14 graphically illustrates the approximated reference path lengths of the sail section segments for both the chordal and integral approximation methods, the reference path lengths of the face section segments, and the total reference path lengths within the collapsing region, for nip roll collapsing with a 90° angle of wrap, a layflat width of 39.27 inches, a collapsing region height, Hc, of 12.5 inches, and a base circle radius of 12.5 inches.

Figure 15:
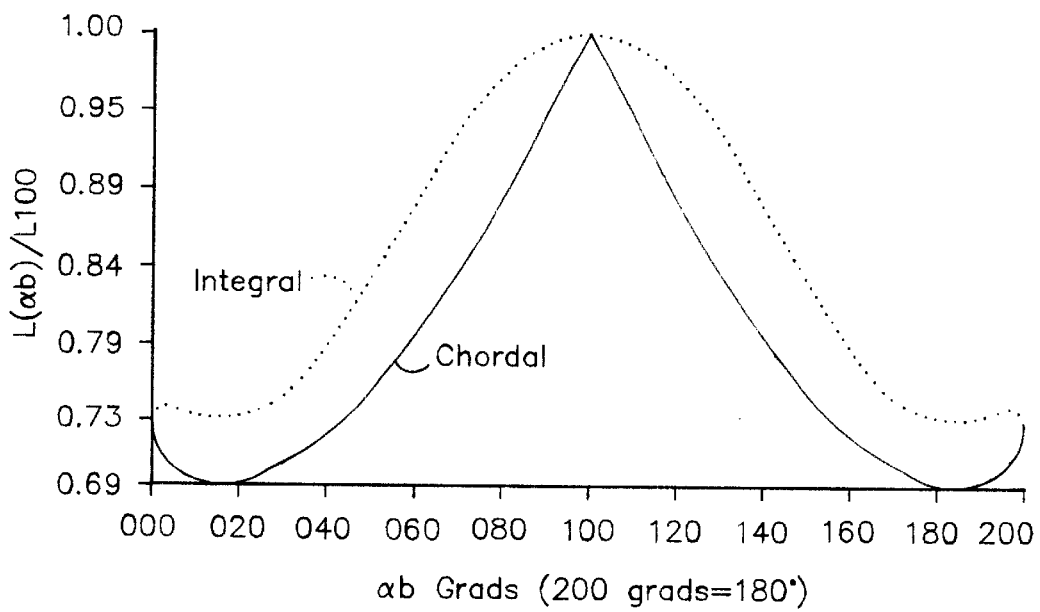
FIG. 15 is a graph illustrating the variation in the ratio of the streamline reference path lengths to the longest streamline reference path length, based on my chordal and integral approximation methods analysis, as a function of angular position of the streamline, for the nip roll collapsing of FIG. 14.

FIG. 15 illustrates the ratio of the approximated reference path lengths to the approximated reference path length of the longest streamline, for both the chordal and integral approximation methods, for the nip roll collapser of FIG. 14. The integral approximation method ratios are shown by the dotted line.

A-Frame With Nip Roll Collapsing

Figure 16:
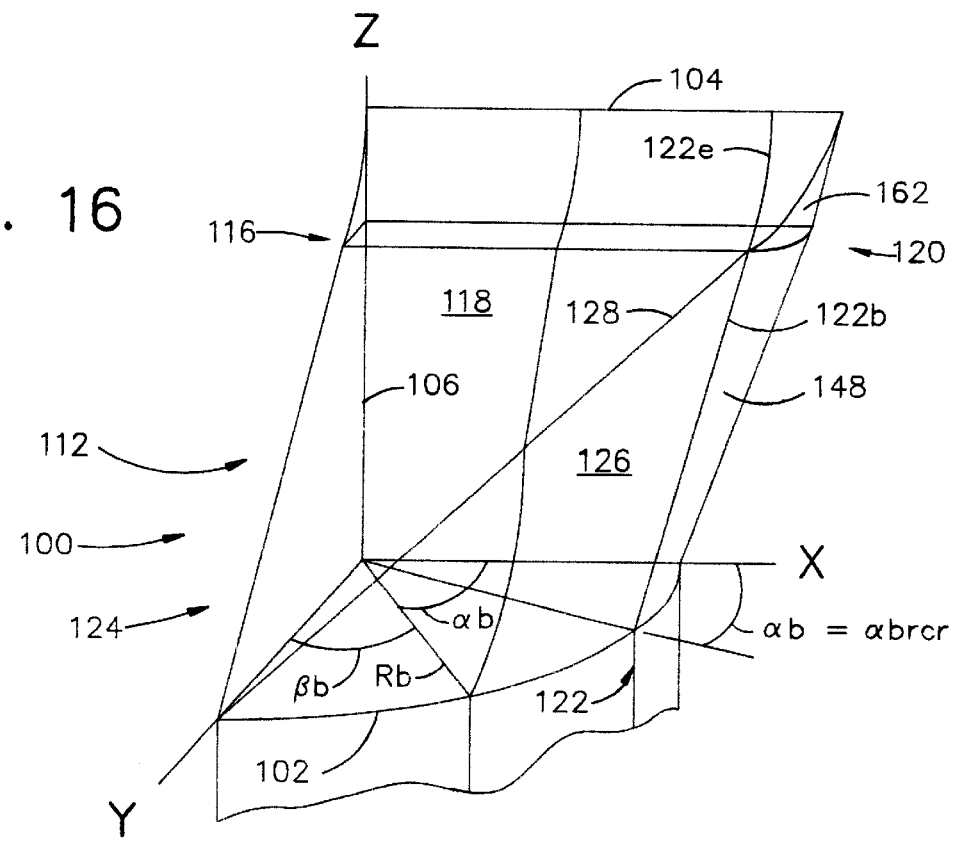
FIG. 16 is a diagrammatic perspective view of one quadrant of a blown tube film undergoing A-Frame with nip roll collapsing.

Referring to FIG. 16, which is a diagrammatic view of the positive X, positive Y, positive Z quadrant of blown tube film 100 undergoing A-Frame with nip roll collapsing, with the nip roll located tangentially to film 100 immediately adjacent the exit of the A-Frame collapser. It is noted that the following analysis is applicable even though the nip roll may not be located tangentially to film 100. It is also noted that the collapsing structure is not illustrated in FIG. 16, only the resulting collapsing geometry boundaries which comprise some of the underlying assumptions of my methods of approximation. Film 100 is illustrated between base circle 102 and layflat line 104 located at the nip line between the nip rollers. As with the previous descriptions, layflat line 104 is perpendicular to central longitudinal axis 106 (which is coincidental with the Z axis), and parallel to the X axis. FIG. 16 includes diagrammatic representations of streamlines which lie in the tube region below the XY plane.

Figure 17:
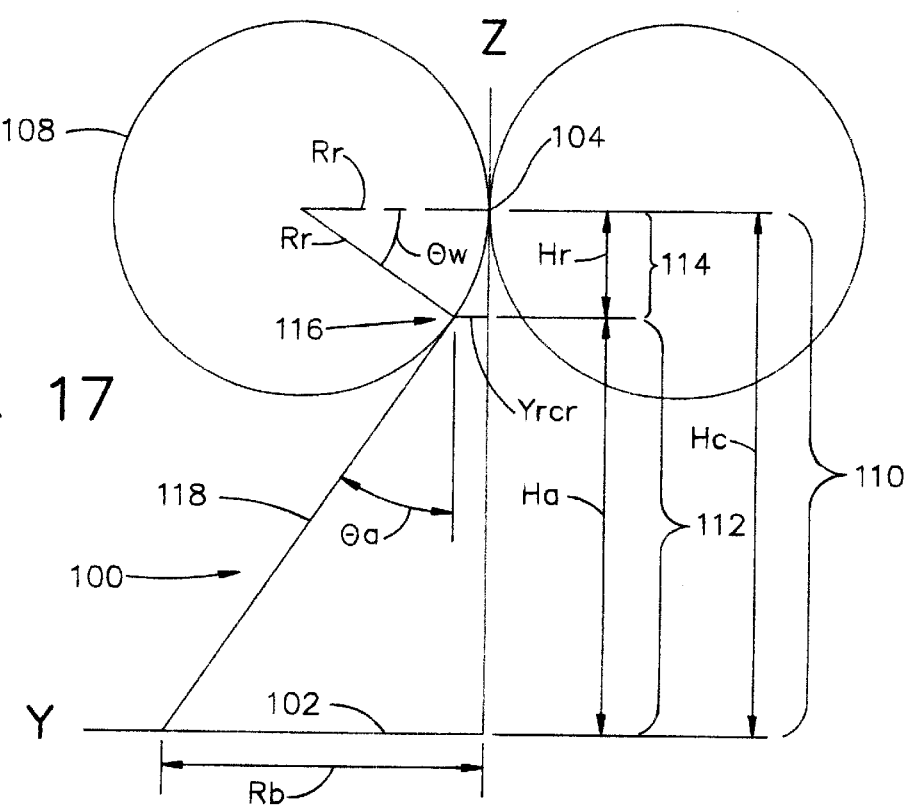
FIG. 17 is a diagrammatic elevational side view of a tube undergoing A-Frame with nip roll collapsing.
Figure 18:
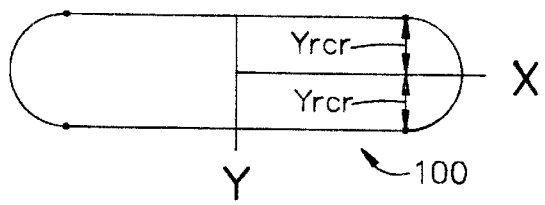
FIG. 18 is a cross-sectional view of the blown tube film of FIG. 16 at the exit of the A-Frame collapser/entrance to the nip roll collapser.

Referring also to FIG. 17, which diagrammatically includes one of nip rolls 108 adjacent film 100, the collapsing region 110 is located between base circle 102 (lying in the entrance plane) and layflat line 104, and designated as Hc. In A-Frame with nip roll collapsing, collapsing region 110 is comprised of A-Frame collapsing region 112, whose height is designated as Ha extending from base circle 102 to A-Frame collapser exit at 116, and nip roll collapsing region 114, whose height is designated Hr extending from nip roll collapser entrance (which is illustrated as being coincidental with A-Frame collapser exit 116, both of which will be designated herein by the numeral 116) to layflat line 104. Nip roll 108 engages film 100 tangentially at A-Frame collapser exit 116 as shown. In such case, the angle of wrap, θw, for the reference path of SL(100) about nip roll 108 is equal to the angle of vertical inclination θa of A-Frame face section 118, as illustrated in FIG. 17. FIG. 18 illustrates the full cross-sectional shape of film 100 at A-Frame exit/nip roll entrance 116, which is assumed to be obround as shown. The total exit depth is 2×Yrcr.

Some general equations which apply to A-Frame with nip roll collapsing are as follows:

$$Ha = \frac{(Rb - Yrc)}{TAN(\theta a)} \tag{E33}$$

$$Hr = Rr * SIN(\theta w) \tag{E34}$$

$$\theta w = COS^{-1}\left[1 - \frac{Yrcr}{Rr}\right] \tag{E35}$$

$$Yrcr = Rb * \left[\frac{\alpha brcr}{\frac{\pi}{2}}\right] \tag{E36}$$

-continued $$L100a = \sqrt{\left[\frac{\beta brcr}{\frac{\pi}{2}}\right]^2 * Rb^2 + Ha^2} \tag{E37}$$

$$L100r = Rr * \theta w \tag{E38}$$

Where:
Ha is the height of the A-Frame collapsing region;
Hr is the height of the nip roll collapsing region;
L100a is the reference path length of the A-Frame face section segment of SL100;
L100r is the reference length of the nip roll face section segment of SL100;
Rr is the radius of the nip rolls;
θw is the angle of wrap about the nip roll of the reference path of SL100;
θa is the angle of inclination from the vertical of the A-Frame collapsing geometry boundary;
Yrcr is one half of the A-Frame exit depth; and
αbrcr is the base circle angular location of the corner streamline.
βbrcr is the complement to αbrcr Referring again to FIG. 16, film 100 includes corner section 120 which comprises streamlines whose reference paths do not contact the A-Frame collapsing geometry, i.e. no streamline reference paths which pass through corner section 120 become part of A-Frame face section 118. Corner section 120 is comprised of streamlines whose location at the base circle, αb, extends from αb=0 to αb=αbrcr whereat corner streamline 122 forms one boundary of corner section 120. A-Frame section 124 comprises all of the streamlines whose reference paths contact the A-Frame collapser geometry boundary.

A-Frame section 124 includes A-Frame face section 118 and A-Frame sail section 126, as described above with respect to A-Frame collapsing. A-Frame sail section 126 is that section of film 100 in A-Frame collapsing region 112 between base circle 102 and contact line 128. Also as described above, A-Frame face section 118 is that section of film 100 in A-Frame collapsing region 112 between A-Frame contact line 128 and exit 116, and comprises the section of film 100 which is modeled as being planar and coincidental with A-Frame collapser geometry boundary.

Figure 19:
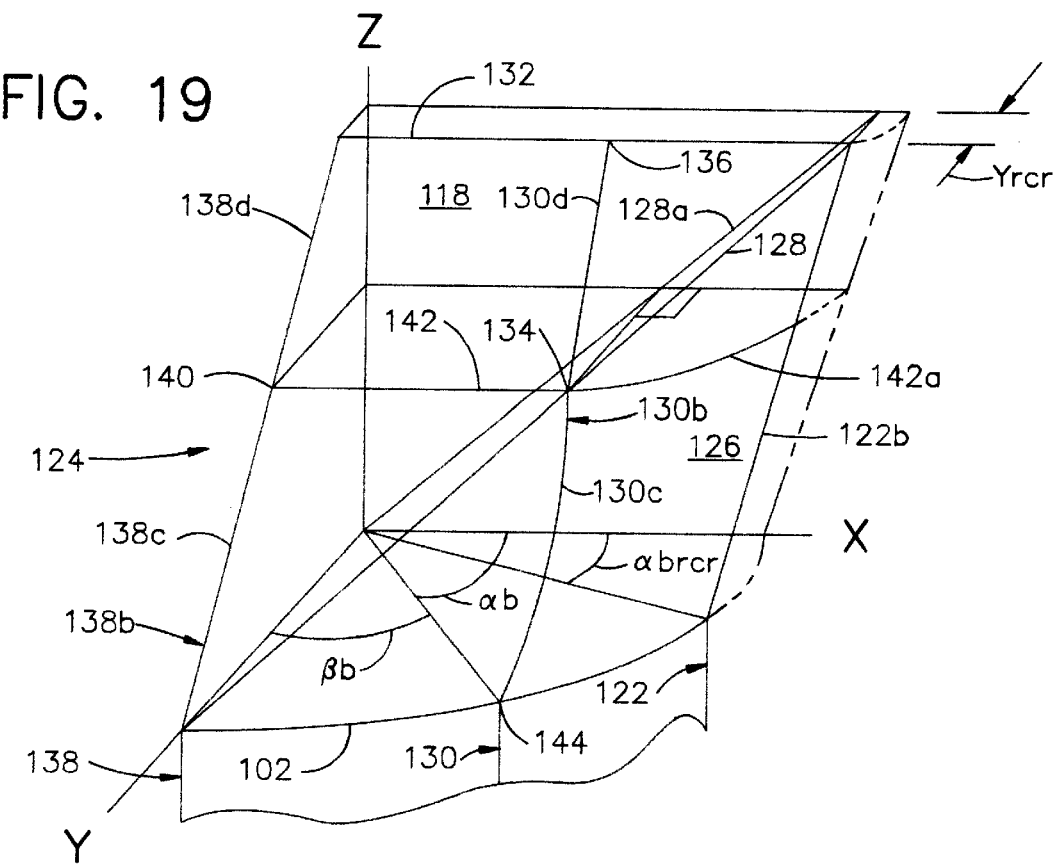
FIG. 19 is a diagrammatic perspective view of the A-Frame section of the blown tube film of FIG. 16.

Referring now to FIG. 19, there is shown A-Frame section 124 which, as previously mentioned, consists of A-Frame sail section 126 and A-Frame face section 118. With the exception of the boundaries, streamlines 122 and 138, the reference path of each streamline 130 within A-Frame section 124 (i.e. αbrcr≦αb≦π/2) includes A-Frame sail section segment 130c and A-Frame face section segment 130d. Together, segments 130c and 130d make up A-Frame collapsing region streamline 130b of streamline 130, extending from base circle 102 to A-Frame exit lateral face chord 132.

Contact point 134 is the adjoining ends of the reference paths of A-Frame sail section segment 130c and A-Frame face section segment 130d, as well as one end of A-Frame face section lateral segment 142, and the adjoining end of lateral sail section arc 142a. As mentioned above, the x and y coordinates within A-Frame section 124 for contact point 134 (Xc, Yc) may be determined according to formulas (E13) and (E14). The z coordinate, Zc, within A-Frame section 124 is given by the formula:

$$Zc = \left[\frac{\beta b}{\beta brcr}\right] * Ha \tag{E39}$$

The analysis of the reference path lengths of the various segments of A-Frame collapsing region streamline 130b for A-Frame with nip roll collapsing is substantially similar to the analysis described above for A-Frame collapsing alone. Within A-Frame face section 118, the reference paths of all A-Frame face section segments are co-planar and parallel. The reference path length of A-Frame face section segment 130d is equal to the reference path length of upper corresponding portion 138d of SL(100) 138 which lies between the intersection point 140 of SL(100) 138b and A-Frame face section lateral segment 142 of which contact point 134 forms one end. The difference in reference path lengths between A-Frame section streamline 130 and SL100 138 may be approximated as the difference in reference path lengths between A-Frame sail section segment 130c and lower corresponding portion 138c of streamline SL(100) 138 which extends from base circle 102 to the cross-section in which contact point 134 lies.

The reference path of A-Frame face section segment 130d may be modeled as a straight line, whose length, L2($\alpha$b), is equal to the length given by the formula:

$$L2(\alpha b) = \left[\frac{\alpha b - \alpha brcr}{\beta brcr}\right] * L100a \tag{E40}$$

As described above with A-Frame collapsing, according to my chordal approximation method, the reference path of A-Frame sail section segment 130c may be modeled as a straight line between intersection 144 of streamline 130 and base circle 102 and contact point 134. Its reference path length, L1($\alpha$b)c, is equal to the length given by the formula:

$$L1(\alpha b)c = \sqrt{Rb^2 * \left\{[\beta b - \cos(\alpha b)]^2 + \left[\left(\frac{\alpha b}{\frac{\pi}{2}}\right) - \sin(\alpha b)\right]^2\right\} + \left\{\left(\frac{\beta b}{\frac{\pi}{2}}\right) * Ha\right\}^2} \tag{E41}$$

Figure 21:
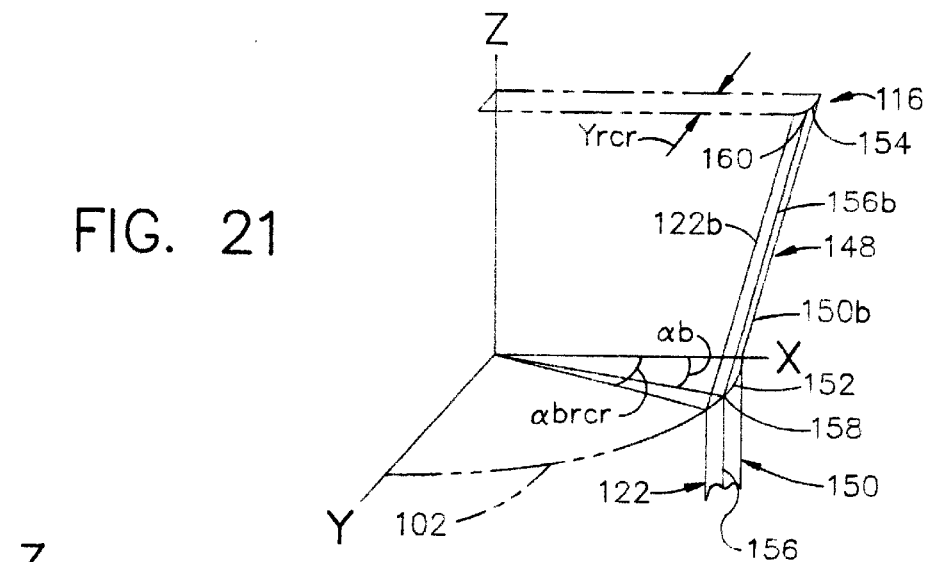
FIG. 21 is a diagrammatic perspective view of the A-Frame corner section of the blown tube film of FIG. 16.

According to my integral approximation method, the reference path length of A-Frame sail section segment 130c may be approximated by solving equation (E11) or (E19) based on the assumption of a constant perimeter length and obround cross-sectional shape for film 100 within A-Frame collapsing region 112 (see FIG. 16) which includes A-Frame corner section 148 (see FIG. 21). By analogy to the discussion above with respect to the obround cross-sectional shapes of pure A-Frame collapsing and pure nip roll collapsing, the reference path of each streamline SL($\alpha$b) 130 in A-Frame sail section 126, and the reference path of each streamline in A-Frame corner section 148, passes through a lateral arc which subtends an angle of $\pi/2$.

As shown in FIG. 19, line 128a, which is the projection of contact line 128 on the XZ plane, is the locus of the centers of all such lateral arcs in A-Frame collapsing region 112. Prior to contact with the A-Frame collapsing geometry boundary for streamlines where $\alpha brcr \leq \alpha b \leq \pi/2$, and prior to the exit of the A-Frame (i.e. z=Ha) for streamlines where $0 \leq \alpha b \leq \alpha brcr$, the angular position, $\alpha$, of each reference path in the lateral arc at each cross-section varies as a function of z, according to the formula:

$$\alpha = \left\{\frac{\alpha b}{\left[1 - \frac{\beta brcr}{\frac{\pi}{2}} * \frac{z}{Ha}\right]}\right\} \tag{E42}$$

The radius, R, of each lateral arc varies as a function of z, according to the formula:

$$R = Rb * \left[1 - \frac{\beta brcr}{\frac{\pi}{2}} * \frac{z}{Ha}\right] \tag{E43}$$

Thus, based on the assumptions of a constant perimeter and obround cross-sectional shape, the reference path length of A-Frame sail section segment 130c, L1($\alpha$b)i, may be approximated as equal to the length given by the formula:

$$L1(\alpha b)i = \int_{z=0}^{z=Zc} \sqrt{\left[\frac{Rb}{Ha} * \frac{\beta brcr}{\frac{\pi}{2}}\right]^2 * \left\{1 + \alpha^2 + \left[\frac{\pi}{2}\right]^2 - \pi * [\alpha * \sin\alpha + \cos\alpha]\right\} + 1}\, dz \tag{E44}$$

Figure 20:
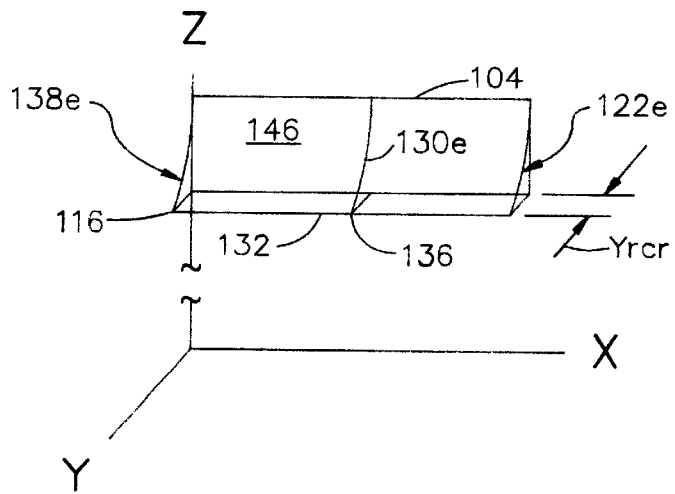
FIG. 20 is a diagrammatic perspective view of the nip roll face section of the blown tube film of FIG. 16.

In order to approximate the reference path length in the total collapsing region 110 between base circle 102 and layflat line 104, for the streamlines which pass through A-Frame section 124 (i.e. $\alpha brcr \leq \alpha b \leq \pi/2$), the reference path lengths in nip roll collapsing region 114 must be approximated. Referring to FIG. 20, there is shown nip roll face section 146, which is downstream of A-Frame section 124. All reference paths which pass through A-Frame section 124 pass through nip roll face section 146. The cross-sectional shape of film 100 at nip roll collapser entrance 116 is assumed to be the obround shape as shown in FIG. 18. The arcuate end of this obround cross-section lies in corner section 120, and will be analyzed below. For nip roll face section 146 shown in FIG. 20, film 100 is assumed to enter nip roll collapsing region 114 as a straight line, face section lateral segment 132. All of the reference paths of nip roll face section segments, such as 130e of streamline 130, have a constant length and lie in respective planes which are perpendicular to layflat line 104. The reference path length of nip roll face section segment, L3($\alpha$b), of any reference path passing through nip roll face section 146 (and concomitantly, A-Frame section 124 (i.e. $\alpha brcr \leq \alpha b \leq \pi/2$)) may be approximated as equal to the length given by the formula:

$$L3(\alpha b) = Rr * \theta w \tag{E45}$$

Thus, in order to approximate the total reference path lengths in collapsing region 110, for $\alpha brcr \leq \alpha b \leq \pi/2$, the reference path lengths of the respective segments approximated according to the formulas above may be added together as appropriate.

Referring to FIG. 21, A-Frame corner section 148 of corner section 120 is illustrated as being located between base circle 102 and A-Frame collapser exit 116, bounded by corner streamline 122 and edge streamline SL(0) 150. As mentioned above, except for corner streamline 122, reference paths which pass through corner section 120 do not contact the A-Frame collapser geometry boundary. The cross-sectional shape of A-Frame corner section 148 changes from base circle arc 152 with radius Rb and angle αbrcr at base circle 102 to a lateral arc 154 at exit 116 of radius Yrcr and angle π/2. Based on the assumption of a constant perimeter length, the length of base circle arc 152 is equal to the length of lateral arc 154.

According to my chordal approximation method, the reference path of any A-Frame corner section segment 156b of any streamline 156 located at 0≦αb≦αbrcr, may be modeled as a straight line between the intersection 158 of streamline 156 with base circle 102 and intersection 160 of corner section segment 156b with lateral arc 154. The reference path length, L1(αb)c, is equal to the length given by the formula:

$$Ll(ab)c = \sqrt{Rb^2 * \{1 + \beta brcr^2 + Qa\} + Ha^2} \quad (E46)$$

$$\text{Where, } Qa = \left[\frac{abrcr}{\frac{\pi}{2}}\right] * \left\{\left[\frac{abrcr}{\frac{\pi}{2}}\right] + 2 * \right.$$

$$\left.(\beta brcr * \cos ab - \cos an * \cos ab - \sin an * \sin ab)\right\} -$$

$$2 * \beta brcr * \cos ab, \&$$

$$an = \left[\frac{ab}{abrcr}\right] * \frac{\pi}{2}$$

My integral approximation method may be used to approximate the reference path length of A-Frame corner section segment 156b between base circle arc 152 and lateral 154 by solving equation (E11) or (E19). Based on the assumptions of a constant perimeter length and obround cross-sectional shape of film 100 in A-Frame collapsing region 112, the reference path length of A-Frame corner section segment 156b, L1(αb)i, may be approximated as equal to the length given by the formula:

$$Ll(ab)i = \int_{z=0}^{z=Ha} \sqrt{\left[\frac{Rb}{Ha} * \frac{\beta brcr}{\frac{\pi}{2}}\right]^2 * \{1 + \alpha^2 + \left[\frac{\pi}{2}\right]^2 - \pi * [\cos \alpha + \alpha * \sin \alpha]\} + 1} \, dz \quad (E47)$$

Figure 22:
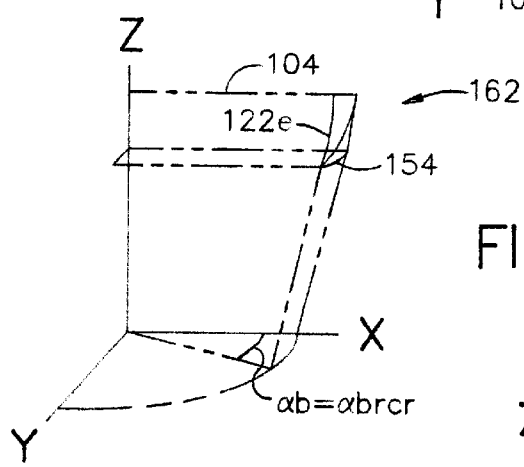
FIG. 22 is a diagrammatic perspective view of the nip roll corner section of the blown tube film of FIG. 16.

Referring now to FIG. 22, there is shown nip roll corner section 162 which is downstream of A-Frame corner section 148 and comprises the same streamlines whose reference paths pass through A-Frame corner section 148, i.e., 0≦αb≦αbcr. (Corner section 120 comprises A-Frame corner section 148 (shown in FIG. 21) and nip roll corner section 162).

Figure 23:
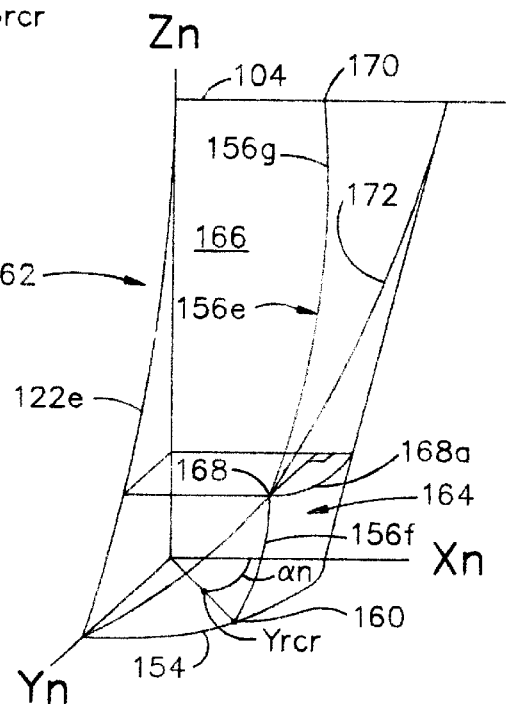
FIG. 23 is an enlarged diagrammatic perspective view of the nip roll corner section of FIG. 22.

In FIG. 22, nip roll corner section 162 is shown in its actual position relative to the X, Y and Z axes as illustrated in FIG. 16. FIG. 23 is an enlarged view of nip roll corner section 162.

Referring to FIG. 23, nip roll corner section 162 includes nip roll corner sail section 164 and nip roll corner face section 166. Nip roll corner section streamline 156e of streamline 156 includes nip roll corner sail section segment 156f extending between intersection point 160 on arc 154 and nip roll corner section contact point 168, and nip roll corner face section segment 156g extending from contact point 168 to point 170 on layflat line 104. Contact point 168 occurs at the collapsing geometry boundary. The locus of all such streamline contact points within nip roll corner section 162 is nip roll corner section contact line 172. It is noted that the analysis of reference path lengths in nip roll corner section 162 is similar to the analysis of reference path lengths in nip roll collapsing as described above, and illustrated in FIG. 10. By analogy, the origin of the reference frame, XYZn, which will be used herein for the analysis of nip roll corner section 162 is located at the center of lateral arc 154, the center having coordinates (Rb×βbrcr, O, Ha). The angular position αn of streamlines in nip roll corner section 162 relative to the XYZn reference frame may be related back to the angular position of these streamlines at base circle 102 by the formula:

$$an = \left[\frac{ab}{abrcr}\right] * \frac{\pi}{2} \quad (E48)$$

The x, y and z coordinates of the intersection of any particular streamline with lateral arc 154, Xn, Yn, Zn, for 0≦α≦αbrcr are given by the formulas:

$$Xn = Rb * \left\{\beta brcr + \left[\frac{abrcr}{\frac{\pi}{2}}\right] * \cos\left[\frac{ab}{abrcr} * \frac{\pi}{2}\right]\right\} \quad (E49)$$

$$Yn = Rb * \left\{\left[\frac{abrcr}{\frac{\pi}{2}}\right] * \sin\left[\frac{ab}{abrcr} * \frac{\pi}{2}\right]\right\} \quad (E50)$$

$$Zn = Ha \quad (E51)$$

The x and y coordinates (Xrc and Yrc) of contact point 168 in nip roll corner section are given by the same equations as for Xc and Yc, respectively, in equations (E13) and (E14) above. The z coordinate of contact point 168 can be determined according to the equation:

$$Zrc = Hr - \sqrt{Rb * \frac{ab}{\frac{\pi}{2}}} * \sqrt{2 * Rr - Rb * \frac{ab}{\frac{\pi}{2}}} + Ha \quad (E52)$$

It is noted that the reference paths of all nip roll corner face section segments are modeled as having an arcuate shape whose radius is equal to Rr, the radius of nip roll 108. The reference paths of all nip roll corner face section segments are assumed to lie in respective planes which are perpendicular to layflat line 104. The reference path length for any nip roll corner face section segment 156g, L3r(αb), may be approximated as equal to the length given by the following formula:

$$L3r(\alpha b) = Rr * \theta rs \quad (E53)$$

where $$\theta rs = SIN^{-1}\left[\frac{Hr - Zrc - Ha}{Rr}\right] \quad (E54)$$

The reference path length of nip roll corner sail section segment 156f between point 160 and contact point 168 may be approximated by either my chordal approximation method or my integral approximation method. According to my chordal approximation method, the reference path of nip roll corner sail section segment 156f is modeled as a straight line between intersection point 160 and contact point 168, whose reference path length, L2r(αb)c, is equal to the length given by the formula:

$$L2r(\alpha b)c = \sqrt{[Xrc - Xn]^2 + [Yrc - Yn]^2 + [Zrc - Zn]^2} \quad (E55)$$

My integral approximation method may be used to approximate the reference path length of nip roll corner sail section segment 156f by solving equation (E11) or (E19). According to my one aspect of my invention, the entire perimeter length of blown film tube 100 within collapsing region 110 is assumed to be constant. Since the lengths of the nip roll face section lateral segments are assumed to be constant, the perimeter of nip roll corner section 162 within the quadrant shown in FIG. 23 is assumed to be constant. Additionally, the cross-sectional shape of nip roll corner section 162 within the quadrant shown in FIG. 23 is assumed to be one quadrant of an obround shape, in relation to the nip roll corner section reference frame, XYZn.

The angular position of nip roll corner section streamline varies as a function of z, according to the formula:

$$\alpha = \frac{Rb * \alpha b}{Rr - \sqrt{Rr^2 - [Hr - z]^2}} \quad (E56)$$

The radius of nip roll corner section lateral arc 168a also varies as a function of z according to the formula:

$$R = Rr - \sqrt{Rr^2 - [Hr - z]^2} \quad (E57)$$

Solving equation (E11) or (E19) for the nip roll corner section based on the assumptions of constant perimeter length and obround cross-sectional shape within the XYZn reference frame quadrant of FIG. 23, the reference path length of nip roll corner sail section segment 156f, L2r(αb)i, may be approximated as equal to the length given by the formula:

$$L2r(\alpha b)i = \int_{z=0}^{z=Zrc-Ha} \sqrt{\left[\frac{(Hr-z)}{\sqrt{Rr^2 - [Hr-z]^2}}\right]^2 * \left\{1 + \alpha^2 + \left[\frac{\pi}{2}\right]^2 - \pi * [COS\alpha + \alpha * SIN\alpha]\right\} + 1} \, dz \quad (E58)$$

To approximate the total collapsing region 110 reference path length of streamline 156 passing through corner section 120 (i.e. 0≦αb≦αbrcr), the reference path lengths of the individual segments in A-Frame collapsing region 112 and nip roll collapsing region 114 may be added together.

Figure 24:
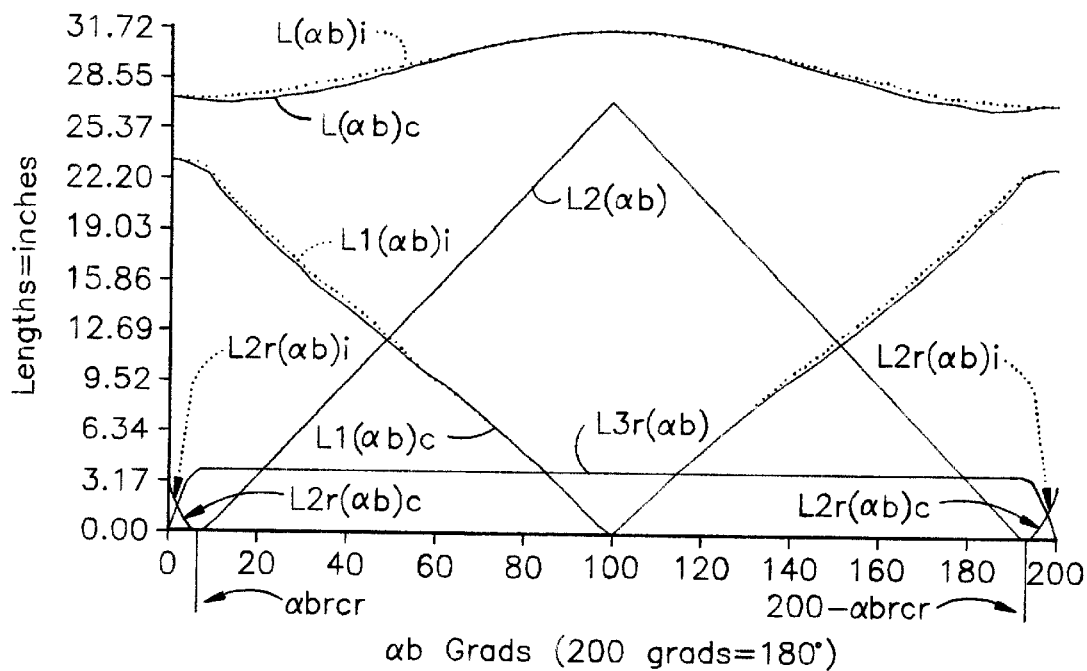
FIG. 24 is a graph illustrating the variation of streamline reference lengths within the collapsing region of a blown tube film undergoing A-Frame with nip roll collapsing, based on my chordal and integral approximation methods, as a function of the angular position of the streamlines.

FIG. 24 illustrates the reference path lengths of the streamline segments within the collapsing region for a blown tube film undergoing A-Frame with nip roll collapsing. The height of the A-Frame collapsing region, Ha, is 21.09 inches. The height of the nip roll collapsing region, Hr, is 3.86 inches, with Rr being 12 inches. The base circle radius is 19.10 inches, and the layflat width is 60 inches. The angle of inclination of the A-Frame, θa is 40°, and the angle of wrap is 40°. It is noted that due to the resolution of the graph as presented, L2r(αb)c and L2r(αb)i appear to coincide, but there are differences between the chordal approximation and the integral approximation of this length.

Figure 25:
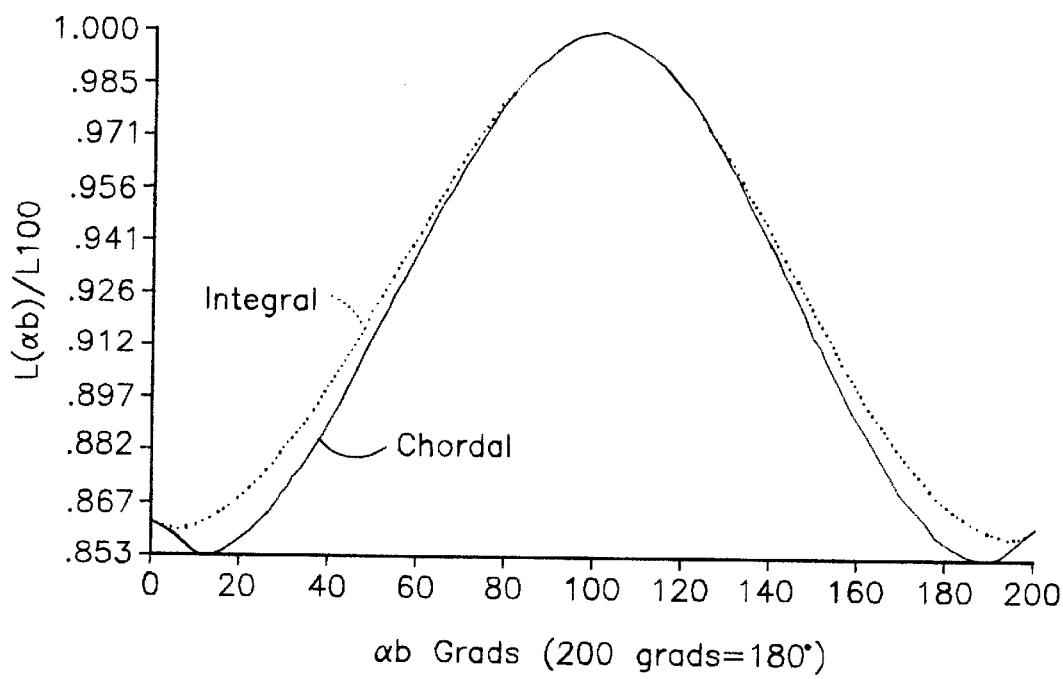
FIG. 25 is a graph illustrating the variation of the ratios of the streamline reference path lengths to the longest streamline reference path length within the collapsing region, based on chordal and integral analysis as a function of angular position of the streamline, for A-Frame with nip roll collapsing as depicted in FIG. 24.

FIG. 25 illustrates the ratio of the approximated reference path lengths to the approximated reference path length of the longest streamline, for both the chordal and integral approximation methods, for the A-Frame with nip roll collapsing FIG. 24. The integral approximation method ratios are shown by the dotted line.

Articulated Collapsing

Figure 26:
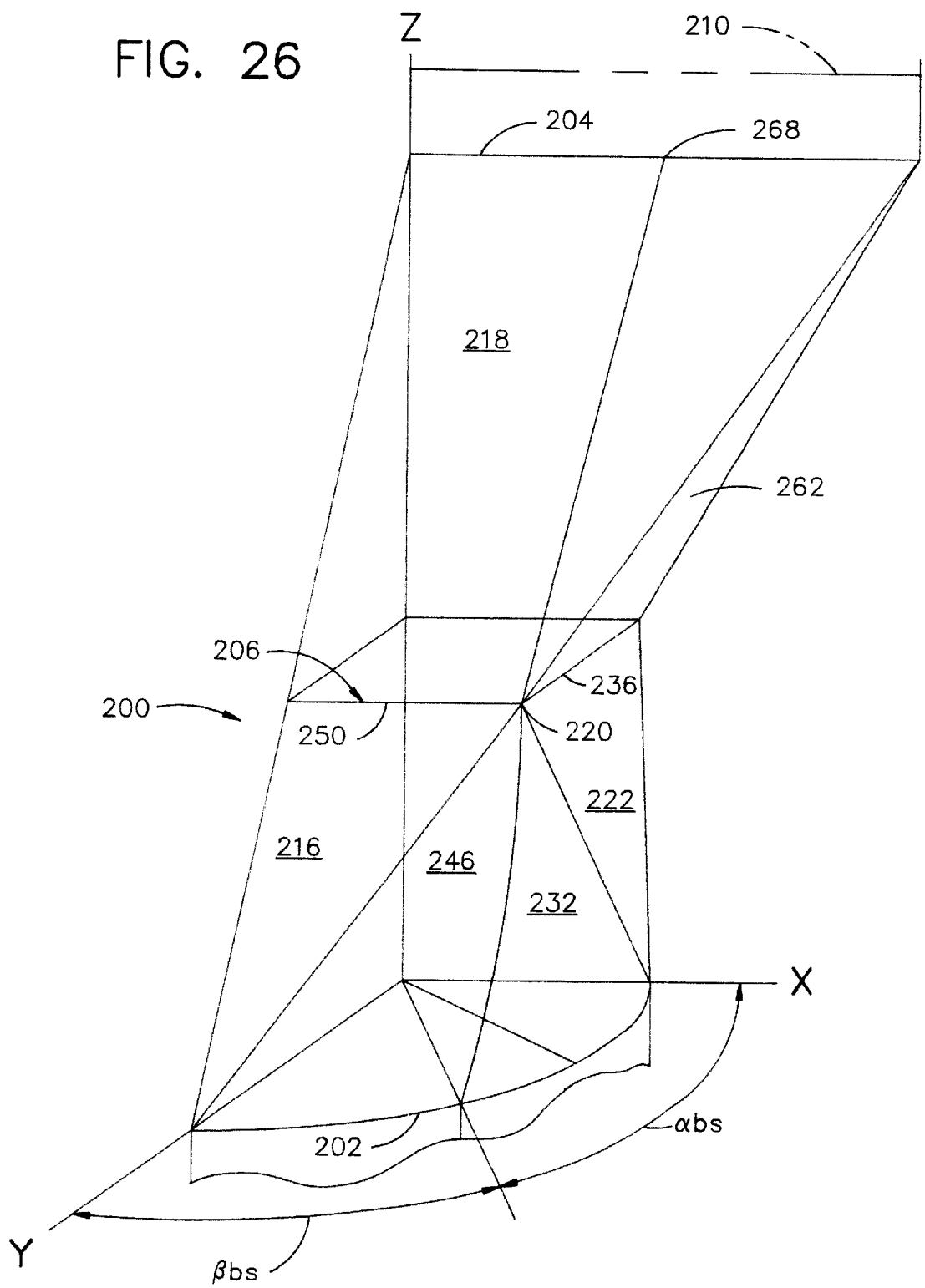
FIG. 26 is a diagrammatic perspective view of one quadrant of a blown tube film undergoing articulated collapsing.

Referring to FIG. 26, there is diagrammatically illustrated blown tube film 200 undergoing articulated collapsing, effected by an articulated collapser (not shown). In articulated collapsing, the shape of film 200 is changed from generally circular at base circle 202 to the layflat configuration at layflat line 204. Between base circle 202 and layflat line 204, film 200 is collapsed to a rectangular polygon shape 206 as shown in FIG. 27. This is accomplished by locating a first collapsing geometry boundary perpendicular to the YZ plane, and a second collapsing geometry boundary perpendicular to the XZ plane (see FIG. 26). For reference, any collapsing geometry boundary which is perpendicular to the YZ plane is referred to herein as the tent collapsing geometry boundary, while any collapsing geometry boundary which is perpendicular to the XZ plane is referred to as the wing collapsing geometry boundary.

Referring to FIG. 28, which is a diagrammatic elevational side view of film 200, collapsing region 208 extends from base circle 202 to layflat line 204 which occurs at the exit of the articulated collapser. Film 200 is advanced by nip rolls (not shown) located downstream of layflat line 204, creating nip line 210. Layflat region 211 exists between layflat line 204 and nip line 210. The height of collapsing region 208 is denoted by Hc. The height of layflat region 211 is denoted Hf. For analytical purposes, collapsing region 208 is divided into two subregions, lower collapsing region 212 and upper collapsing region 214. Lower collapsing region 212 extends from base circle 202, where film 200 has a generally circular shape, to rectangle 206, whereat film 200 is modeled as having the rectangular shape as illustrated in FIG. 27. Rectangle 206 is the boundary between lower collapsing region 212 and upper collapsing region 214. The height of lower collapsing region 212 is denoted by Hca1. Upper collapsing region 214 extends from rectangle 206 to lay flat line 204, and is denoted by Hca2. In upper collapsing region 214, film 200 undergoes a change in shape from rectangular at rectangle 206 to the layflat configuration at layflat line 204.

As illustrated in FIG. 28, lower collapsing region tent face section 216 has an angle of inclination of θa1 and upper collapsing region tent face section 218 has an angle of inclination θa2. Lower collapsing region tent face 216 is coplanar with upper collapsing region tent face 218, i.e., θa1=θa2. It is noted that upper collapsing region tent face section 218 does not have to be coplanar with lower collapsing region tent face section 216, i.e., θa1 does not equal θa2. For example, a mansard articulated collapser may be used wherein upper collapsing region tent face section 218*a* (shown as phantom lines) forms an angle (in either direction) with lower collapsing region tent face section 216 (as shown $\theta_{a1}<\theta_{a2}$).

Referring to FIG. 29, lower collapsing region 212 is illustrated. The portion of rectangle 206 which lies in the positive X, positive Y, positive Z quadrant, includes rectangle vertex 220 which is the intersection point between lower collapsing region tent face section 216 and lower collapsing region wing face section 222. As shown in FIG. 27, the side of rectangle 206 which is parallel to the X axis is referred to herein as tent face section lateral boundary 250 which is the boundary between lower collapsing region tent face section 216 and upper collapsing region tent face section 218. The length of the half of tent face section lateral boundary 250 which lies in the positive X, positive Y, positive Z quadrant is denoted Xs. The side of rectangle 206 which is parallel to the Y axis is referred to herein as wing face section lateral boundary 236, which is the boundary between lower collapsing region wing face section 222 and upper collapsing region wing face section 262. The length of the half of wing face section lateral boundary 236 which lies in the positive X, positive Y and positive Z quadrant is denoted Ys. The sum of Xs and Ys is equal to the arc length of base circle 202, given by the formula:

$$Xs + Ys = Rb * \frac{\pi}{2} \tag{E59}$$

A ratio between the X dimension and the Y dimension of rectangle 206 may be established according to the following formula:

$$Rs = \frac{Xs}{Ys} = \frac{\beta bs}{\alpha bs} \tag{E60}$$

It is noted that U.S. Pat. No. 4,170,624 recommends the following constraints on this ratio:

$$\frac{1}{3.5} \leq Rs \leq 3.5 \tag{E61}$$

Referring again to FIG. 29, the reference path of corner streamline 224 intersects base circle 202 at point 226, and follows the reference path to rectangle vertex 220. Streamline 224 represents the boundary within lower collapsing region 212 between the streamline reference paths which pass through lower collapsing region tent face section 216 and those streamline reference paths which pass through lower collapsing region wing face section 222. The reference path of streamline 224 has a base circle streamline position relative to the X axis which is designated as αbs (βbs relative to the Y axis). The length of the arc of base circle 202 from point 226 to the X axis is equal to the length of the side of rectangle 206 between rectangle vertex 220 and the XZ plane, i.e., Ys. Concomitantly, the length of the arc of base circle 202 from point 226 to the Y axis is equal to Xs. Thus, αbs and βbs are given by the following formulas:

$$\alpha bs = \frac{Ys}{Rb} \tag{E62}$$

$$\beta bs = \frac{Xs}{Rb} \tag{E63}$$

As mentioned previously, βb represents the complement to any angle αb, and is measured from the YZ plane. The streamline reference paths which lie in lower collapsing region wing section 228 are those whose base circle position is 0≦αb≦αbs. The streamline reference paths which lie in lower collapsing region tent section 230 are those whose base circle position is αbs≦αb≦π/2.

Lower collapsing region wing section 228 is comprised of lower collapsing region wing face section 222 and lower collapsing region wing sail section 232. Lower collapsing region wing sail section 232 lies within lower collapsing region wing section 228, bounded by base circle 202, lower collapsing region wing section contact line 234, and boundary streamline 224. Lower collapsing region wing section contact line 234 is the locus of the points of first contact of the streamline reference paths within lower collapsing region wing section 228 with the wing collapsing geometry boundary. Lower collapsing region wing face section 222 extends from lower collapsing region wing contact line 234 to wing face section lateral boundary 236 of rectangle 206, and to the XZ plane.

Streamline 238 passes through lower collapsing region wing section and includes wing sail section segment 238*c* and wing face section segment 238*d*. The approximation of the reference path length of lower collapsing region wing section streamline 238*b* (from base circle 202 to wing face section lateral boundary 236) is similar to the analysis for corresponding segments of streamlines undergoing A-Frame collapsing as described above. The reference path of wing face section segment 238*d* is modeled as a straight line between contact point 240 and intersection point 242, lying in a plane which is parallel to the XZ plane and perpendicular to wing side 236 of rectangle 206. The reference path length of wing face section segment 238*d*, L2w(αb), may be approximated as equal to the length given by the formula:

$$L2w(\alpha b) = \left[\frac{\alpha bs - \alpha b}{\alpha bs}\right] * L0a1 \tag{E64}$$

for 0 ≦ αb ≦ αbs.

where $$L0a1=\sqrt{[Rb-Xs]^2+Ha1^2} \tag{E65}$$

The reference path length of wing sail section segment 238*c* may be approximated using either my chordal approximation method or my integral approximation method. According to my chordal approximation method, the reference path length of sail section segment 238*c* is approximated as the length of a straight line between point 244 on base circle 202 and contact point 240. The reference path length, L1w(αb)c, is equal to the length given by the formula:

$$L1w(\alpha b)c = \sqrt{Rb^2 * \left\{\left[1 + \dfrac{\alpha b}{\frac{\pi}{2}} * \left(Rs * \left[\dfrac{\pi-2}{2}\right] - 1\right) - COS\alpha b\right]^2 + [\alpha b - SIN\alpha b]^2\right\} + \left[\left(\dfrac{Rs+1}{Rs}\right) * \left(\dfrac{\beta b}{\frac{\pi}{2}}\right) * Hal\right]^2} \quad (E66)$$

for $0 \leq \alpha b \leq \alpha bs$.

Figure 30:
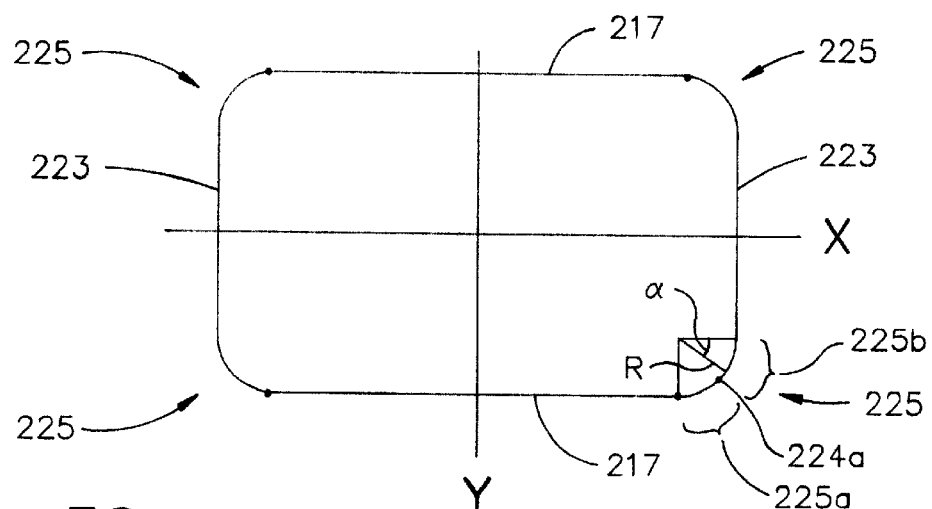
FIG. 30 illustrates the oblate round cross-sectional shape of the blown tube film of FIG. 29 in the lower collapsing region at a height z above the base circle.

My integral approximation method may be used to approximate the reference path length of wing sail section segment 238c by solving equation (E11). According to one aspect of my invention, the full cross-section of film 200 within lower collapsing region 212 is assumed to be as shown in FIG. 30. Each cross-section includes two parallel, spaced apart tent face section lateral segments 217, and two parallel, spaced apart wing face section lateral segments 223. Tent face section lateral segments 217 are perpendicular to wing face section lateral segments 223, the ends of which are respectively connected by respective constant radius sail section lateral arcs 225 subtending an angle of π/2. Point 224a on sail section lateral arc 225 represents the intersection of streamline 224 (FIG. 29) with sail section lateral arc 225 at the cross-section shown, separating sail section lateral arc 225 into tent sail section arc 225a and wing sail section lateral arc 225b. Tent sail section lateral arc 225a of sail section lateral arc 225 lies within lower region tent sail section 246 (FIG. 29) and wing sail section lateral arc 225b of sail section arc 225 lies within lower region wing sail section 232 (FIG. 29).

The locus of the centers of the sail section lateral arcs taken at all elevations within lower collapsing region 212 is line 257 which extends from the origin of the XYZ axes to corner point 220. The radius of the sail section lateral area is centered on line 257, varies as a function of z, and is given by the formula:

$$R = Rb * \left[\dfrac{Hal - z}{Hal}\right] \quad (E67)$$

The angular location, α, of any particular streamline reference path passing through a sail section lateral arc at an elevation z above the base circle, where $0 \leq z \leq Zc$ for the particular streamline reference path may be determined according to the formula:

$$\alpha = \dfrac{Rb}{R} * \left[\alpha b - \alpha bs * \dfrac{z}{Hal}\right] = \left[\dfrac{1}{1 - \dfrac{z}{Hal}}\right] * \left\{\alpha b - \alpha bs * \left[\dfrac{z}{Hal}\right]\right\} \quad (E68)$$

The Cartesian coordinates of any point on a streamline reference path as a function of its angular position on the base circle and the elevation are given by the equations:

$$X = \dfrac{Rb}{Hal} * \{\beta bs * z + [Hal - z] * COS\alpha\} \quad (E69)$$

$$Y = \dfrac{Rb}{Hal} * \{\alpha bs * z + [Hal - z] * SIN\alpha\} \quad (E70)$$

The coordinates of any contact point within lower collapsing region may be determined based on my assumptions according to the following equations:

$$Xcw = Rb * \left[1 + \dfrac{\alpha b}{\alpha bs} * \dfrac{\pi - 2}{2} - \alpha b\right] \quad (E71)$$

$$Ycw = Rb * \alpha b \quad (E72)$$

$$Zcw = Hal * \left[\dfrac{\alpha b}{\beta bs}\right] \quad (E73)$$

$$Xct = Rb * \beta b \quad (E74)$$

$$Yct = Rb * \left\{1 + \dfrac{\beta b}{\beta bs} * [\beta bs - 1]\right\} \quad (E75)$$

$$Zct = \left(\dfrac{\beta b}{\beta bs}\right) * Hal \quad (E76)$$

for $\alpha bs \leq \alpha b \leq \pi/2$.

The full cross-sectional shape as shown in FIG. 30 is referred to herein as an oblate obround shape. The oblate obround shape of articulated collapsing is similar to the obround shapes described above, except that the semicircles at either end of the obround shape are separated into two arcs of π/2 by the wing lateral face segments centered at the X axis. The cross-sectional perimeter of film 200 within lower collapsing region 212 is assumed to be constant.

Solving equation (E11) based on these assumptions, the reference path length of wing sail section segment 238c, $L1w(\alpha b)i$ may be approximated as equal to the length given by the formula:

$$L1w(\alpha b)i = \int_{z=0}^{z=Zcw} \sqrt{\left[\dfrac{Rb}{Hal}\right]^2 * \left\{\left[\dfrac{\frac{\pi}{2}}{Rs+1} * (Rs + SIN\alpha) - \alpha * SIN\alpha - COS\alpha\right]^2 + \left[\dfrac{\frac{\pi}{2}}{Rs+1} * (1 - COS\alpha) + \alpha * COS\alpha - SIN\alpha\right]^2\right\} + 1}\, dz \quad (E77)$$

Returning to FIG. 29, lower collapsing region tent section 230 is comprised of lower collapsing region tent sail section 246 and lower collapsing region tent face section 216. Lower collapsing region tent sail section 246 lies within lower collapsing region tent section 230, bounded by base circle 202, lower collapsing region tent section contact line 248, and boundary streamline 224. Lower collapsing region tent section contact line 248 is the locus of the points of first contact of the tent section streamline reference paths within lower collapsing region tent section 230 with the lower collapsing region tent collapsing geometry boundary. Lower collapsing region tent face section 216 extends from contact line 248 to tent face section lateral boundary 250 of rectangle 206, and the YZ plane.

Streamline 252 includes lower collapsing region tent sail section segment 252c which extends from point 254 on base circle 202 to contact point 256 on contact line 248, and lower collapsing region tent face section segment 252d, which extends from contact point 256 to intersection point 258 on tent face section lateral boundary 250.

The reference path of tent face section segment 252d is modeled as a straight line between contact point 256 and intersection point 258, lying in a plane which is perpendicular to layflat line 204 as well as to tent face section lateral boundary 250 of rectangle 206. The reference path length of tent face section segment 252d, $L2t(\alpha b)$, may be approximated as equal to the length given by the formula:

$$L2t(\alpha b) = \left[\frac{\beta_{bs} - \beta_b}{\beta_{bs}}\right] * L100a1 \quad (E78)$$

$$\text{for } \alpha_{bs} \leq \alpha_b \leq \frac{\pi}{2}.$$

where $$L100a1 = \sqrt{[Rb - Ys]^2 + Hal^2} \quad (E79)$$

The reference path length of tent sail section segment 252c may be approximated using either my chordal approximation method or my integral approximation method. Under my chordal approximation method, the reference path length of tent sail section segment 252c, $L1t(\alpha b)c$, is approximated as the length of a straight line between point 254 and contact point 256. The reference path length is equal to the length given by the formula:

$$L1t(\alpha_b)c = \quad (E80)$$

$$\sqrt{Rb^2 * \left\{[\beta_b - SIN\beta_b]^2 + \left[1 - \frac{\beta_b}{\frac{\pi}{2}} * \left[\frac{Rs + 1 - \frac{\pi}{2}}{Rs}\right] - COS\beta_b\right]^2\right\} + \left[\frac{Rs+1}{Rs} * \frac{\beta_b}{\frac{\pi}{2}} * Hal\right]^2}$$

$$\text{for } \alpha_{bs} \leq \alpha_b \leq \frac{\pi}{2}.$$

My integral approximation method may be used to model the reference path and approximate the reference path length of tent sail section segment 252c by solving equation (E11). Based on the assumption of an oblate obround cross-sectional shape and constant perimeter length, the reference path length of tent sail section segment 252c, $L1t(\alpha b)i$ may be approximated as equal to the length given by the formula:

$$L1t(\alpha b)i = \int_{z=0}^{z=Zct} \quad (E81)$$

$$\sqrt{\left[\frac{Rb}{Hal}\right]^2 * \left\{\left[\frac{\frac{\pi}{2}}{Rs+1} * (Rs + SIN\alpha) - \alpha * SIN\alpha - COS\alpha\right]^2 + \left[\frac{\frac{\pi}{2}}{Rs+1} * (1 - COS\alpha) + \alpha * COS\alpha - SIN\alpha\right]^2\right\} + Id}$$

Figure 31:
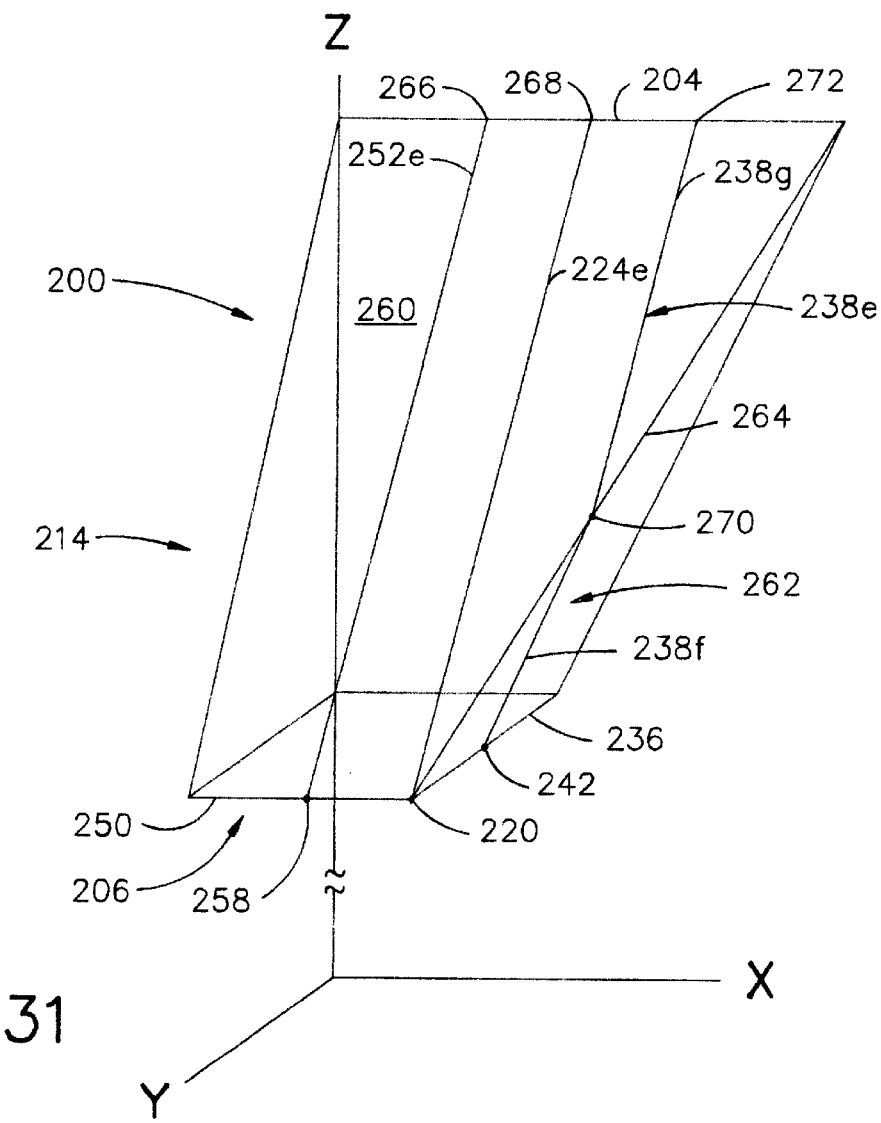
FIG. 31 is a diagrammatic perspective view of the upper collapsing region of the blown tube film of FIG. 26.

Having described various methods of approximation of the lengths of streamlines within lower collapsing region 112, reference is now made to FIG. 31 which illustrates upper collapsing region 214 in its actual position relative to the positive X, positive Y and positive Z axes as shown in FIG. 26. Upper collapsing region 214 includes upper collapsing region tent face section 260 and upper collapsing region wing face section 262. It is noted that a collapsing geometry structure does not have to be located adjacent upper collapsing tent face section 260 or upper collapsing region wing face section 262 in order to effect the shape change of upper collapsing region 214 from rectangular to layflat, since within upper collapsing region 214 film 200 may tend to assume the shape shown in FIG. 31. Even in the absence of collapsing geometry structure, upper collapsing region tent face section 260 and upper collapsing region wing face section 262 are considered to be coincidental with respective collapsing geometry boundaries for discussion and definitional purpose herein. It must be noted, however, that under certain processing conditions, it is advantageous to utilize collapsing geometry structures adjacent upper collapsing region tent face section 260 and upper collapsing region wing face section 262 as shown in U.S. Pat. No. 4,170,624.

Upper collapsing region 214 extends from rectangle 206 to layflat line 204, undergoing a change in shape from rectangular to the layflat configuration. It is noted that all cross-sections of film 200 in upper collapsing region 214 are assumed to be rectangular. Intersection line 264 is the line of intersection between tent face section 260 and wing face section 262. The reference path of upper collapsing region segment 252e of streamline 252 lies completely within upper collapsing region tent section 260 between intersection point 258 on tent face section lateral boundary 250 and point 266 on layflat line 204. The reference path of upper collapsing region segment 224e of streamline 224 also lies completely within upper collapsing region tent face section 260, extending between point 220 and point 268 on layflat line 204. Thus, the upper collapsing region segments of all streamline reference path passing through lower collapsing region tent section 230 lie completely within upper collapsing region tent face section 260.

The upper collapsing region streamline of any streamline reference path which passes through lower collapsing region wing section 228 includes an upper collapsing region wing segment and an upper collapsing region tent segment. For example, the reference path of upper collapsing region streamline 238e of streamline 238 includes upper collapsing region wing face section segment 238f and upper collapsing region tent face section segment 238g. Wing face section 238f extends from point 242 to intersection point 270 on intersection line 264. Tent face section segment 238g extends from point 270 to point 272 on layflat line 204. Both reference path segments 238f and 238g are modeled as straight lines, with segment 238f lying in a plane perpendicular to wing face section lateral boundary 236 and segment 238g lying in a plane which is perpendicular to layflat line 204 as well as tent face section lateral boundary 250.

As taught by U.S. Pat. No. 4,170,624, the reference path lengths of all streamlines of a blown tube film undergoing collapsing from a rectangular shape to a layflat shape may be assumed to be equal. Thus, the reference path lengths of all upper collapsing region streamlines of film 200 are assumed to be equal in length. This means that the total combined reference path length, L3, of segment 238f and 238g is equal to the reference path length of segments 252e as well as segment 224e, and is equal to the length given by the following formula:

$$L3 = \sqrt{\left[\frac{Rb*\frac{\pi}{2}}{Rs+1}\right]^2 + Ha2^2} . \quad (E82)$$

It is noted that the upper collapsing region lengths of SL(0) and SL(100) are equal to L3.

The streamline reference path length within collapsing region 108 of film 200 undergoing articulated collapsing may be approximated by adding the lengths of the component segments using the formulas described above.

Figure 32:
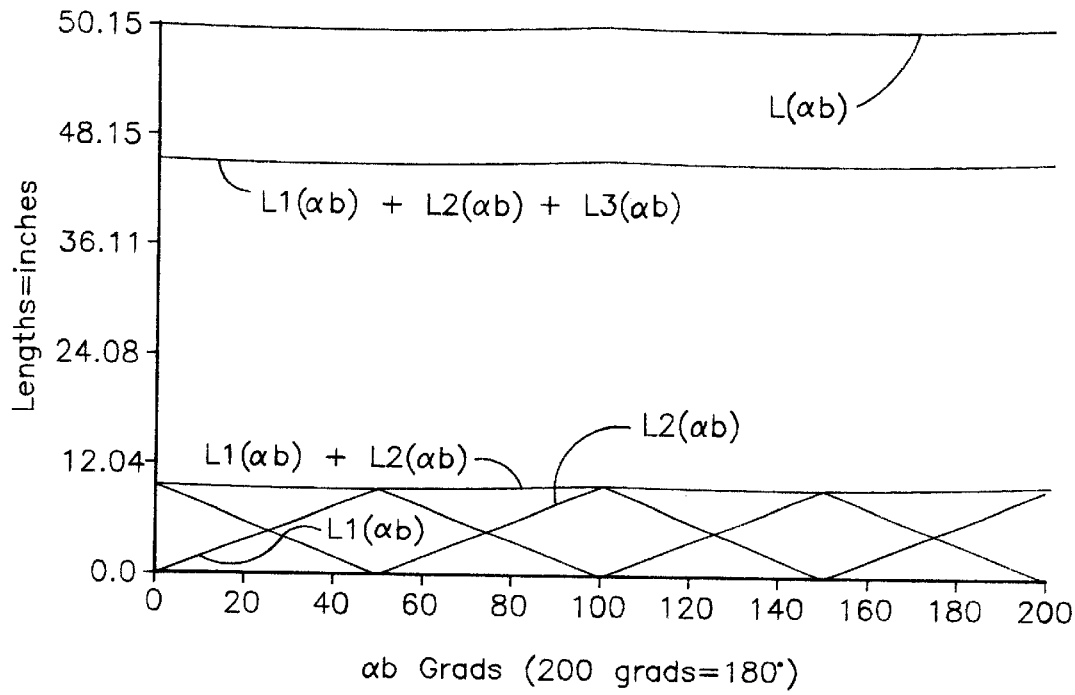
FIG. 32 is a graph illustrating the variation of streamline reference path lengths of a blown tube film undergoing articulated collapsing, based on my chordal and integral approximation methods, as a function of the angular position of the streamlines.

FIG. 32 illustrates the reference path lengths of the streamline segments within the collapsing region for both the chordal and integral approximation methods, for a blown tube film undergoing articulated collapsing. The film has a base circle radius of 19.10 inches, a layflat width of 60 inches, and a collapsing height Hc, of 46.11 inches. Both θca1 and θca2 are equal to 22.5°, and Rs is 1 (αbs is 50 grads). It is noted that the individual segments are referred to generally without reference to the tent or wing section. For the case illustrated, the wing section extends from 0 grads to 50 grads and from 150 grads to 200 grads. The tent section extends from 50 grads to 150 grads.

Figure 33:
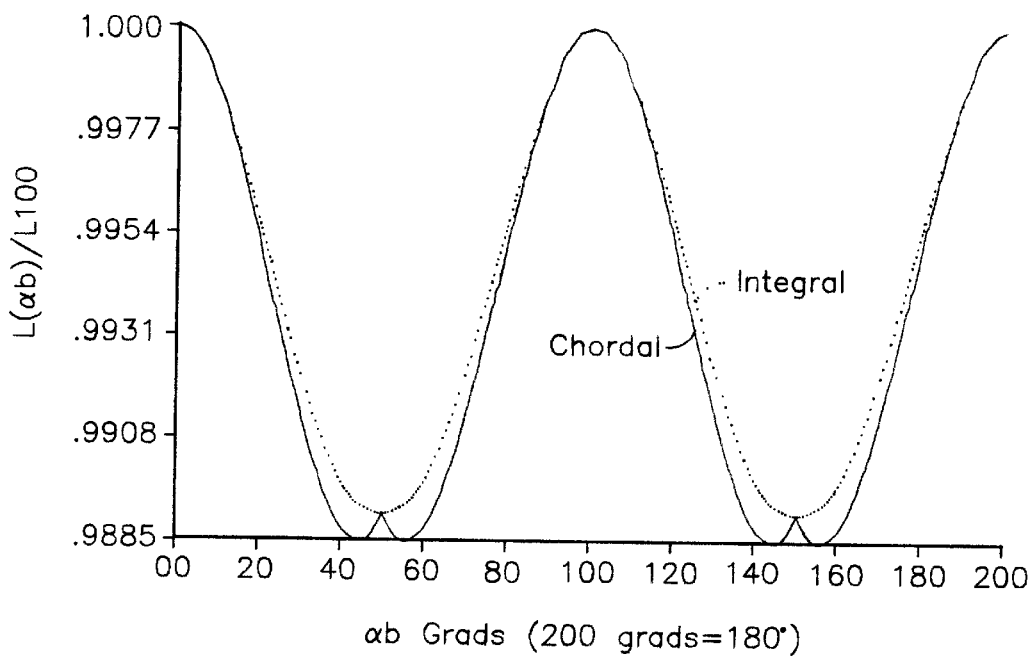
FIG. 33 is a graph illustrating the variation in the ratio of the streamline reference path lengths to the longest streamline reference path length, based on my chordal and integral approximation methods, as a function of angular position of the streamline for the articulated collapsing of FIG. 32.

FIG. 33 illustrates the ratio of the approximated reference path lengths to the approximated reference path length of the longest streamline, for both the chordal and integral approximation methods, for the articulated collapser of FIG. 32. The integral approximation method ratios are shown by the dotted line.

Articulated with Nip Roll Collapsing

Figure 34:
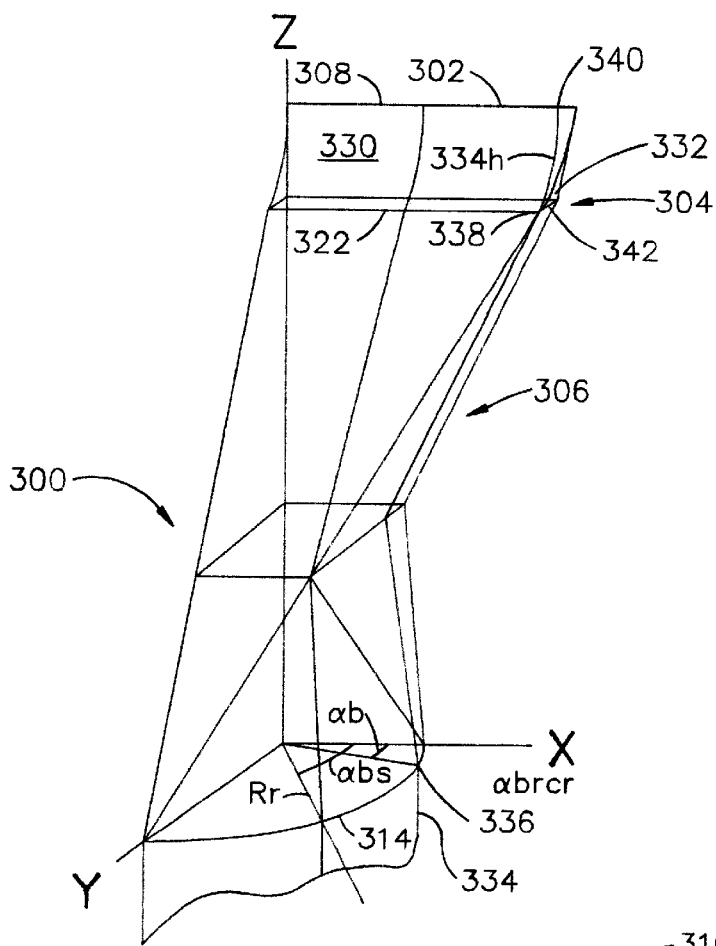
FIG. 34 is a diagrammatic perspective view of one quadrant of a blown tube film undergoing articulated with nip roll collapsing.

Referring to FIG. 34, the positive X, positive Y, positive Z quadrant of blown tube film 300 undergoing articulated with nip roll collapsing is diagrammatically illustrated. The terminology and analysis for articulated with nip roll collapsing is similar to that as described above with respect to articulated collapsing alone, with the exception that layflat line 302 does not occur at exit 304 of upper articulated collapsing region 306, but rather at nip line 308 of nip rollers 310 (FIG. 35) and 310a (not shown). Film 300 has a rectangular cross-sectional shape at exit 304 as illustrated in FIG. 36. The Y dimension, designated Yrcr, is one half the total exit depth (in the Y direction), and is given by the formula:

Yrcr=Rb*αbrcr  (E83)

Figure 35:
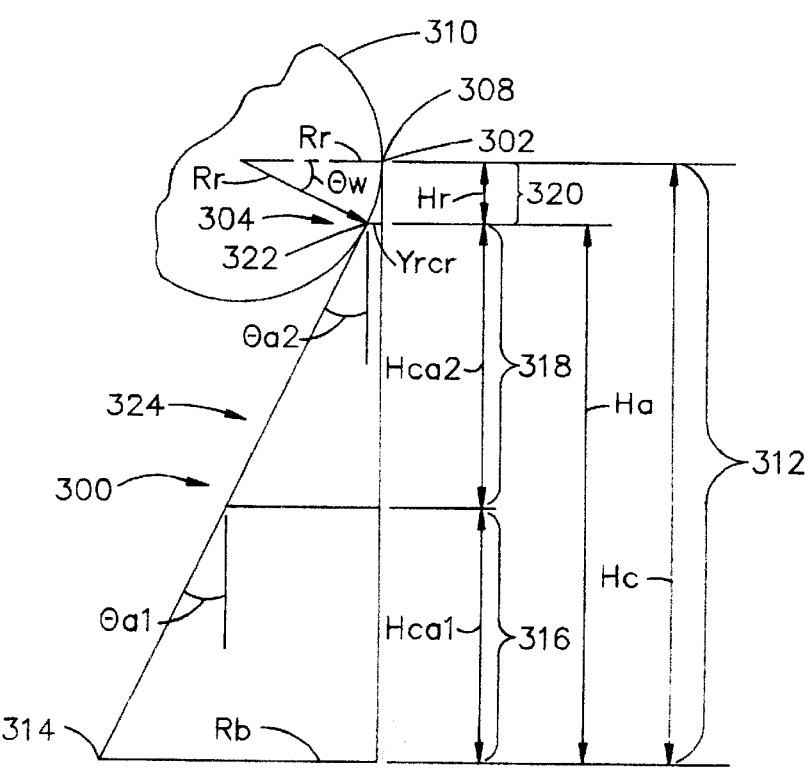
FIG. 35 is a diagrammatic elevational side view of the blown tube film of FIG. 34.
Figure 36:
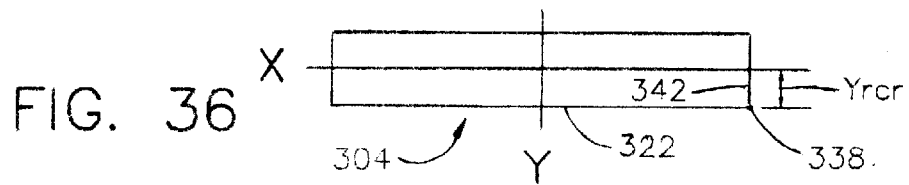
FIG. 36 is a cross-sectional view of the blown tube film of FIG. 34 taken at the articulated collapser exit.

Referring to FIG. 35, collapsing region 312 extends from base circle 314 to layflat line 302, and the height of layflat line 302 above base circle 314 is denoted Hc. Collapsing region 312 includes lower articulated collapsing region 316, upper articulated collapsing region 318, and nip roll collapsing region 320, the heights of which are respectively designated Hca1, Hca2, and Hr. Nip roll 310 is tangent to film 300 at exit 304 along tent face section lateral segment 322. It should be noted that the analysis is applicable to articulated with nip roll collapsing wherein the nip rolls are not located tangentially to film 300. Film 300 contacts nip roll 310 at SL(100) through an angle of wrap, θw at a radius Rr. The angle of vertical inclination of upper articulated collapsing region tent face section 324 is θa2. θa2 is equal to θw when the nip rolls are tangent to film 300 and adjacent exit 304.

The analysis of streamline reference path lengths, positions, contact points and coordinates in lower articulated collapsing region 316 is identical to the analysis of streamline lengths in lower collapsing region 212 of FIGS. 28 and 29 as discussed above with respect to articulated collapsing alone. The presence of nip rolls downstream of the exit of the articulated collapser does not affect the approximation of the reference path lengths of streamlines in lower articulated collapsing region 316.

Figure 37:
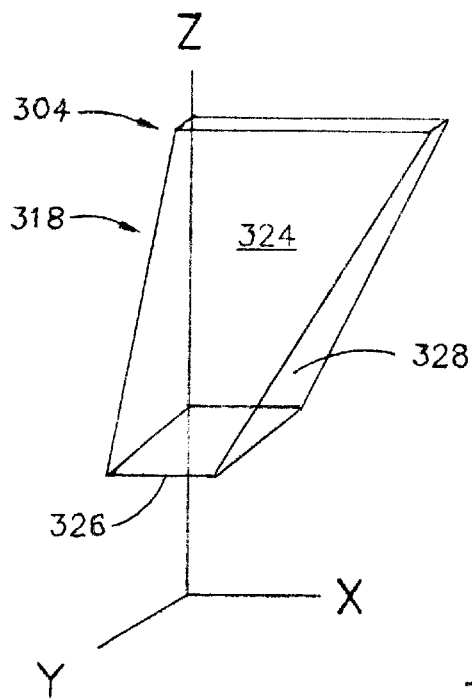
FIG. 37 is a diagrammatic perspective view of the upper articulated collapsing region of the blown tube film of FIG. 34.

Referring now to FIG. 37, upper articulated collapsing region 318 is diagrammatically shown in the positive X, positive Y, positive Z quadrant in its proper position relative thereto. Upper articulated collapsing region 318 extends from rectangle 326 to exit 304 where it has a rectangular shape as shown in FIG. 36. Only one quadrant of the full cross-section is shown in FIG. 37. Upper articulated collapsing region 318 includes upper articulated collapsing region tent face section 324 and upper articulated collapsing region wing face section 328. Similar to the analysis above of upper collapsing region 214 of film 200 undergoing articulated collapsing alone, all streamline reference path lengths in upper articulated collapsing region 318 are equal. Thus, the upper articulated collapsing region streamline reference path length, L3, for any streamline may be approximated as being equal to the length given by the formula:

L3=√[αbs−αbrcr]²*Rb²−Ha2²  (E84)

As above, it is noted that the upper collapsing region lengths of SL(0) and SL(100) are equal to L3.

Figure 38:
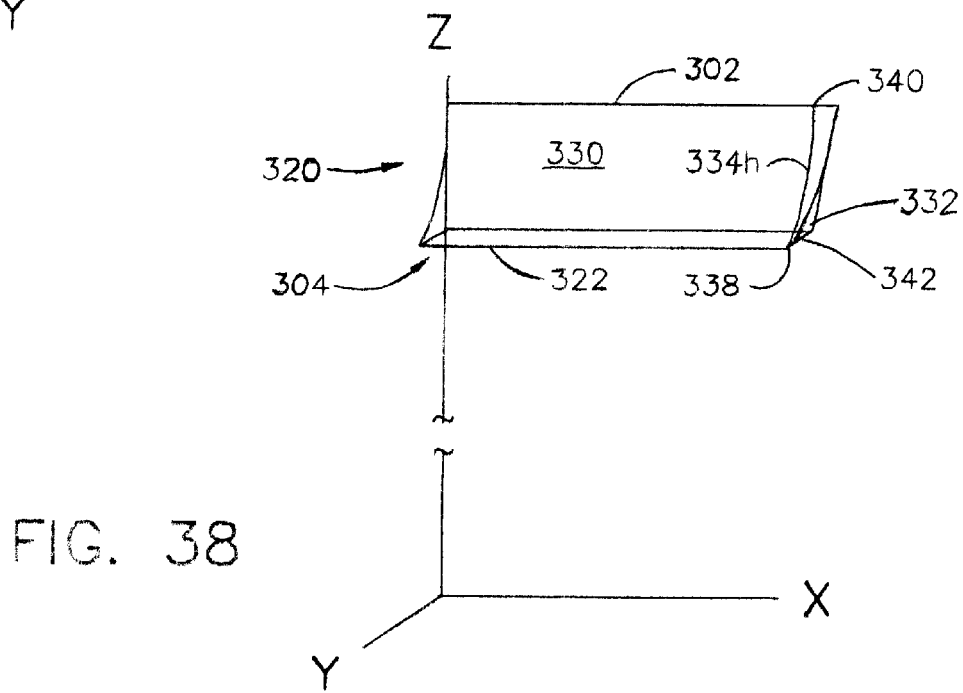
FIG. 38 is a diagrammatic perspective view of the nip roll collapsing region of the blown tube film of FIG. 34.

FIG. 38 diagrammatically illustrates nip roll collapsing region 320 in its position relative to the positive X, positive Y, positive Z axis as shown in FIG. 34. Nip roll collapsing region 320 includes nip roll face section 330 and nip roll corner section 332. Nip roll face section 330 includes only those streamline reference path which pass through upper articulated collapsing region tent lateral face chord 322.

The boundary between nip roll face section 330 and nip roll corner section 332 is best explained by reference to FIG. 34. The reference path of boundary streamline 334 intersects base circle 314 at point 336. The reference path of boundary streamline 334 has a base circle angular location αbrcr=Yrcr+Rb. In other words, the length of the arc of base circle 314 between point 336 and the X axis is equal to Yrcr, half of the width of exit 304 of the articulated collapser. The reference path of boundary streamline 334 passes through corner 338 of the rectangular cross-sectional shape of film 300 at exit 304 (FIG. 36). The reference path of nip roll face section segment 334h follows an arcuate path from point 338 to point 340 on layflat line 302. Thus, in the quadrant shown in FIG. 38, nip roll face section 330 extends from upper articulated collapser tent face section lateral segment 322 to layflat line 302 bounded by nip roll face section segment 334h of boundary streamline 334. Nip roll corner section 332 extends from upper articulated collapser wing face section lateral segment 342 to layflat line 302 bounded by nip roll face section segment 334h of boundary streamline 334, and the XZ plane.

Referring still to FIG. 38, nip roll collapsing region 320 of articulated with nip roll collapsing is similar to nip roll collapsing region 114 of A-Frame with nip roll as described above, except that the entrance to nip roll collapsing region 320 is rectangular rather than obround. All of the reference paths of streamline segments within nip roll face section 330 are assumed to follow respective arcuate paths having a constant radius Rr, and lying in respective planes which are perpendicular to layflat line 302. The reference path lengths of all nip roll face section segments in nip roll face section 330 are approximated as being equal to the length given by the formula:

$$L4 = Rr*\theta w \qquad (E85)$$

Figure 39:
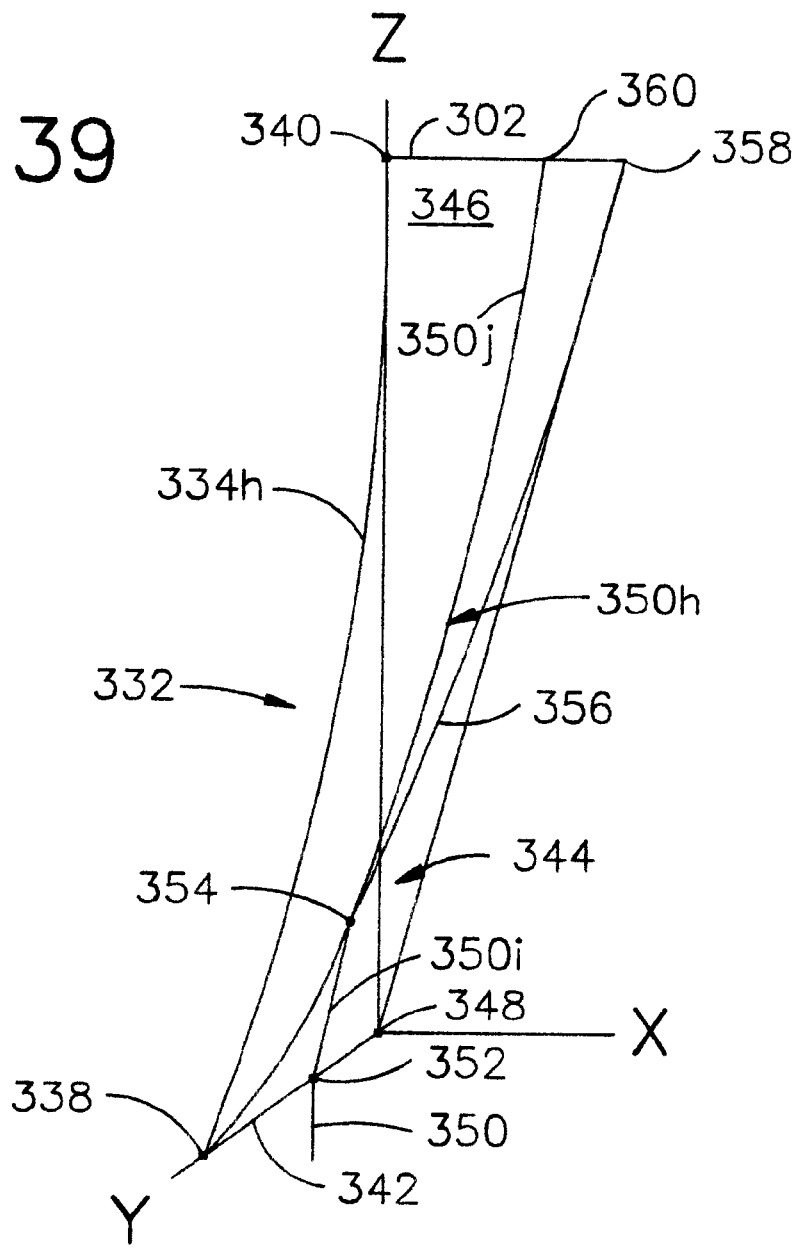
FIG. 39 is an enlarged diagrammatic perspective view of the nip roll corner section of the nip roll collapsing region of FIG. 38.

Referring now to FIG. 39, nip roll corner section 332 includes nip roll corner sail section 344 and nip roll corner face section 346. It is noted that the lower boundary of nip roll corner section 332 is wing face section lateral segment 342, which is straight (in contrast to a lateral arc as is the case for the nip roll corner section in A-Frame with nip roll collapsing shown in FIG. 23). This straight line crosssection of film 300 is collapsed by nip roll 310 to the layflat configuration at layflat line 302 located perpendicular to wing face section lateral segment 342 a distance Hr (see FIG. 35) above end point 348 of wing face section lateral segment 342. The reference path of nip roll corner section streamline 350$h$ (i.e. $0 \leq \alpha b \leq \alpha brcr$) is assumed to pass through upper articulated collapsing wing face section lateral segment 342 perpendicularly. Nip roll corner section streamline 350$h$ of streamline 350 comprises nip roll corner sail section segment 350$i$ and nip roll corner face section segment 350$j$. Nip roll corner sail section segment 350$i$ extends from its intersection 352 with wing face section lateral segment 342 to nip roll collapsing geometry boundary contact point 354. The locus of all contact points form contact line 356 extending from point 338 to end 358 of layflat line 302. The reference path of nip roll corner face section segment 350$j$ follows an arcuate path from contact point 354 to point 360 on layflat line 302. The reference paths of all nip roll corner face section segments are assumed to lie in respective planes perpendicular to layflat line 302.

The x coordinate of the contact points within the nip roll corner section is given by equation (E13) above. The y and z coordinates of the contact points within the nip roll corner section may be determined according to the following formulas:

$$Yrc = Rb*\alpha b \qquad (E86)$$

$$Zr = Hr - Rr*\sin\theta rc \qquad (E87)$$

where $\theta rc$ is the wrap angle of nip roll face segment given by:

$$\theta_{rc} = \cos^{-1}\left[\frac{Rr - Rb*\alpha_b}{Rr}\right] \qquad (E88)$$

The reference path length of nip roll corner face section segment 350$j$, L5($\alpha b$), may be approximated as being equal to the length given by formula:

$$L5(\alpha b) = Rr*\theta rc \qquad (E89)$$

The reference path length of nip roll corner sail section segment 350$i$, L4($\alpha b$), may be approximated as equal to the length given by equation (E11). Nip roll corner sail section 344 may be modeled as being planar, perpendicular to the XZ plane. Based on this assumption, equation (E11) becomes:

$$L4(\alpha_b) = \sqrt{Rb^2 *[\beta_b - \beta_{brcr}]^2 + [\alpha_{brcr} - \alpha_b]^2 *\left[\frac{Hr}{\alpha_b}\right]^2} \qquad (E90)$$

for $0 \leq \alpha b \leq brcr$.

Figure 40:
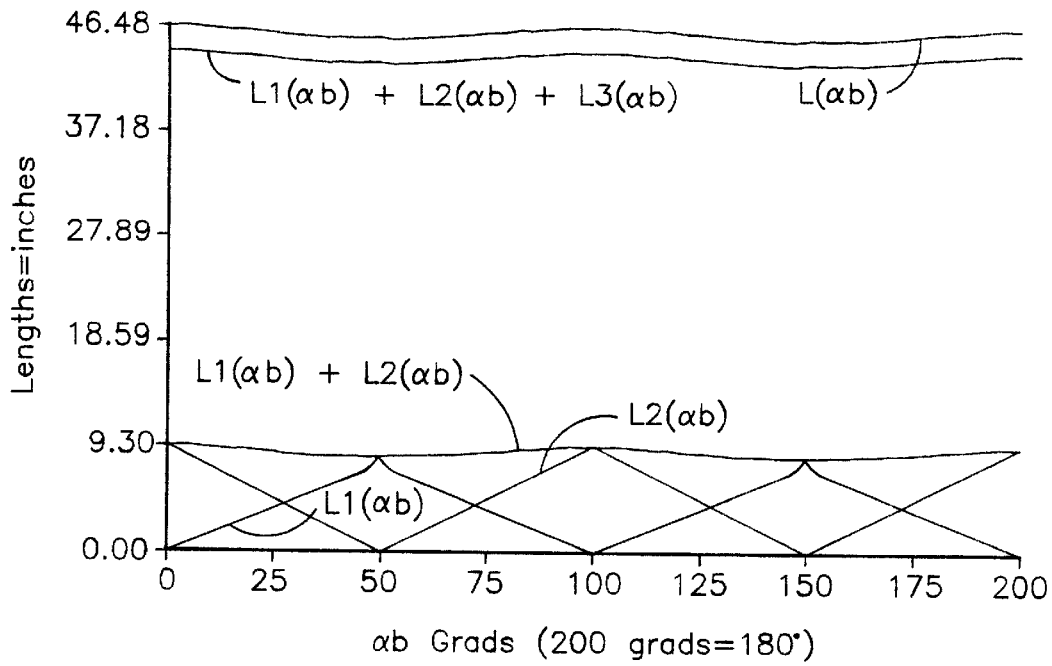
FIG. 40 is a graph illustrating the variation of streamline reference path lengths of a blown tube film undergoing articulated with nip roll collapsing where αbs is 50 grads (Rs=1) and θca1=θca2=25°, based on my chordal and integral approximation methods, as a function of the angular position of the streamlines.

FIG. 40 illustrates the reference path lengths of the streamline segments within the collapsing region of both the chordal and integral approximation methods, for a blown tube film undergoing articulated with nip roll collapsing. The film has a base circle radius of 19.10 inches, a layflat width of 60 inches, and a collapsing height of 42.29 inches. Both $\theta$ca1 and $\theta$ca2 are equal to 25°, the angle of wrap is 25°. The nip roll radius, Rr, is 6 inches. Rs is 1 ($\alpha$bs is 50 grads). It is noted that the individual segments are referred to generally without reference to the tent or wing sections. For the case illustrated, the wing section extends from 0 grads to 50 grads and from 150 grads to 200 grads. The tent section extends from 50 grads to 150 grads.

Figure 41:
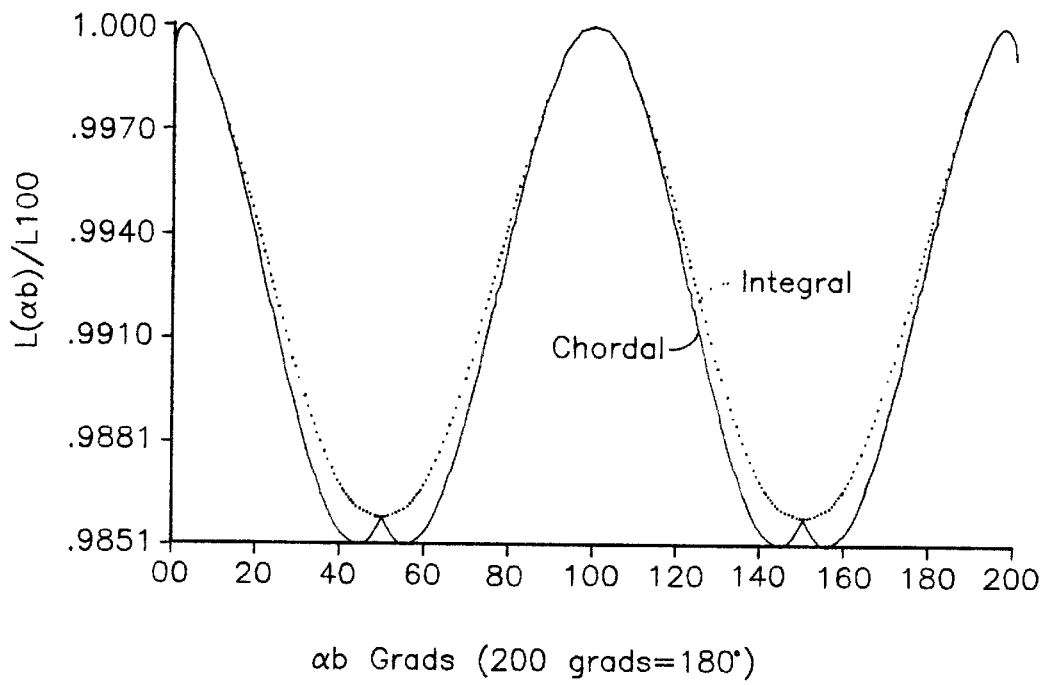
FIG. 41 is a graph illustrating the variation in the ratio of the streamline reference path lengths through the collapser to the longest streamline reference path length within the collapsing region, based on my chordal and integral approximation methods, as a function of angular position of the streamline for the articulated with nip roll collapsing of FIG. 40.

FIG. 41 illustrates the ratio of the approximated reference path lengths to the approximated reference path length of the longest streamline, for both the chordal and integral approximation methods, for the articulated with nip roll collapser of FIG. 40. The integral approximation method ratios are shown by the dotted line.

Figure 42:
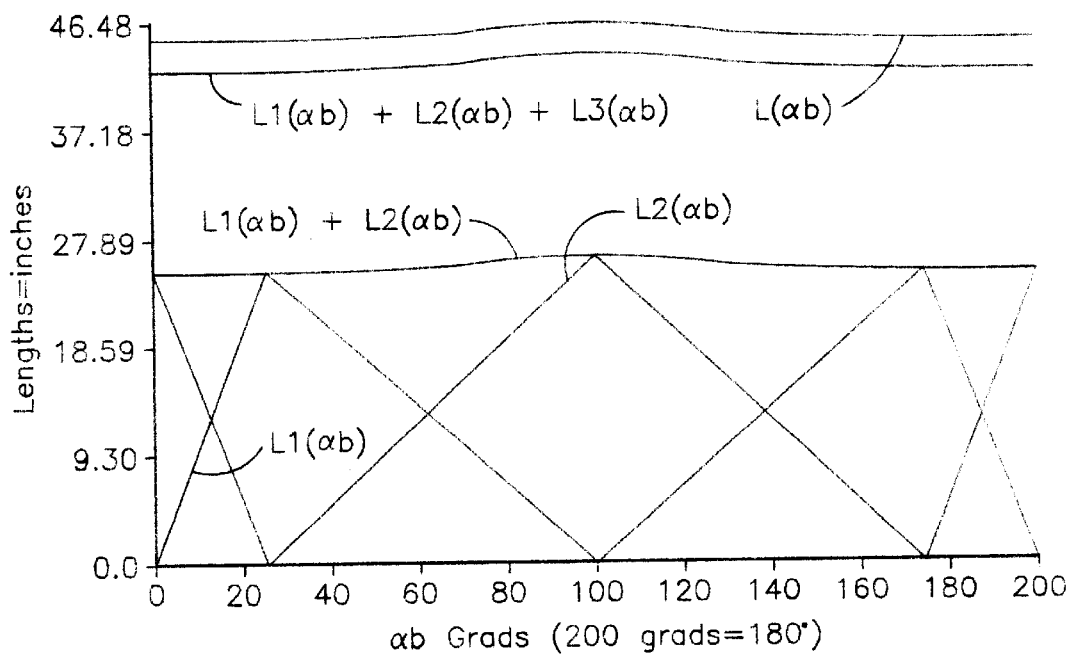
FIG. 42 is a graph illustrating the variation of streamline reference path lengths of a blown tube film undergoing articulated with nip roll collapsing similar to FIG. 40, except αbs is 25 grads.

FIG. 42 illustrates the reference path lengths of the streamline segments within the collapsing region for both the chordal and integral approximation methods for a blown tube film undergoing articulated with nip roll collapsing similar to that illustrated in FIG. 40, except that Rs is 3.00 (i.e. $\alpha$bs is 25 grads). As with FIG. 40, the the collapsing height, Hc, is 42.29 inches, and individual segments in FIG. 42 are referred to generally without reference to the tent or wing sections. For the case illustrated in FIG. 42, the wing section extends from 0 grads to 25 grads and from 175 grads to 200 grads. The tent section extends from 25 grads to 175 grads.

Figure 43:
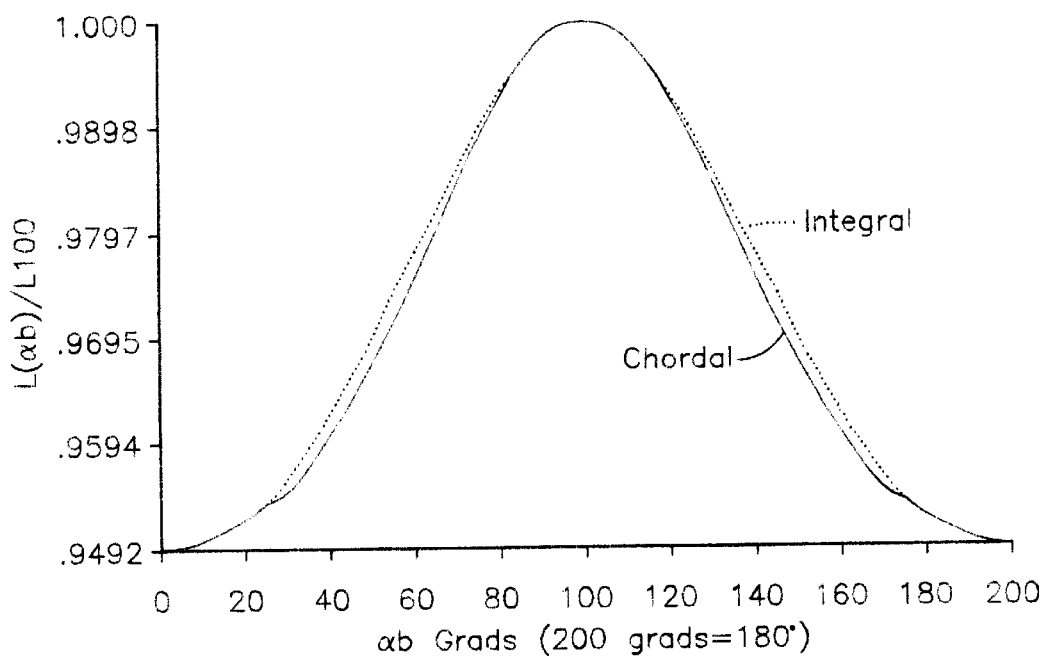
FIG. 43 is a graph illustrating the variation in the ratio of the streamline reference path lengths through the collapser to the longest streamline reference path length within the collapsing region for articulated with nip roll collapsing shown in FIG. 42.

FIG. 43 illustrates the ratio of the approximated reference path lengths to the approximated reference path length of the longest streamline, for both the chordal and integral approximation methods, for the articulated with nip roll collapser of FIG. 42. The integral approximation method ratios are shown by the dotted line.

Figure 44:
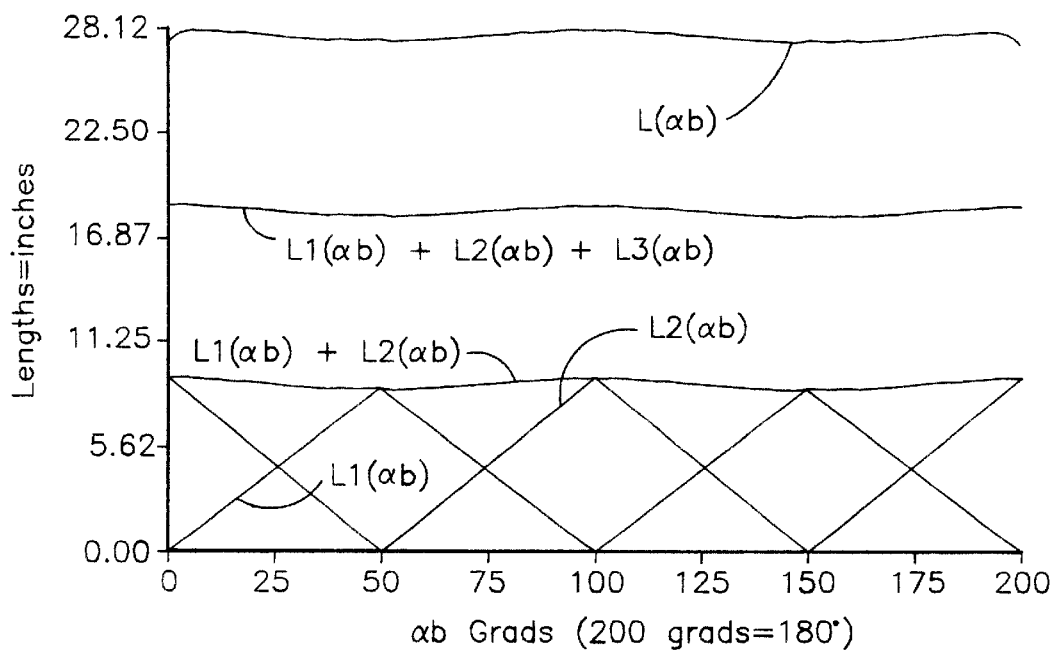
FIG. 44 is a graph illustrating the variation of streamline reference path lengths of a blown tube film undergoing articulated with nip roll collapsing similar to FIG. 40, except θca2 is 89°.

FIG. 44 illustrates the reference path lengths of the streamline segments within the collapsing region for both the chordal and integral approximation methods, for a blown tube film undergoing articulated with nip roll collapsing similar to that illustrated in FIG. 40, except that the collapsing height, Hc, is 14.95 inches, $\theta$ca2 is 89°, and the wrap angle is 89°. As with FIGS. 40 and 42, the individual segments are referred to with out reference to the tent or wing sections. For the case illustrated, the wing section extends from 0 grads to 50 grads and from 150 grads to 100 grads. The tent section extends from 50 grads to 150 grads.

Figure 45:
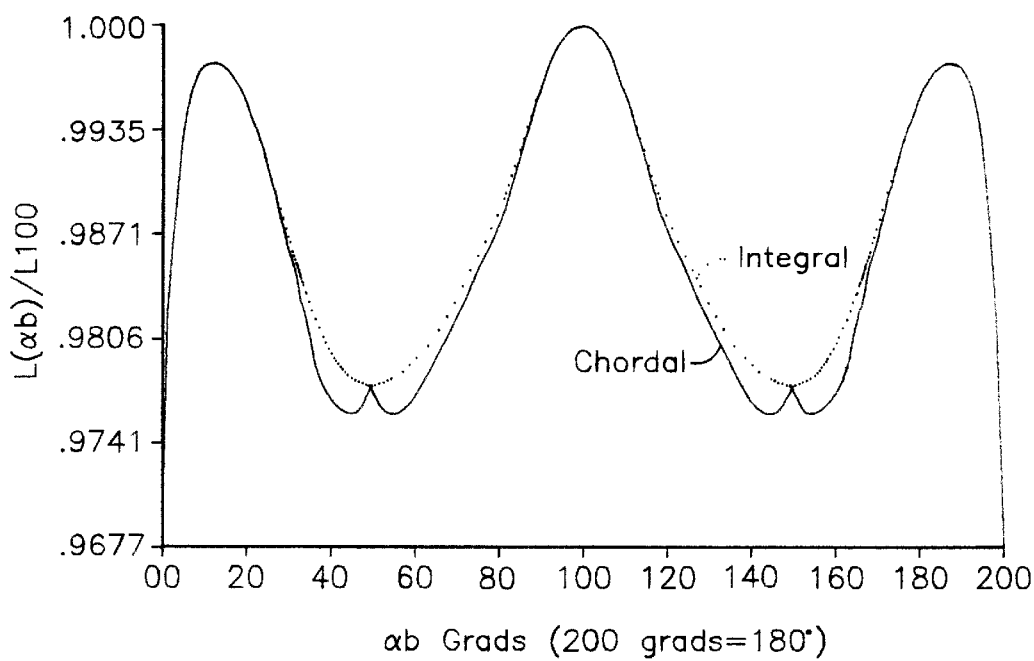
FIG. 45 is a graph illustrating the variation in the ratio of the streamline reference path lengths through the collapser to the longest streamline reference path length within the collapsing region shown in FIG. 44.

FIG. 45 illustrates the ratio of the approximated reference path lengths to the approximated reference path length of the longest streamline, for both the chordal and integral approximation methods, for the articulated with nip roll collapser of FIG. 44. The integral approximation method ratios are shown by the dotted line.

By comparing FIGS. 40 and 41 to FIGS. 42 and 43, the effect on the reference path lengths within the collapsing region of changing the shape of the rectangle between the upper articulated collapsing region and the lower articulated collapsing region can be seen. In FIGS. 40 and 41, the rectangle is square (i.e. Rs=1 and αbs=50 grads), while in FIGS. 42 and 43, Rs is 3.00 (αbs is 25 grads).

By comparing FIGS. 40 and 41 with FIGS. 44 and 45, the effect on the reference path lengths within the collapsing region of changing the angle of inclination of the upper articulated collapsing region can be seen. In FIGS. 40 and 41, θca1 and θca2 are equal at 25°. In FIGS. 44 and 45, θca1 is 25°, while θca2 is 89°. With the configuration of FIGS. 44 and 45, the upper articulated collapsing region is nearly perpendicular to the central longitudinal axis of the blown tube film.

Spreader Collapsing

Figure 46:
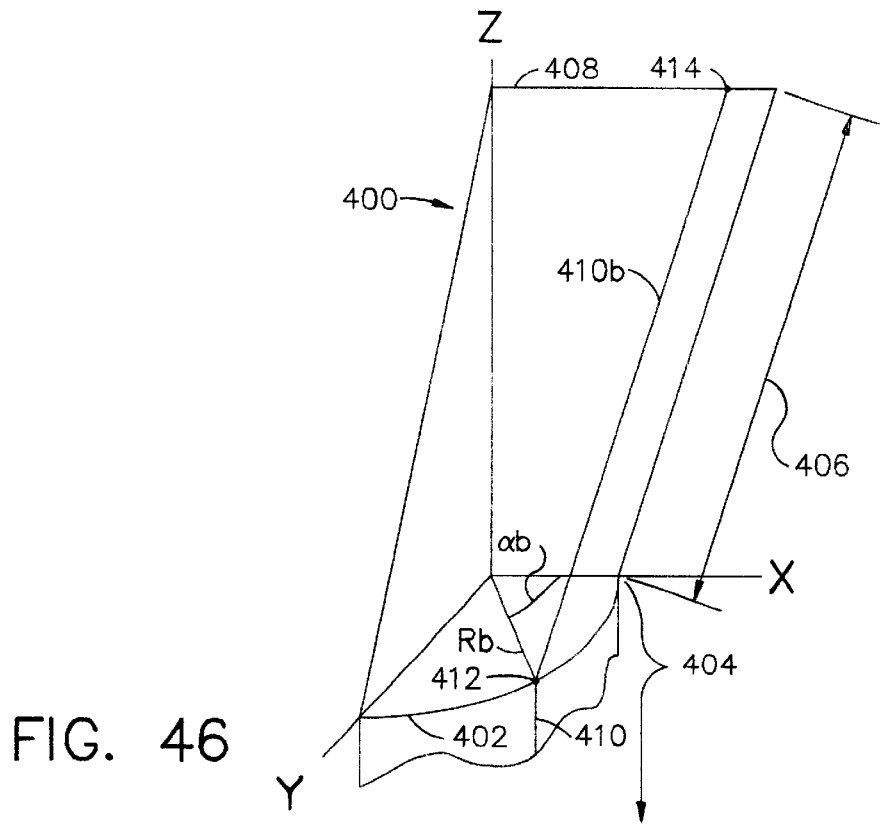
FIG. 46 is diagrammatic perspective view of one quadrant of a blown tube film undergoing spreader collapsing.

FIG. 46 illustrates the positive X, positive Y, positive Z quadrant of blown tube film 400 undergoing spreader collapsing similar to that described in U.S. Pat. Nos. 2,720,680, 3,061,875, 3,144,494, or 3,304,352. Base circle 402 may be established, if necessary, by any means for retaining the generally circular cross sectional shape at base circle 402 so as to define it as the interface between generally circular tube region 404 (partially illustrated), and collapsing region 406, which extends from base circle 402 to layflat line 408 located at the exit of the collapser. Collapsing region segment 410b of streamline 410 extends from point 412 on base circle 402 to point 414 on layflat line 408. An orientation region (not shown) is located upstream of tube region 404.

Under my chordal approximation method, the reference path of segment 410b, L(αb)c, is modeled as a straight line. The reference path length, L(αb)c, is given by the formula:

$$L(\alpha_b)c = \sqrt{Rb^2 * \{\beta_b^2 - 2*\beta_b * \cos\alpha_b + 1\} + Hc^2} \quad (E91)$$

My integral approximation method method may be used to approximate the reference path length of segment 410b by solving equation (E11). According to one aspect of my invention, the shape of each cross section in collapsing region 406 is assumed to be an ellipse, and in particular the ellipse may be assumed to have its major axis parallel to layflat line 408. Based on this assumption, equation (E11) may be solved by use of elliptical integrals of the second kind. For any ellipse, defined by an equation of the type $$\frac{X^2}{a^2} + \frac{Y^2}{b^2} = 1 \quad (E92)$$

$$k = \frac{\sqrt{a^2 - b^2}}{a} \quad (E93)$$

where,
k is the numerical eccentricity of the ellipse,
a is the major axis of the ellipse, and
b is the minor axis of the ellipse.
then, the lateral arcuate distance to any circumferential position on the ellipse measured from the major axis is determined by the commonly known function called elliptical integrals of the second kind. These integrals take the form:

$$E(k, \varphi) = a\left[\varphi - \frac{1}{2}k^2 \int_0^\varphi \sin^2\theta d\theta - \frac{1}{8}k^4 \int_0^\varphi \sin^4\theta d\theta - \ldots - \right. \quad (E94)$$
$$\left. \frac{1 \cdot 3 \cdot 5 \cdots (2n-3)}{2 \cdot 4 \cdot 6 \cdots 2n} k^{2n} \int_0^\varphi \sin^{2n}\theta d\theta - \ldots\right].$$

For any prior determined k(z) for $0 \leq z \leq Hc$, and using the relation $$Rb*\alpha b = E(k, \psi) \quad (E95)$$

it is possible to numerically solve this relation's ψ(z) (and from this to determine the X(z) and Y(z) components of the reference path at any elevation) for any k(z) of elliptical shape thus chosen and, from these numerical solutions, to trace the reference path throughout the spreader collapsing region. Using these streamline component values and, integrating equation (E11), reference path lengths through the spreader collapsing region are determined.

Figure 47:
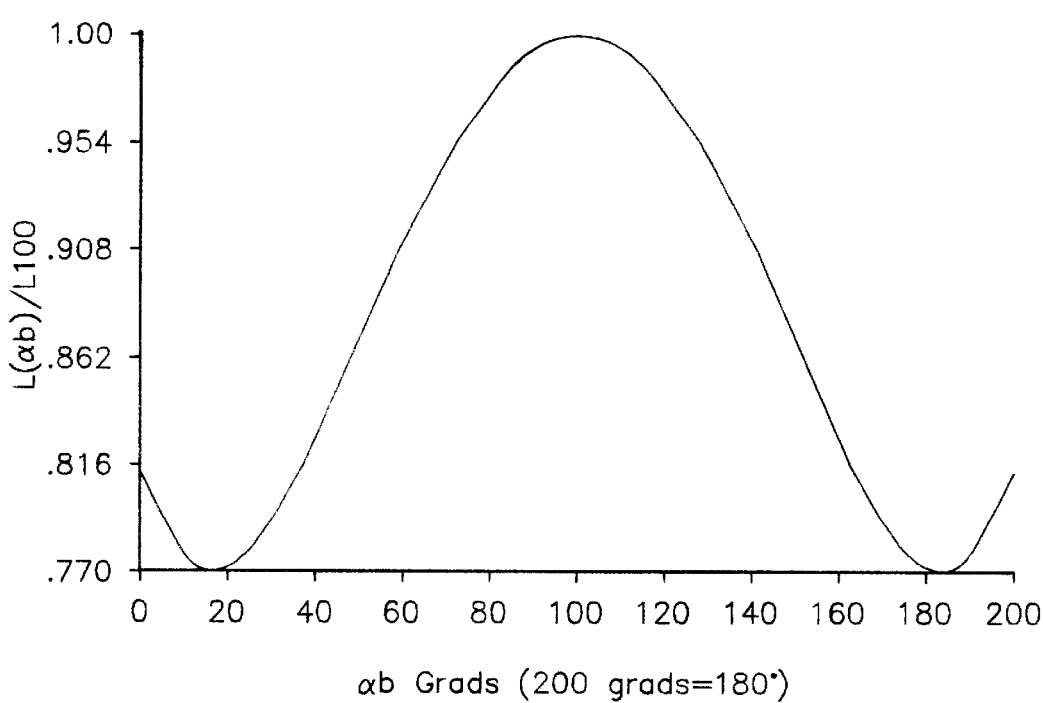
FIG. 47 is a graph illustrating the variation in the ratio of the streamline reference path lengths to the longest streamline reference path length, based on my chordal approximation method, as a function of angular position of the streamline for spreader collapsing.

FIG. 47 illustrates the ratio of the approximated reference path lengths to the approximated reference path length of the longest streamline, based on my chordal approximation method, for spreader collapsing. The height of collapsing, Hc, is 25 inches, and the base circle radius is 25 inches.

Unwrap Flattening

Figure 48:
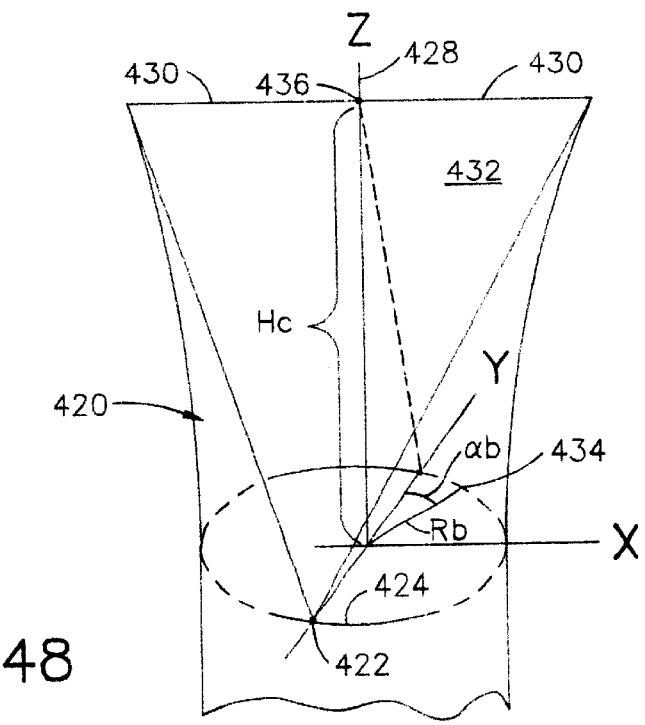
FIG. 48 is a diagrammatic perspective view of a blown tube film undergoing unwrap flattening.

FIG. 48 diagrammatically illustrates, in all four quadrants, the unwrap flattening process generally described in U.S. Pat. No. 3,426,113, wherein the continuously moving blown tube film 420 is initially slit at point 422 on base circle 424. From there, film 420 is advanced and unwrapped into layflat line 430 which, as shown in FIG. 48, perpendicularly intersects the Z axis, or central longitudinal axis, 428.

As is shown in FIG. 48, this collapsing geometry is symmetrical with respect to the YZ plane. For any particular streamline located at angle αb from the positive Y axis as shown in FIG. 48, the reference path of that streamline may be modeled as a straight line between the point on base circle 424 through which the particular streamline passes and the point on layflat line 430 through which the particular streamline passes. Assuming no circumferential stretching, the x coordinate of the intersection of any identified streamline 432, located at αb, with layflat line 430 will be equal to the arc length between the Y axis and intersection point 434 on base circle 424, and is given by the formula:

$$Xc = Rb*\alpha b \quad (E96)$$

The vertical location of layflat line 430 is designated as Hc, representing the z coordinate of point 436 at which layflat line 430 intersects Z axis 436. Thusly, the reference path length, L(αb)c, may be approximated as equal to the length given by the formula:

$$L(\alpha b)c = \sqrt{Rb^{2*}\{1+\alpha b^2 - 2*\alpha b*\sin\alpha b\} + Hc^2} \quad (E97)$$

For single unwrap flattening where the slit is initiated on the Y axis as shown, equation (E97) is used to calculate the reference path length for $-\pi \leq \alpha b \leq \pi$.

For two unwrap flattening (the general principle of two unwrap flattening is depicted with offset in FIG. 52 and discussed below) where two slits are initiated on the X axis, equation (E97) is used to calculate the reference path for $-\pi/2 \leq \alpha b \leq \pi/2$. The analysis applies to both webs of the two unwrap flattening process if the layflat lines for both webs lie over the X axis (i.e. no offset).

Because blown tube film 420 is slit at point 422, no differential pneumatic pressure is existent on opposite sides of the web in the collapsing region. Thus, it is believed that the chordal approximation method, rather than the integral approximation method, provides the most appropriate approximation of the streamline length in the collapsing region.

Figure 49:
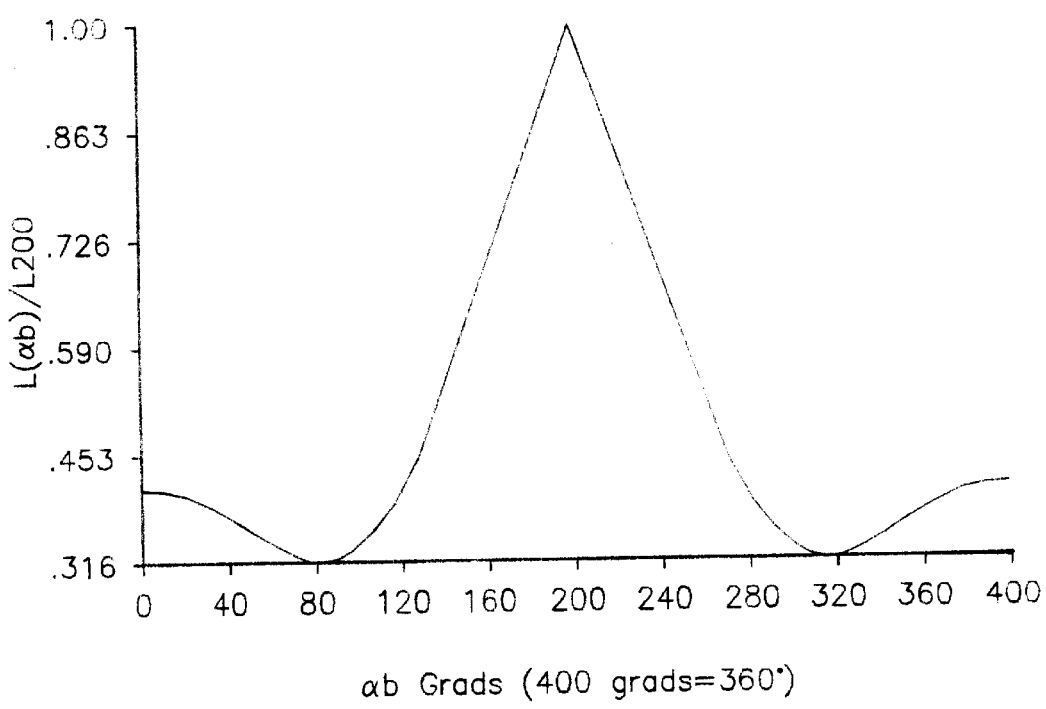
FIG. 49 is a graph illustrating the variation in the ratio of the streamline reference path lengths to the longest streamline reference path length, based on my chordal approximation method, as a function of angular position of the streamline for unwrapped flattening.

FIG. 49 is a graph illustrating the ratio of the approximated reference path lengths to the approximated reference path length of the longest streamline, according to my chordal approximation method, for unwrap flattening. The height of the collapsing region, Hc, is 25 inches. The base circle radius is 25 inches, and the layflat width is 157.08 inches.

Unwrap Offset Flattening

Figure 50:
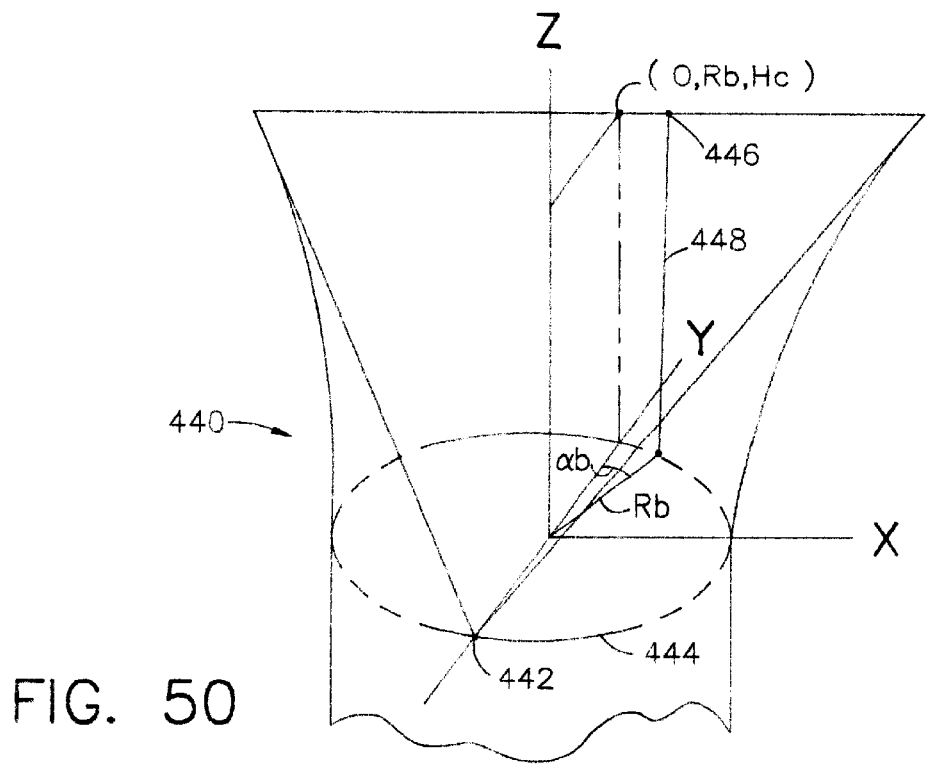
FIG. 50 is a diagrammatic perspective view of a blown tube film undergoing unwrap offset flattening.

Shown in FIG. 50 is the unwrap flattening process generally described in U.S. Pat. No. 3,426,113 wherein blown tube film 440 is slit at one point 442 on base circle 444, and layflat line 446 is parallel to the X axis, but offset from the Z axis a distance Yo in the Y direction, located at at a height Hc above base circle 444. As with unwrap flattening described above, the reference path in collapsing region between base circle 444 and layflat line 446 may be modeled as a straight line from base circle 444 to layflat line 446. Thus, according to my chordal approximation method, the reference path length of streamline, L(αb)c, in the collapsing region is approximated as equal to the length given by the formula:

$$L(\alpha b)c = \sqrt{Rb^{2} * \{\alpha b^{2-2*[\alpha b * SIN \alpha b + COS \alpha b]}\} + Hc^{2}} \quad (E98)$$

for the range $-\pi \leq \alpha b \leq \pi$.

Figure 51:
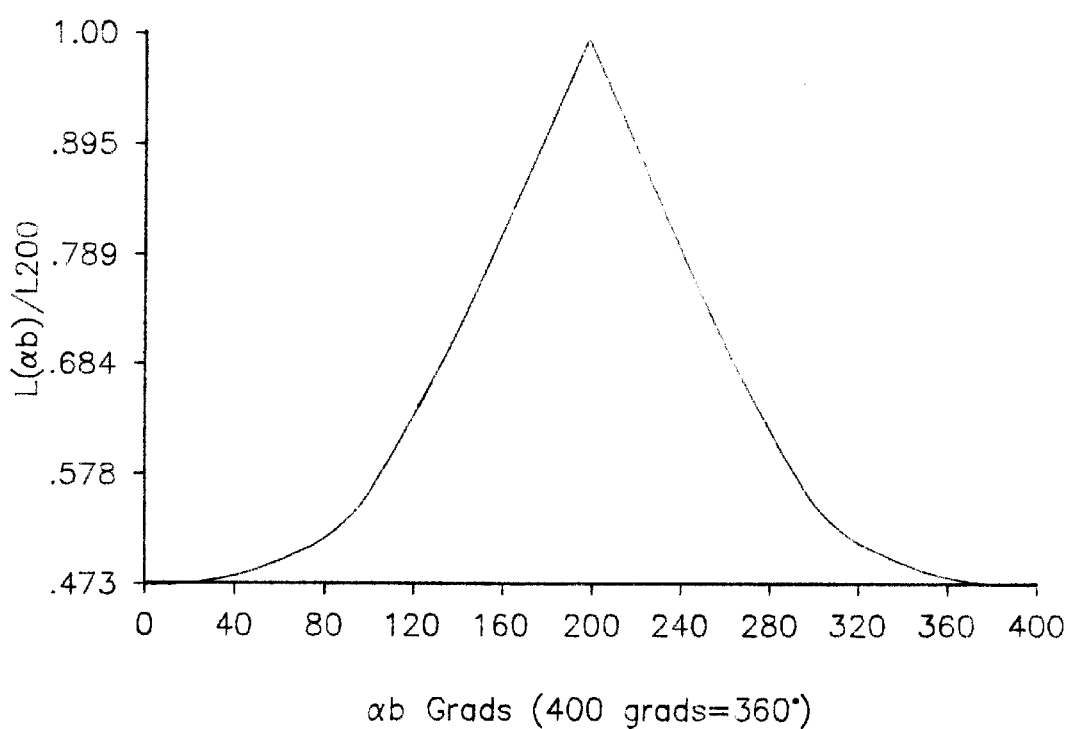
FIG. 51 is a graph illustrating the variation in the ratio of the streamline reference path lengths to the longest streamline reference path length, based on my chordal approximation method, as a function of angular position of the streamline for unwrap offset flattening.

FIG. 51 illustrates the ratio of the approximated reference path lengths to the approximated reference path length of the longest streamline, according to my chordal approximation method, for unwrap offset flattening. The collapsing height, Hc, is 50 inches. The base circle radius is 25 inches and the layflat width is 157.08 inches. The offset from the Z axis is 25 inches.

Two Unwrap Offset Flattening

FIG. 52 illustrates an unwrap flattening method which is referred to herein as a two unwrap offset flattening process as disclosed by U.S. Pat. No. 3,313,870. Blown tube film 460 is initially slit at two diametrically opposite locations 462 and 464, where the X axis intersects base circle 466, separating blown tube film 460 into two portions 468 and 468a (not shown for clarity) downstream of base circle 466. These portions are symmetrical with each other with respect to the XZ plane, and each half is mirror image symmetrical with itself about the YZ plane. Each respective tube film half, as exemplified by half 468, is unwrapped into layflat line 472 which is offset a distance Yo from the central longitudinal axis 474, i.e. the Z axis 474. As illustrated in FIG. 52, the amount of this offset is equal to Rb, such that layflat line 472 is directly over point 476 on base circle 466.

According to my method, the reference path of streamline 478 is modeled as a straight line between point 480 on base circle 466 and point 482 on layflat line 472. According to my chordal approximation method, the reference path length within a web can be approximated as being equal to the length given by equation (E98) for $-\pi/2 \leq \alpha b \leq \pi/2$.

FIG. 53 illustrates the ratio of the approximated reference path lengths to the approximated reference path length of the longest streamline, according to my chordal approximation method, for two unwrap offset. The collapsing height, Hc, is 25 inches. The base circle radius is 25 inches, and the length of each layflat line is 78. 54inches.

Unwrap flattening can be generalized, and analyzed, according to the teachings of my invention, using a single equation. First, the layflat line may be offset from the z axis a distance Yo. If Yo=0, the processing is that described above as unwrap flattening. If Yo=Rb, the process is that described above as unwrap offset flattening. Second, the film may be slit into several portions. The streamline location αb is measured from a Y axis which is centered with respect to the portion being analyzed, and the appropriate equation is applied over the range of αb from edge to edge of that portion of the film.

The general equation for the reference path length is given by the formula $$L(\alpha b)c = \sqrt{Rb^{2} * \{\alpha b^{2} + 1 - 2 * \alpha b * SIN\alpha b\} + Yo * [Yo - 2 * Rb * COS\alpha b] + Hc^{2}} \quad (E99)$$

For unwrap flattening without offset, Yo=0 and equation (E99) becomes equation (E97). For Yo=Rb, equation (E99) becomes equation (E98).

MODIFICATION OF STREAMLINE PATHS

As described above, my methods of approximation can be used to approximate the lengths of streamlines of a blown tube film undergoing a change in shape. Once these circumferentially varying streamline lengths have been determined for a given collapsing geometry, the frost band terminus stress at each streamline may be determined using my method for approximating the stresses in conjunction with the approximated lengths of the streamlines. The resulting stress approximations establish that there exist shape change induced circumferentially varying machine direction stresses. According to my method, the elimination of the variation of the shape change induced machine direction stresses at the frost band terminus will significantly minimize the variations of process higher thermal energy region (draw region) residence time of streamline elements and the concomitant variation within the product issuing from the tension isolated region including the commonly rather large magnitudes of variations of gauge, energy to break, and machine direction lengths of the solidified material. Further, through the minimization of the magnitude of variation of the circumferentially varying machine direction stresses and the gradients associated with those stresses, thereby improving the uniformity of the residence time of material elements within any higher thermal energy states of material elements which might occur within any tension isolated region of the process, there is offered, thereby, potential to structure more uniformly the macromolecular arrangements existing within the material issuing from the process plus allowing the blown film extrusion of higher modulus materials than have heretofore been possible.

As my methods of approximation indicate above, the elimination of the variation between the shape change induced circumferentially varying stresses at the frost band terminus is accomplished by substantially equalizing substantially all of the solid material streamline from the frost band terminus to the downstream tension isolation line within any tension isolated region within which a blown tube film undergoes a flattening or unflattening shape change and within which an orientation region exists. It should be understood that the equalization of the lengths of the solidified streamline not only results in the elimination of variation of the shape change induced machine direction stresses, but actually reduces the shape change induced machine direction stresses at the frost band terminus to nearly zero. How close to zero the shape change induced machine direction stresses are reduced depends upon how many and how accurately streamline lengths are equalized.

Since for a given collapsing geometry, the longest streamline length within the collapsing region is determined by the collapsing geometry as are the lengths of all other streamlines within the collapsing region, the path length of each respective shorter streamline must be increased by an amount equal to the difference in length between the longest streamline within the collapsing region and the length of the respective shorter streamline within the collapsing region. Since, as described above, the difference in the shorter streamline lengths occurs in the sail sections for any given collapsing geometry, the length of any identified streamline can be equalized to the length of the longest streamline by increasing the path length of the identified streamline by an amount equal to the difference in length between the sail section segment of the identified streamline and the corresponding portion of the longest streamline. As described above, the lower corresponding portion of the longest streamline is that portion of the longest streamline which extends from the base circle and terminates at the cross section at which the sail section segment of the identified streamline terminates.

In order to cause a plurality of differential elements of the film to follow respective paths which are approximately equal in length, it is necessary to provide a device for modifying, or defining the streamline paths of the solidified differential elements so that they are approximately equal. Such a path defining device may be positioned within any tension isolated process region between a tension isolating device and an orientation region, within or adjacent to any flattening or unflattening shape change region. The path defining device should not be placed within the tension isolated region of the process within any higher material internal energy region whereat the material is no longer solidified to preclude the path modifying device from contacting the moving film surface while the film is at higher thermal energy level.

Described below are preferred embodiments of path defining devices for a blown tube film undergoing A-Frame collapsing with nip roll collapsing, as well as A-Frame collapsing with a layflat region between the exit of the A-Frame collapser and the nip rolls. As shown below, the path defining device may be placed in the tube region, in the collapsing region, or in the layflat region (if existent). Although A-Frame collapsing is generally shown, it will be appreciated that the principles and functions of the path defining device may be applied to any type of collapsing or unwrapping.

The cross sectional shape of each disc, as described below, must be identical to the reference cross sectional shape of the blown tube film at the location at which the respective disc is disposed, whether disposed in the tube region or the collapsing region (as described below), so that, without external rings interposed between adjacent discs, the streamline paths of the blown tube film will not be affected by the discs nor will the film be laterally stretched.

Figure 54:
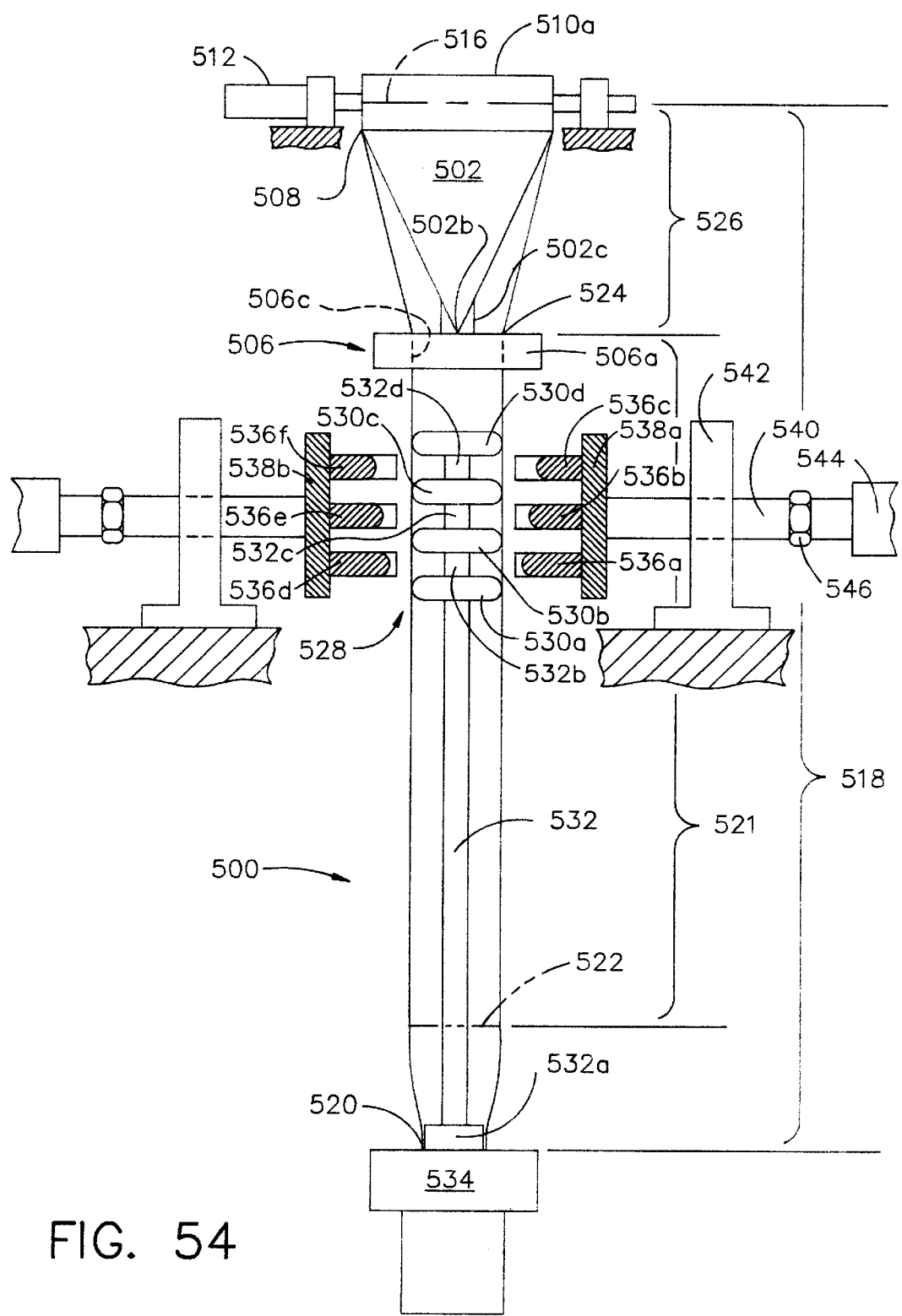
FIG. 54 is a diagrammatic front elevational view of a blown tube film undergoing A-Frame with nip roll collapsing with a 3 ring path defining device located in the tube region.
Figure 55:
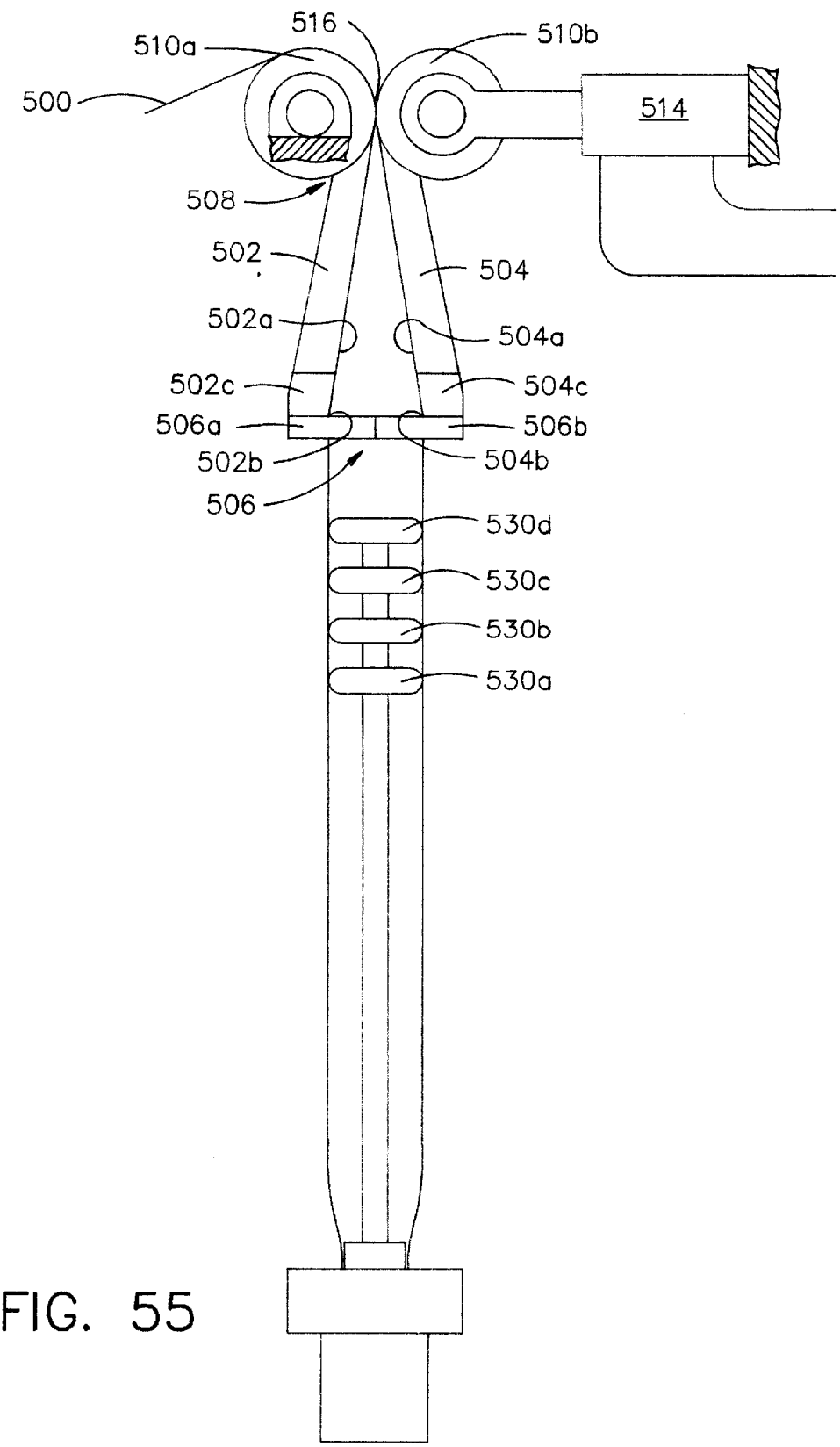
FIG. 55 is a diagrammatic side elevational view of the blown tube film of FIG. 54.

Referring to FIGS. 54 and 55, blown tube film 500 is shown undergoing A-Frame collapsing with nip roll collapsing. The A-Frame collapsing is effected by V-Boards 502 and 504, which define respective collapsing geometry boundaries 502*a* and 504*a*, which are coincidental with the two face sections of blown tube film 500. The support for V-Boards 502 and 504 is not shown, as it is well known. Base circle ring 506 is disposed about film 500 immediately adjacent lower apex 502*b* and 504*b* of V-Boards 502 and 504. Base circle ring 506 comprises two portions 506*a* and 506*b* which may be positioned adjacent each other about film 500, forming circular aperture 506*a* through which film 500 passes. Circular aperture 506*a* confines film 500 to a circular cross sectional shape having a radius Rb, which is the radius of film 500. Base circle ring 506 functions to ensure that the cross sectional shape of film 500 is generally circular adjacent the point of first contact with collapsing geometry boundaries 502*a* and 504*a*, although it may be possible to omit base circle ring 506. Base circle ring 506 is carried by the A-Frame collapser framework (not shown), and it is illustrated in FIGS. 54 and 55 as being attached to V-Boards 502 and 504 by supports 502*c* and 504*c*.

Located tangentially to film 500 at A-Frame collapser exit 508 are nip rolls 510*a* and 510*b*. The nip rolls are driven by nip roll drive motor 512. Nip roll 510*a* is fixed in place, while nip roll 510*b* is horizontally movable by actuation of cylinder 514. As illustrated in FIGS. 54 and 55, layflat line and nip roll line are coincidental, and are identified collectively by the numeral 516.

As shown best in FIG. 54, tension isolated region 518 of film 500 extends from die exit 520 to nip line 516. Tube region 521 extends from frost band terminus 522 to base circle 524. Collapsing region 526 extends from base circle 524 to layflat line 516.

Path defining device 528 is disposed within tube region 520. Path defining device 528 includes a plurality of discs 530*a*, 530*b*, 530*c* and 530*d* disposed within film 500, concentric with the longitudinal axis (not shown). Discs 530*a–d* are carried by disc support 532, which is supported by die 534 at its base 532*a*. Discs 530*a–d* are spaced apart by individual spacers 532*b*, 532*c* and 532*d*. Discs 530*a–d* are diagrammatically illustrated from the side, or profile view. As will be detailed below, discs 530*a–d* have a circular cross sectional shape (i.e., perpendicular to the longitudinal axis) having a maximum radius equal to Rb. Discs 530*a–d* are identical to each other, and are spaced apart an equal amount. When path defining device 528 is not engaged, as shown in FIG. 54, discs 530*a–d* do not affect the streamline paths within tube region 520, although the presence of discs 530*a–d* within film 500 may serve to stabilize the tube. It is also noted that sufficient air passageways (not shown) may be provided so that discs 530*a–d* do not pneumatically isolate any portions of the air encapsulated within film 500.

Rings 536*a–f* are disposed about the exterior of film 500, generally aligned with respective gaps between adjacent discs 530*a*–530*d*. Rings 536*a–c* are supported by first ring support 538*a*, while corresponding rings 536*d–f* are supported by second ring support 538*b*. First ring support 538*a* is disposed diametrically opposite second ring support 538*b*, which in FIG. 54 are generally aligned with the edge streamlines (as defined above). Since, due to symmetry, the construction and function of rings 536*a–c* are identical to corresponding rings 536*d–f*, only rings 536*a–c* will be described in detail.

First ring support 538*a* is carried by ring actuator 540, which is slidably supported by support 542. Actuator 540 is moved by cylinder 544. Position adjusting nut 546 is carried by actuator 540, and its linear position may be varied with respect to actuator 540.

Figure 56:
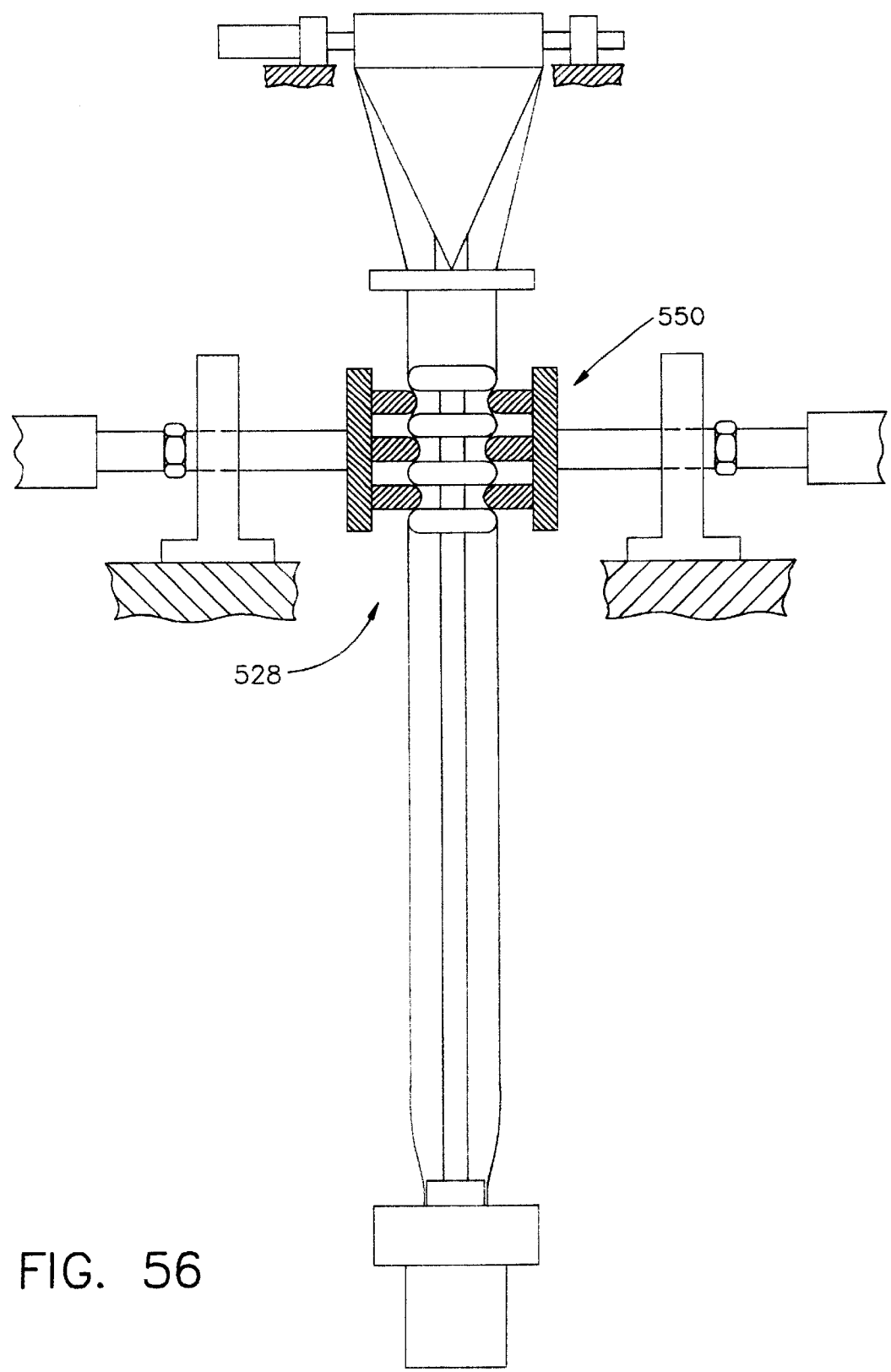
FIG. 56 is a diagrammatic front elevational view of the blown tube film of FIG. 54 with the rings engaged.

FIG. 54 illustrates path defining device 528 in the disengaged, or off, position. In the disengaged position, path defining device 528 does not affect the paths of any streamlines. Referring now to FIG. 56, path defining device 528 is shown with rings 536*a–f* in the engaged position, whereby the path lengths of streamlines are to follow respective serpentine paths between adjacent discs such that the total path lengths within the tension isolated region are approximately equal. All portions of the serpentine paths are located a distance less than or equal to Rb from the central longitudinal axis (not shown) of tube 500. Rings 536*a–f* are shown interposed, or immersed, between discs 530*a–d*.

Discs 530*a–d* function as internal film restricting surfaces which constrain film 500 to a lateral circular cross sectional shape at the central plane of each disc, having a radius, Rb, centered along the central longitudinal axis. Rings 536*a–f* function as external film restricting surfaces which constrain most of the streamlines which comprise film 500 to follow respective serpentine path between adjacent discs. The combination of internal and external film restricting surfaces provides positive and accurate radial streamline length control and definition. The actual length of these serpentine paths are longer than the reference path lengths when rings 536*a–f* are disengaged.

In operation, the blown film process is begun with rings 536*a–f* disengaged. In the disengaged position, film 500 has circumferentially varying streamline length differences which cause deleterious affects on film quality. Once the process is running, rings 536*a–f* can be engaged, thereby equalizing streamline path lengths and reducing shape change induced machine direction stresses essentially to zero. It is noted that although rings 536*a–c* and 536*d–f* are actuated simultaneously by respective actuators, each of the rings may alternatively be supported and actuated individually, as will be described below. Furthermore, it is noted that the number of rings and discs, and the amount of streamline length modification effected by each pair of discs and respective ring are selected such that the total streamline path modification results in substantially eliminating frost band terminus shape change induced machine direction stresses.

Figure 57:
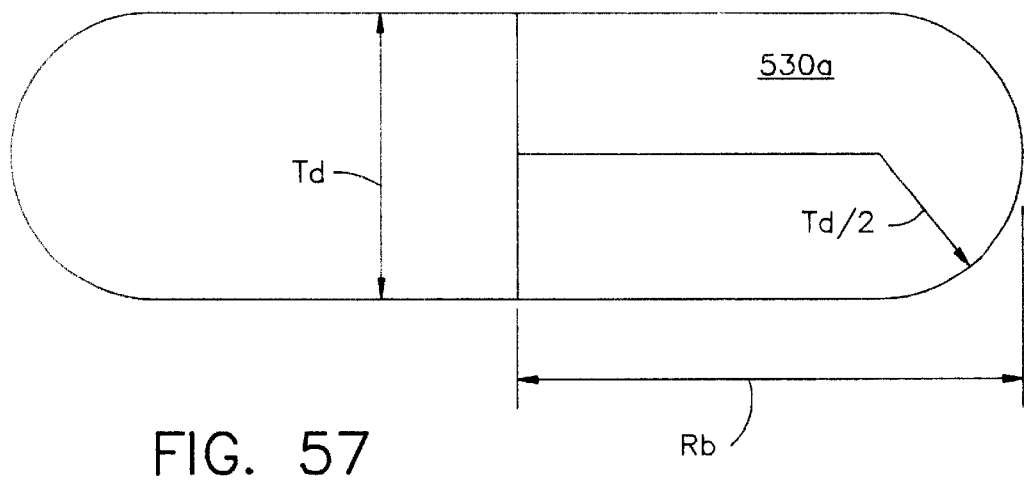
FIG. 57 is a diagrammatic view of the profile of a disc.
Figure 58:
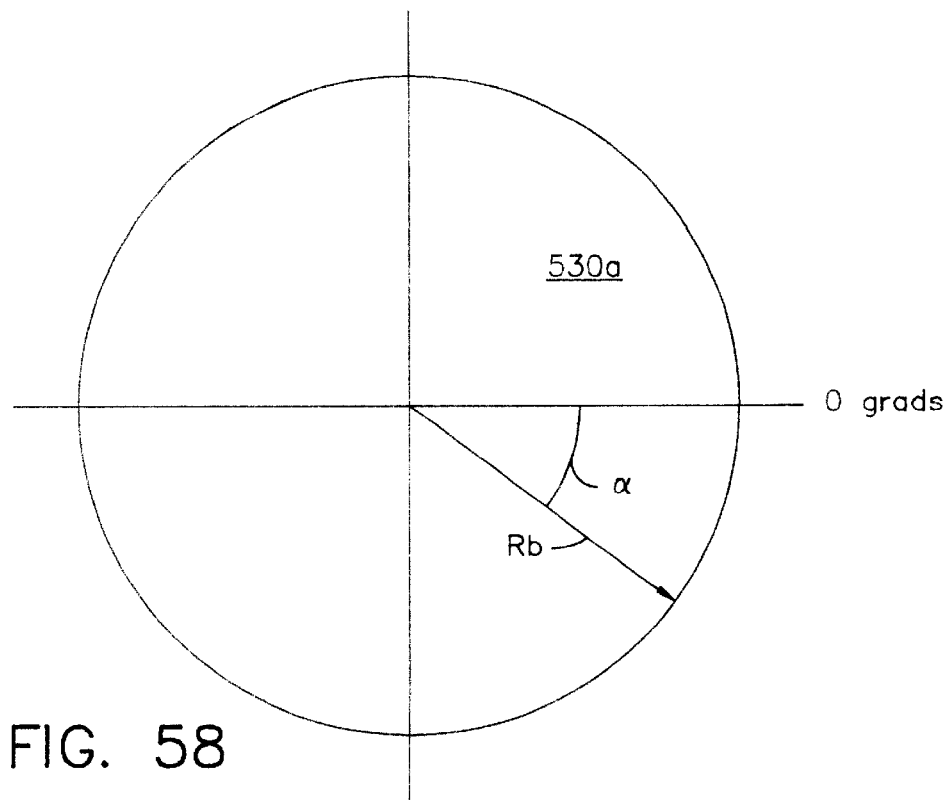
FIG. 58 is a cross-section of the disc of FIG. 57 taken at its center.

Since the amount of streamline path length modification, or increase, varies circumferentially, it is necessary the that path defining device be designed to provide circumferentially varying streamline path lengths. Although various geometric shapes may be used, in the preferred embodiment, the discs which define the internal film restricting geometric surfaces are circular in cross sectional shape, having a constant radius Rb, with a uniform profile in all radial directions. Referring to FIG. 57, there is shown a typical profile of disc 530*a*. As previously mentioned, disc 530*a* through 530*d* are identical. The profile of FIG. 57 shows disc 530*a* having a total thickness Td. The outer edge of the profile has a constant profile radius equal to Td/2. As shown in FIG. 58, the lateral radius at the central plane of disc 530*a* is constant throughout all angles a (which correspond to the streamline angular locations at the base circle, αb), and equal to Rb. The discs are located within the interior of film 500 without increasing or stretching the perimeter of film 500 within tube region 520 as film 500 passes over discs.

Figure 59:
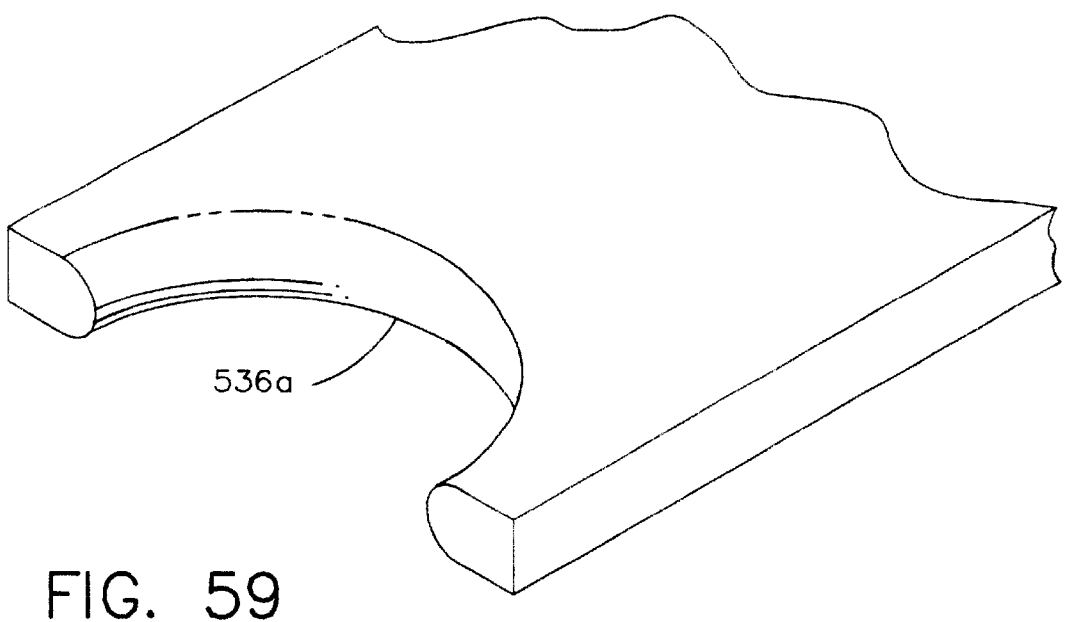
FIG. 59 is a diagrammatic perspective view of a ring.
Figure 60:
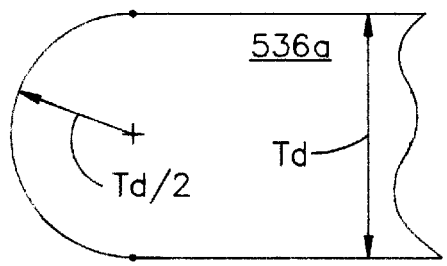
FIG. 60 is a diagrammatic fragmentary view of the profile of the ring of FIG. 59.
Figure 61:
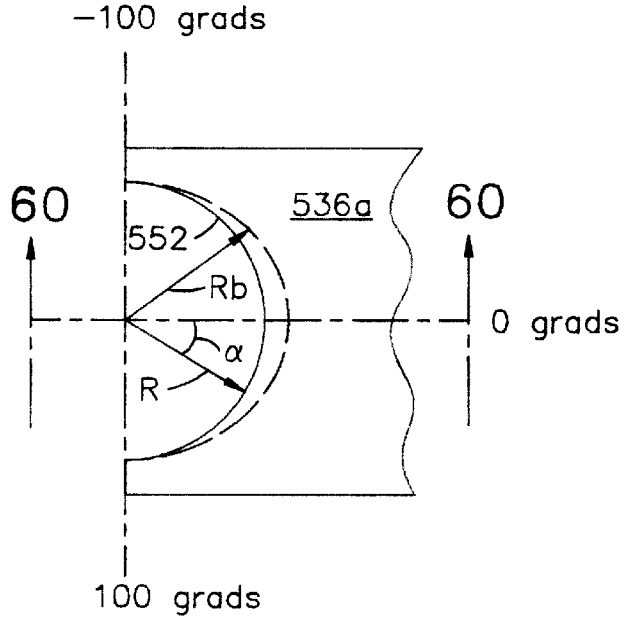
FIG. 61 is a cross-section of the ring of FIG. 59 taken at its center.

Since the amount of modification of the streamline path lengths must vary circumferentially, and since the interiorally disposed discs 530*a–d* do not vary circumferentially in geometry or dimensions, the circumferential variations are occasioned by geometric and dimensional variations of rings 536*a–f* which cause radial modifications to the streamline paths and lengths. Referring to FIG. 59, there is shown a perspective view of ring 536*a* which comprises an exterior film restricting surface. In the preferred embodiment, ring 536*a* has a uniform profile as shown in FIG. 60. The profile radius of ring 536*a* is constant, equal to Td/2 (the profile radius of the discs), and centered on the central plane. As indicated in FIG. 61, the lateral radius at the central plane of toric external film restricting surface 552 of ring 536A varies as a function of the angular location about surface 552. It is noted that in the preferred embodiment, this radius, R, is less than Rb (shown in dashed lines) at all locations other than the location of the longest streamline.

The surfaces of the discs and rings which constitute internal and external restricting surfaces, respectively, may be smooth so as to minimize any drag on the film thereby. Alternatively, these surfaces may be roughened, woven metal or porous sintered metal supplied with an air boundary layer so as to operate as air bearing surfaces between the surfaces and the film. It is noted that the internal bubble pressure must not be adversely affected by an internally disposed air bearing surface.

Figure 62:
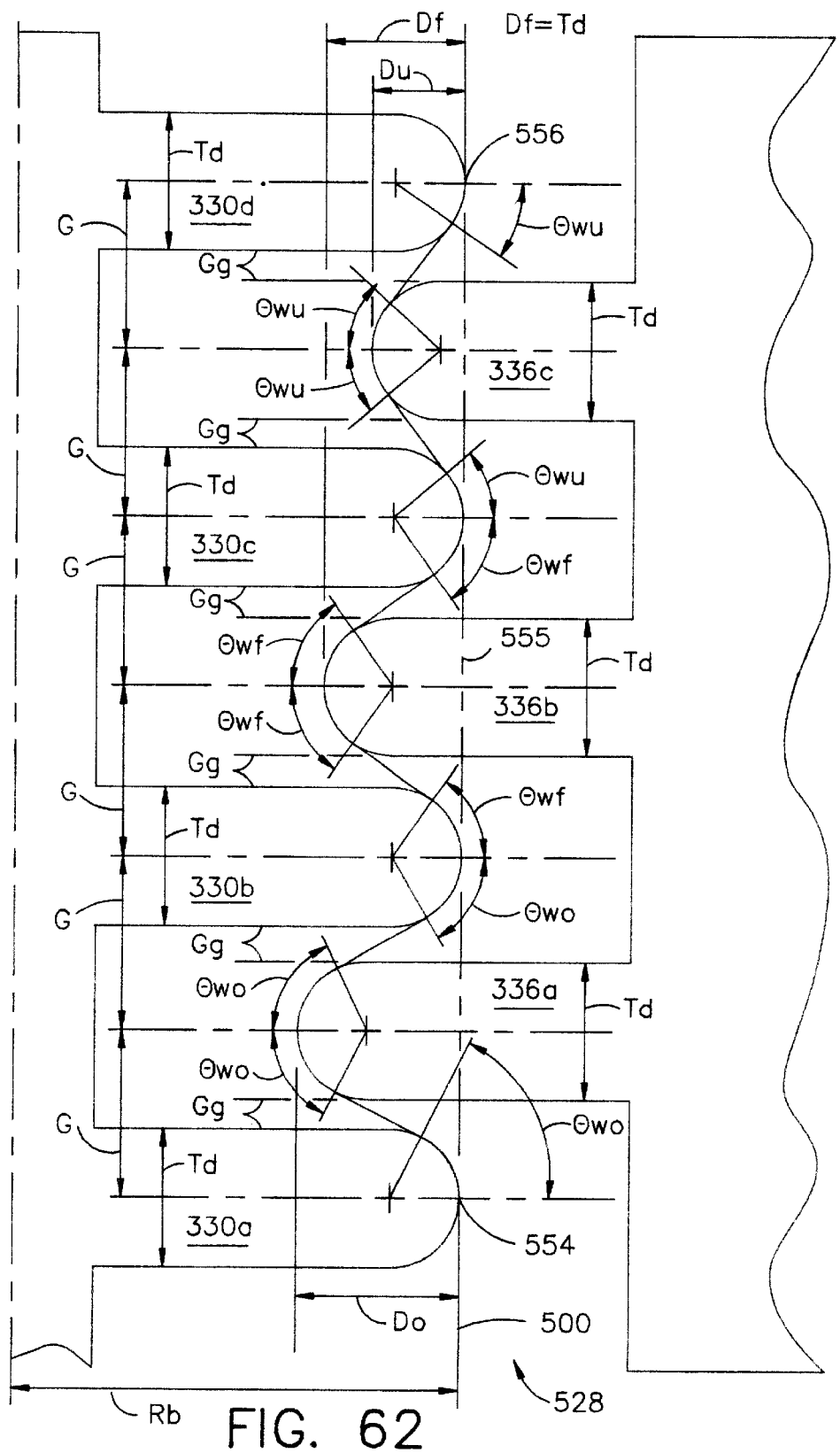
FIG. 62 is a diagrammatic fragmentary view of a 3 ring engagement profile.

Referring now to FIG. 62, there is shown an enlarged diagrammatic view of the engagement profile of path defining device 528 and the resulting serpentine path of film 500. The phantom line 555 between point 554 and point 556 represents the reference path of film 500 prior to engagement. FIG. 62 shows the center line of discs 338*a–d* equally spaced from each other by a distance 2G.

Rings 336*a–c* are interposed, or radially immersed, between respective adjacent discs, being spaced equal longitudinal distances Gg from the respective adjacent discs. This gap between each disc and ring is critical with respect to equalizing the streamline path lengths of the solidified differential elements. The smaller Gg is, the longer the streamline path is between adjacent discs with an interposed engaged ring. Different depths of immersion are illustrated for each ring 336*a–c*. The depth of immersion, D, for a ring is the horizontal distance between the outer perimeter of the aligned adjacent discs and the inner perimeter of the respective ring. With ring 336*a*, the immersion depth is greater than Td, and is designated Do and referred to herein as overnesting. With reference to ring 336*b*, the immersion depth is equal to Td, and is identified by Df, and referred to herein as fullnesting. In the fullnest, the center of the profile radii of the ring and the centers of the profile radii of the two adjacent discs are collinear. In reference to ring 336*c*, the immersion depth is less than Td, identified by Du and referred to herein as undernesting. Overnesting, fullnesting or undernesting may be incorporated as necessary. It is noted that the amount of nesting may vary angularly for each ring.

The depth of immersion must not be so large as to cause the film to wrinkle. It is believed that wrinkling can occur if the lateral stress in the film is zero at any cross-section, however, it is also believed that immersion beyond this point can be utilized so long as no permanent wrinkling actually occurs. Effecting sufficient streamline path length modification without wrinkling can be accomplished by the selection of the thickness of the discs and rings, since it is depth of immersion not thickness, which can cause wrinkling. The total streamline path modification may be accomplished by using enough rings and discs of sufficient thickness to accomplish the modification without immersing the rings deep enough to cause permanent wrinkling.

It is noted that by creating a serpentine path for streamlines of film 500 by defining the actual paths radially inwardly, the perimeter of film 500 is not stretched transversely, either elastically or inelastically. Various other geometric characteristics of and relationships between the discs and the rings, including spacing profile radius, cross sectional radius, nesting, quantity may be utilized, so long as the net effect is to cause the solidified differential elements to follow respective streamline paths which are appropriately equal in length.

Figure 63:
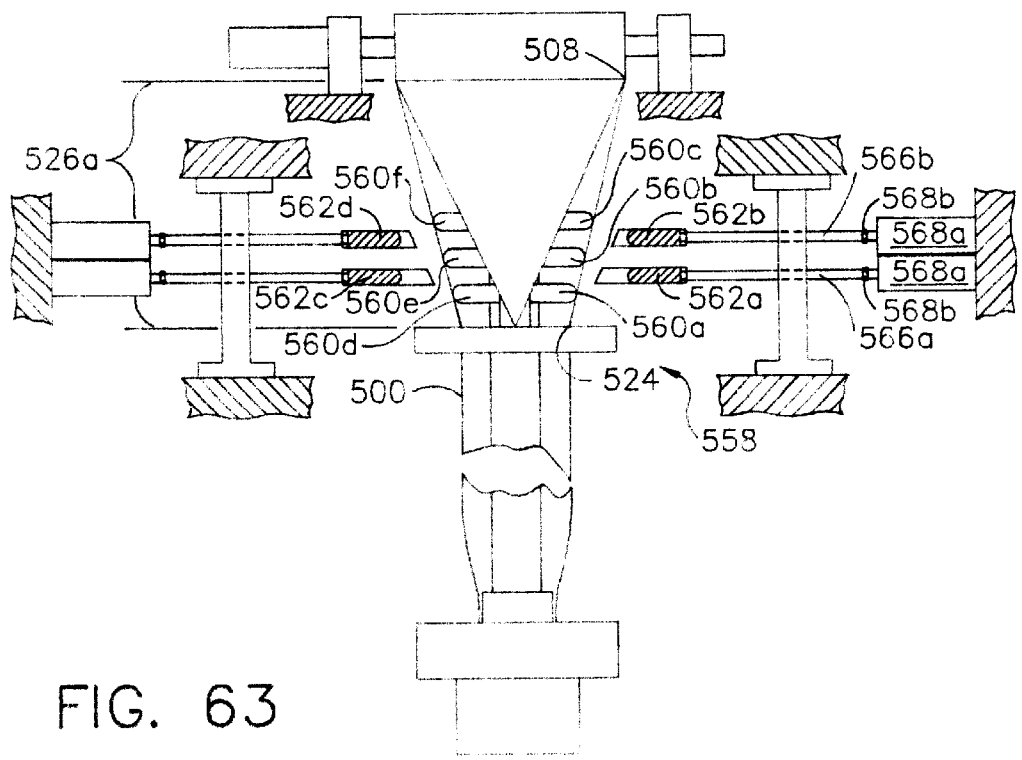
FIG. 63 is a diagrammatic front elevational view of a blown tube film undergoing A-Frame with nip roll collapsing with a 2 ring path defining device located within the collapsing region.

FIG. 63 is substantially the same as FIG. 54, with the only exception being in the construction and placement of path defining device 558. All other elements, nomenclature and design criteria remain the same. Path defining device 558 is disposed to engage blown tube film 500 within collapsing region 526, and more specifically within the A-Frame collapsing region 526*a* which extends from A-Frame collapser exit 508 to base circle 524. Path defining device 558 includes discs 560a–c disposed on one side of A-Frame collapsing region 526a, and discs 560d–f disposed on the opposite side. Path defining device 558 includes rings 562a and 562b which are aligned with the respective gaps between adjacent discs 560a–c, and rings 562c and 562d, which are aligned with the respective gaps between adjacent discs 560d–f.

Figure 64:
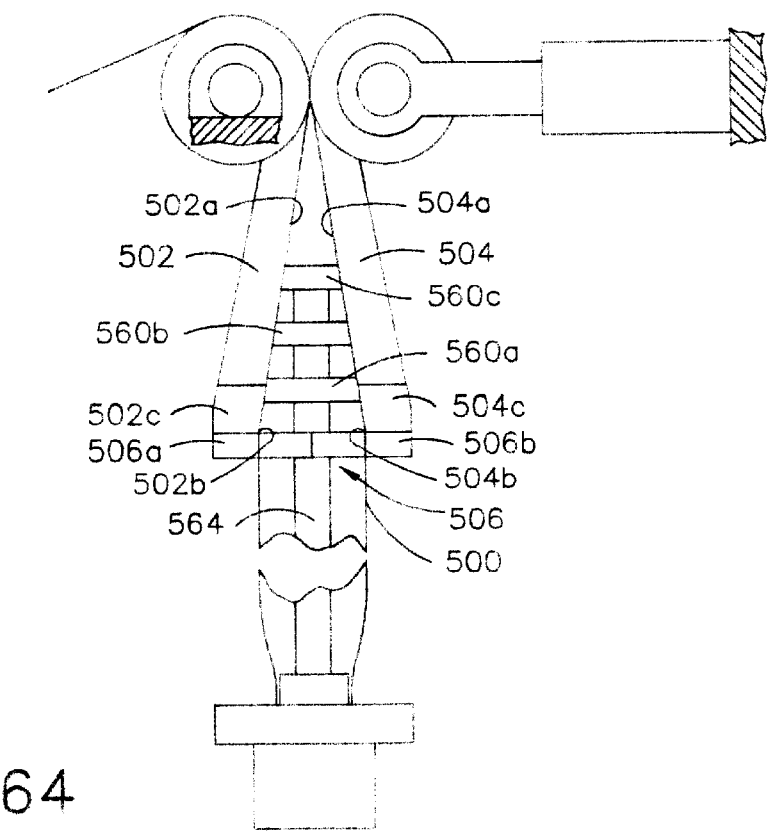
FIG. 64 is a diagrammatic side elevational view of the blown tube film of FIG. 63.
Figure 65:
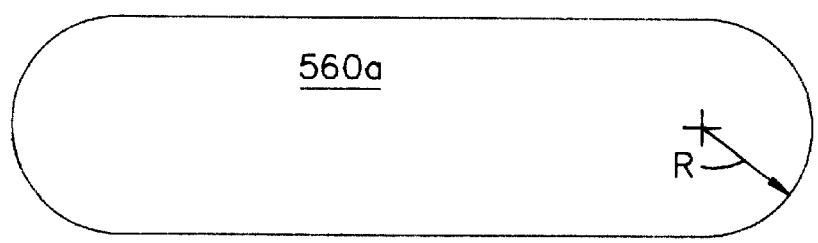
FIG. 65 is a cross-sectional view of a disc of FIG. 63 taken through the center line of the disc.

Referring to FIGS. 63 and 64, and describing only discs 560a–c and rings 526a–b, with the understanding that the discs 560d–f and rings 562c–d are identical in design and function, disc 560a–c are disposed in the interior of the film 500, supported by disc support 564. The combined central plane cross-sectional shape as shown in FIG. 65 of each disc pair (i.e. 560a and 560d, 560b and 560e, 560c and 560f) is identical to the assumed cross-sectional shape of film 500 at the height of the central plane of disc 560a and the respective disc (herein referred to as the disc plane).

Figure 66:
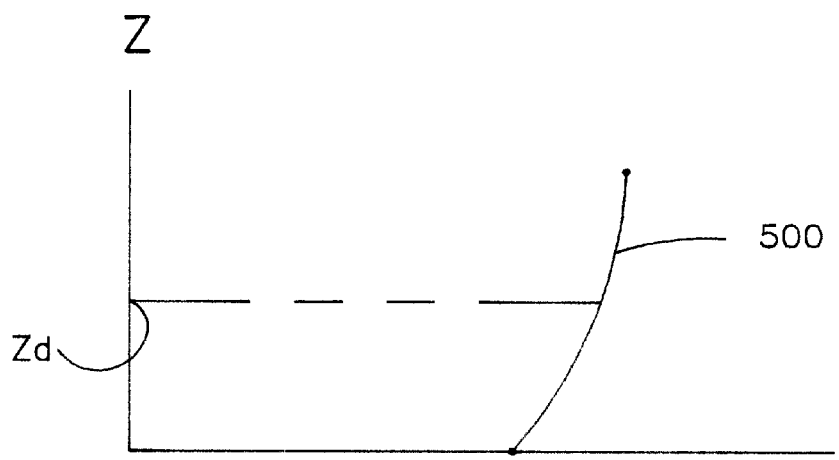
FIG. 66 is a diagrammatic illustration of a machine direction cross-section of the film in the sail region at α1.
Figure 67:
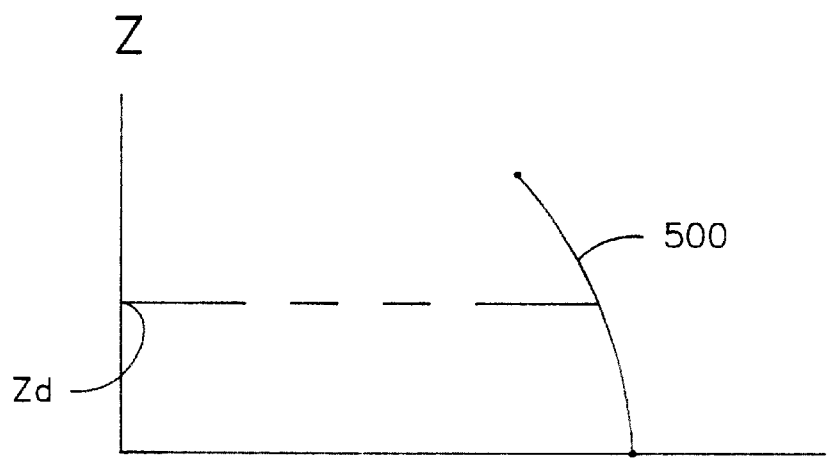
FIG. 67 is a diagrammatic illustration of a machine direction cross-section of the film in the sail region at α2.

It is noted that the angle of inclination of the reference path of a streamline of film 500 at any given point or element within the sail section varies with respect to the circumferential position and the height above the base circle. For example, FIGS. 66 and 67 diagrammatically illustrate the concept of the variation of angle of streamline inclination. FIG. 66 illustrates a 1-1 direction cross-section, taken through film 500 in the sail section for a streamline αb1, "leaning" outward away from the Z axis. FIG. 67 illustrates a 1-1 direction cross-section, taken through film 500 in the sail section for a second streamline αb2, "leaning" inward toward the Z axis. The 1-1 direction radius of curvature for any point or element along the streamline reference path is not necessarily constant for all elevations, z, above the base circle plane. Thus, for a disc located at height zd above the base circle plane, the αb1 streamline may lean outward and the αb2 streamline may lean inward.

In order to avoid distorting the path of the streamline segments when the rings are not engaged, it is necessary that the 1-1 direction profile of the internally disposed discs shaped complementarily to the path of the streamline. The equations given above for the coordinates of a point within the sail section as a function of height may be used to determine the necessary shape and 1-1 direction profile.

Figure 68:
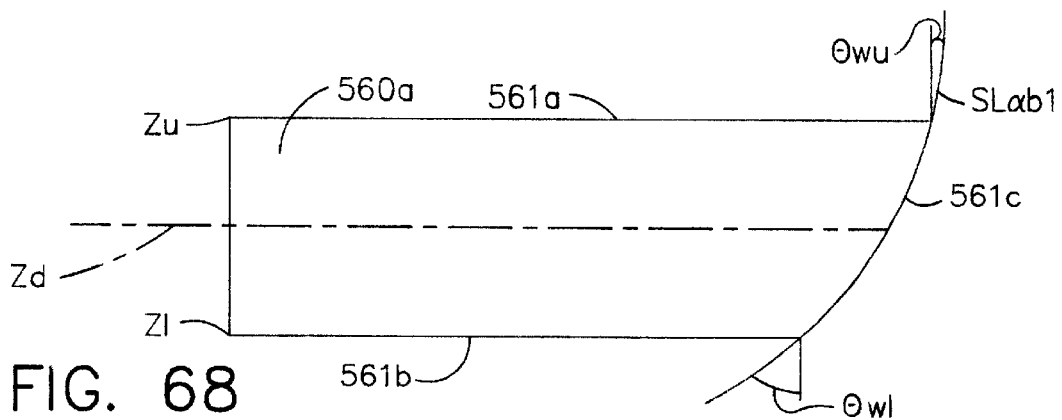
FIG. 68 is a fragmentary diagrammatic illustration of a machine direction cross section of a disc and the reference path streamline of the film at α1.

FIG. 68 illustrates a 1-1 direction cross section of disc 560a for the reference path of a streamline at αb1, with its central plane located at Zd. Disc 560a has an upper surface 561a located at elevation Zu, and a lower surface 561b located at elevation Zl. The reference path of streamline αb1 has an angle of inclination at Zu of θwu, and an angle of inclination at Zl of θw1. Nose 561c of disc 560a has the same radius of curvature as the reference path of streamline αb1.

Figure 69:
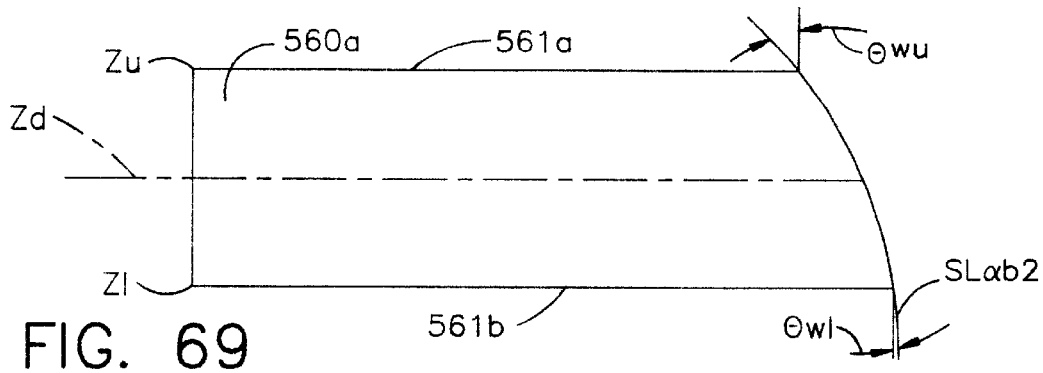
FIG. 69 is a fragmentary diagrammatic illustration of a machine direction cross section of a disc and the reference path streamline of the film at α2.

FIG. 69 illustrates a 1-1 direction cross section of disc 560a for the reference path of a streamline at αb2 similar to FIG. 68. At this location, nose 561c has the same radius of curvature as the reference path of streamline αb2.

Figure 70:
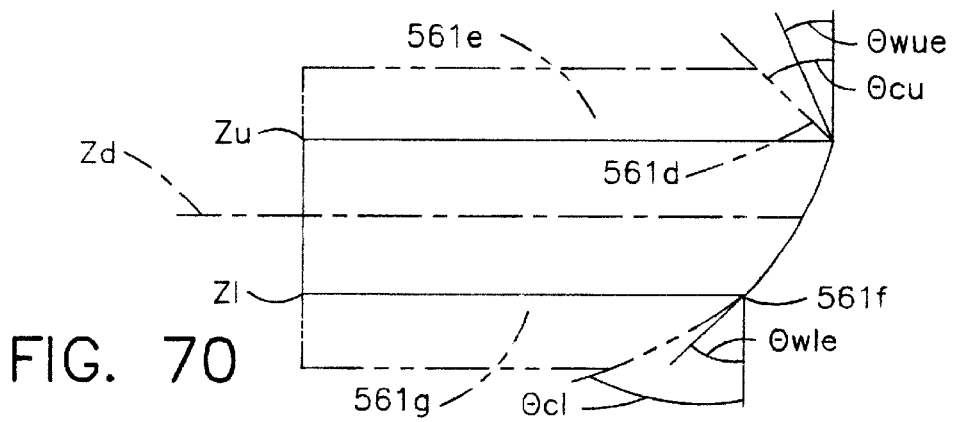
FIG. 70 is an illustration of the disc and film of FIG. 68 showing a representative film path when a ring is engaged and showing extended portions of the disc in phantom lines.

Referring to FIG. 70, the 1-1 direction cross section of the reference path of streamline αb1 is shown for when the rings (not shown) are engaged. The angles of inclination of the reference path of streamline αb1 are identified as θue and θw1e, where θwu>θwue (if positive angles are measured clockwise from the vertical, and negative angles are measured counter clockwise) and θw1<θw1e.

Figure 71:
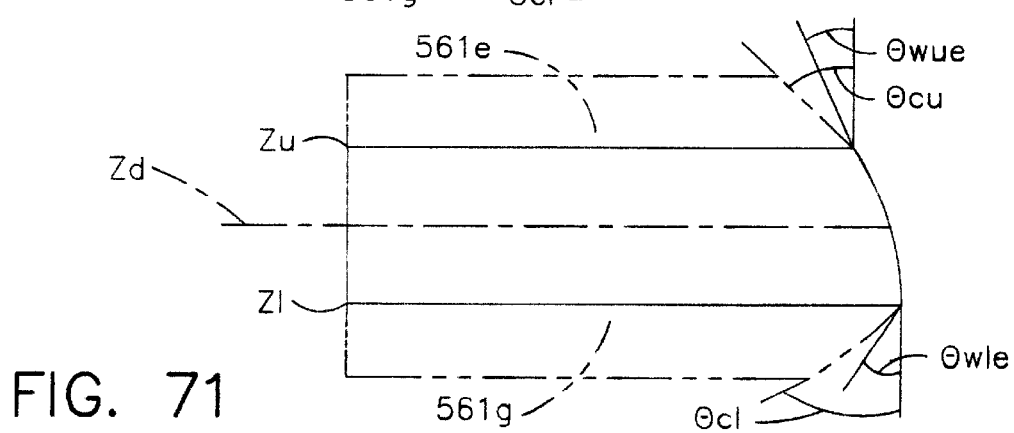
FIG. 71 is an illustration of the disc and film of FIG. 69 showing a representative film path when a ring is engaged and showing extended portions of the disc in phantom lines.

Also shown in FIG. 70 are phantom lines illustrating that disc 560a may be thicker than as shown in the solid lines. Zl and Zu are the lower and upper elevations through which disc 560a must be shaped complementarily to the reference paths of the streamlines of the film, i.e. the reference shape of the film. If disc 560a extends further than Z1 and Zu, then the shape of the extended portions must be considered when determining the total streamline segment length modification. Preferably, these extended portions will be shaped so as not to affect the streamline segment lengths when the rings are engaged. Nose portion 561d of upper extended portion 561e is illustrated as straight, having an angle of inclination, θcu, which is less than θwue (according to the positive angle direction described above). Nose 561f of lower extended portion 561g has an angle of inclination ece which is greater than θw1e. FIG. 71 illustrates a similar construction of disc 560a for streamline αb2.

The rings may be made with alternative profiles, although the problem of streamline path distortion is not a problem for the rings, since the purpose of the rings are to distort the streamline reference path so as to define the streamline path such that its length will be equal to the length of the longest streamline path when the rings are engaged. It is necessary to configure the profile, location, immersion, etc. of the rings complementarily with the discs to achieve precise streamline path definition to produce the desired streamline path length.

Rings 562a and 562b are shown in FIG. 63 as being mounted separately, carried by respective actuators 566a and 566b which are independently operable. Both actuator 566a and 566b are driven by respective cylinders 568a and include respective position adjusting nuts 568a and 568b. As described above for rings 536a–f, in the preferred embodiment, rings 562a–b have a constant profile radius, Td/2, centered at the central plane of the rings, which defines the external restricting surface of rings 562a and 562b. The central plane cross-sectional radius of the external restricting surfaces of rings 562a and 562b is not constant, but rather varies with respect to the angular circumferential position. The central plane cross-sectional radii of rings 562a and 562b, as well as the depth of immersion, are selected so as to define each respective streamline path as necessary to equalize the streamline lengths in cooperation with discs 560a–c.

Returning to FIG. 63, there is a small portion of the sail sections adjacent either side of the SL(100) position which contain streamlines that contact the collapsing geometry boundary (i.e. become part of the face section) which do not contact any ring correction surface, (i.e. reference paths for which Zc is less than the height above base circle of the lower surface of the first correcting ring 562a). In order to control the actual path lengths of these streamlines, a path defining device (not shown), similar to that described above in reference to FIGS. 50–58, which affects the paths of only these streamlines adjacent SL(100) in the tube region may be used. It is noted that the reference path lengths of these streamlines are nearly equal to the length of the longest streamline length and, depending upon the design of the collapser region path defining device 558, may not be necessary.

Figure 72:
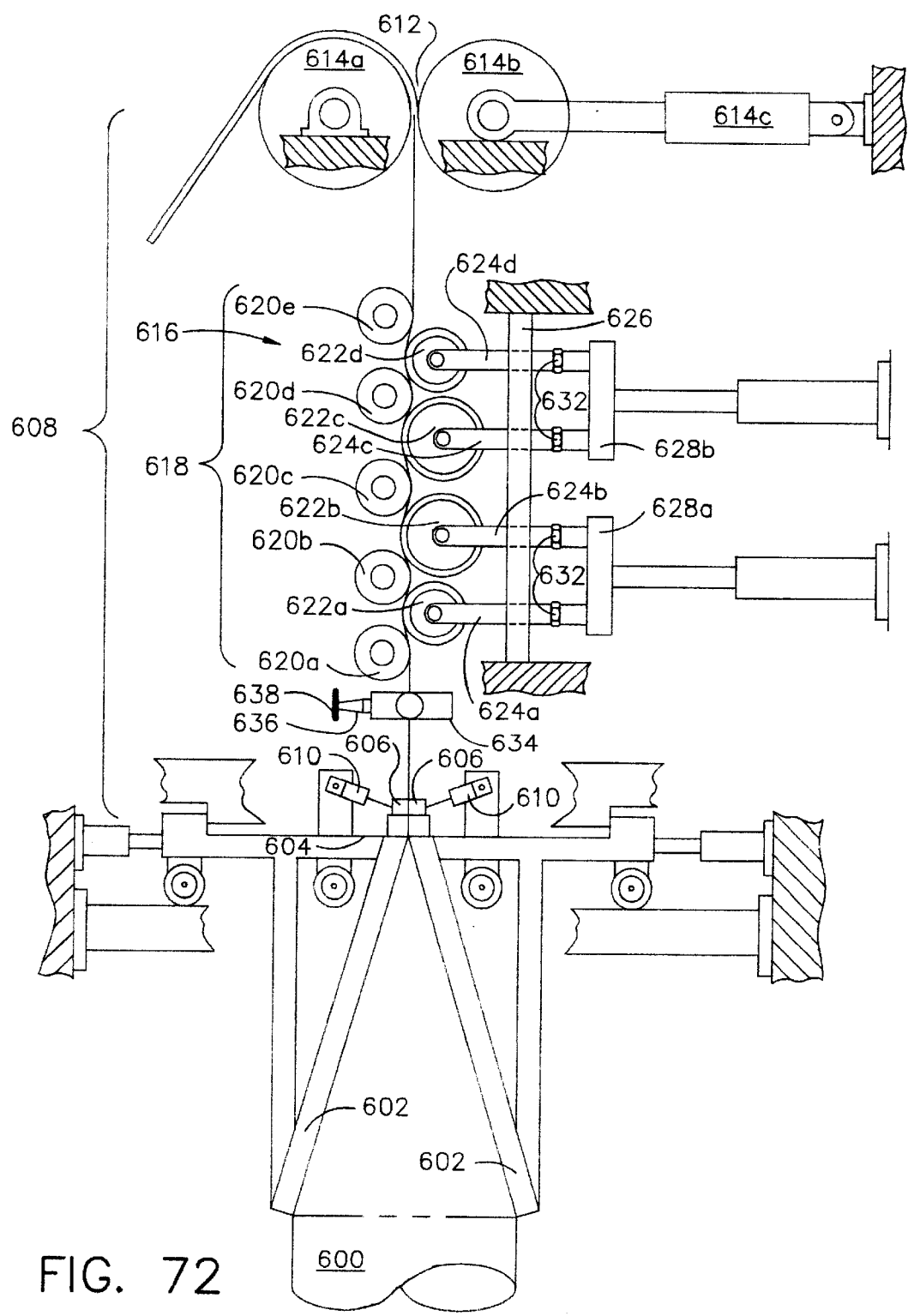
FIG. 72 is a diagrammatic side elevational view of a blown tube film undergoing A-Frame collapsing, with a path defining device located in the layflat region.

Referring now to FIG. 72, there is shown blown tube film 600 undergoing A-Frame collapsing effected by A-Frame collapser 602. In order to ensure the formation of the layflat configuration immediately adjacent A-Frame collapsers exit 604, collapser apex bearing surface 606 is disposed adjacent exit 604 on either side of film 600. Collapser apex bearing surface 606 does not operate as a tension isolation device, but rather seals off the internal bubble pressure from the layflat region 608, i.e. isolates pressure without isolating tension (even though some tension will result uniformly in the film downstream). Collapser apex bearing surfaces 606 are actuated by pneumatic cylinders 610 which are regulated to prevent bearing surfaces 606 from becoming a tension isolating device.

Layflat region 608 extends from the formation of the layflat configuration at collapser apex bearing surfaces 606 to nip line 612 between fixed nip roll 614a and moveable nip roll 614b. As described above, moveable nip roll 614b is controlled by cylinder 614c. In order to define the streamline paths so as to be approximately equal, layflat region path defining device 616 is disposed adjacent film 600 within layflat region 608, defining region 618. Layflat region path defining device 616 includes identical, equally spaced apart idler rolls 620a–e. Idler rolls 620a–e are cylindrical in shape having a constant profile diameter, and are rotatably mounted about their respective longitudinal axes, tangential to the non-modified path of film 600 from collapser apex bearing surface 606 to nip line 612.

Streamline path defining rolls 622a–d are disposed on the side of film 600 opposite idler rolls 620a–620e, aligned with the respective spaces therebetween. Rolls 622a–d are carried by respective actuators 624a–d which are slidably supported by support 626. As shown in FIG. 72, actuators 624a and 624b are carried by first support 628a, while actuators 624c and 624d are carried by second support 628b. The position of each support 628a and 628b is controlled by respective cylinders 630a and 630b. The depth of immersion of rolls 622a–d are controlled by respective position adjusting nuts 632. It is noted that rolls 622a–d may alternatively be mounted and controlled independently of each other.

In the layflat region, there is a difference in material behavior through the layflat region path defining device which requires an adaption of the approach when compared with those utilized in tube region or collapsing region path defining devices. In both the tube region and collapsing region, the discs are fixed dimension features disposed adjacent the internal surface of the moving film. The discs, therefore, ensure transverse dimension uniformity as a film passes over the disc. In the layflat region, there is no fixture internal to the film to maintain the transverse direction dimensional uniformity of the layflat configuration. That is, the layflat configuration is free to shrink laterally. Although the collapser apex bearing surface allows the film to slip such that collapsing induced stresses are allowed to be passed by the film continuum from the collapsing region into the layflat region, the collapser apex bearing surface does induce a uniform machine direction stress into the film in the layflat region, which consequentially induces a temporary transverse direction shrinkage of the layflat width while the film is within the layflat region.

Figure 73:
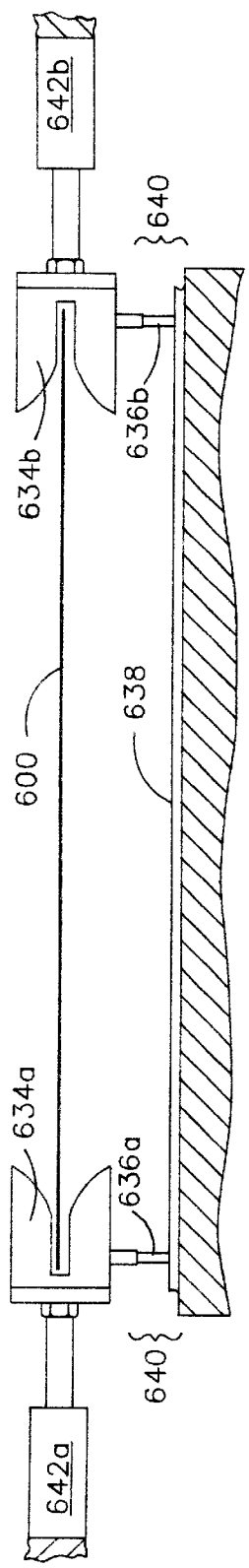
FIG. 73 is a diagrammatic top plan view showing the layflat configuration and two layflat edge followers of FIG. 72.

Because of this transverse shrinkage of the layflat width, the physical positions of the streamlines can vary with respect to the physical location of the rolls 622a–d. Since the location is variable, it is necessary to be able to vary the transverse location of rolls 622a–d. The first step in exercising such control is to monitor continuously the location of the layflat edge. To accomplish this, layflat edge follower 634 is disposed adjacent either edge of film 600. Referring to FIG. 73, a pair of layflat edge followers 634a and 634b are shown disposed adjacent respective layflat edges of film 600. Layflat edge followers 634a and 634b include respective styli 636a and 636b which are disposed adjacent electronic measuring tape 638, which provides edge position signals over signal lines 640. The position of layflat edge followers 634a and 634b are controlled by hydraulic cylinders 642a and 642b. Layflat edge follower 634a and 634b, and the associated controls thereof are commercially available from web guide equipment manufacturers, such as Fife Corporation, of Oklahoma City, Okla. Electronic measuring tape 638 and associated signal lines 640 are available from linear position sensing and control device manufacturers such as Sony Corporation.

Figure 74:
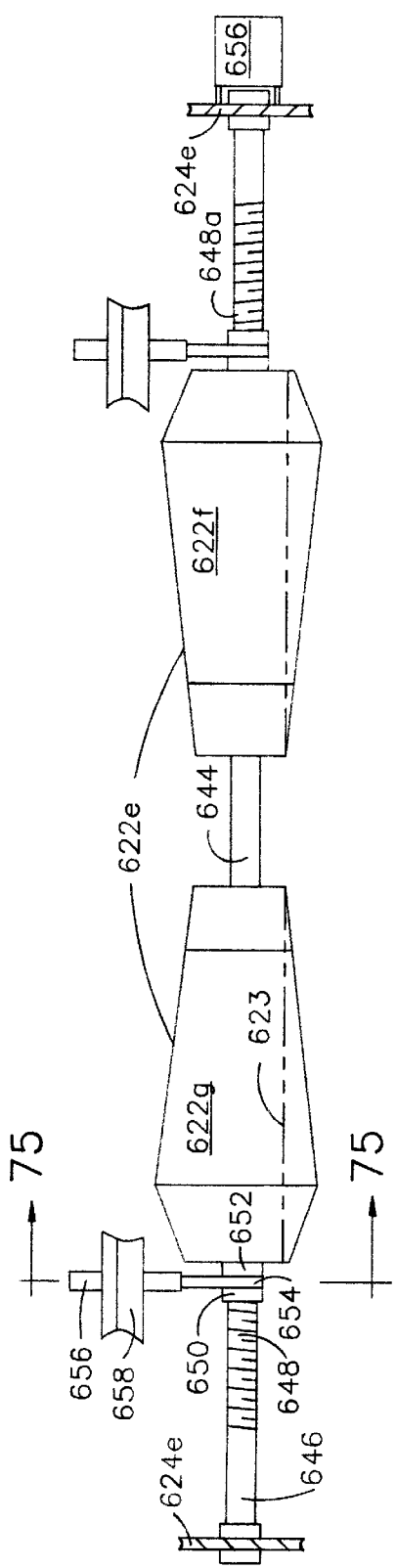
FIG. 74 is a diagrammatic top plan view of an adjustable web edge region path modifying roll.
Figure 75:
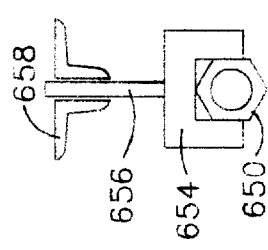
FIG. 75 is a cross-section taken along line 75—75 of FIG. 74.

Referring now to FIG. 74, there is shown adjustable web edge region roll 622e, which comprises two mirror image rolls 622f and 622g which that are rotatably supported about shaft 644. Phantom lines 623a and 623b represent the maximum depth of immersion of rolls 622f and 622g, respectively. Referring only to roll 622g, it being understood that 622f is constructed similarly, outer end 646 of shaft 644 includes threads 648 which allow transverse movement of roll 622g along shaft 644. Referring also to FIG. 75, adjustment nut 650 is carried by roll hub 652, and engages threads 648. Yoke 654 is disposed about adjustment nut 650 to prevent rotation thereof. Yoke 654 includes yoke arm 656 which is disposed in the gap provided by yoke arm guide 658 so as to prevent rotation of yoke 654. Shaft 644 is supported at either end by actuator 624e, and may be rotated by stepping motor 656. The angular position of shaft 644 is controlled in response to the layflat width of film 600 as measured by layflat edge followers 634a and 634b. Rotation of shaft 644 causes roll 622g to move transversely along the shaft axis in a manner well known. It is noted that threads 648a which control the position of roll 622f have the opposite hand thread than those of threads 648, such that rotation of shaft 644 causes rolls 622g and 622f to move toward each other or away from each other, depending upon the direction of rotation of shaft 644, so as to locate the appropriate path defining capability of rolls 622f and 622g at the locations of the appropriate streamlines.

Figure 76:
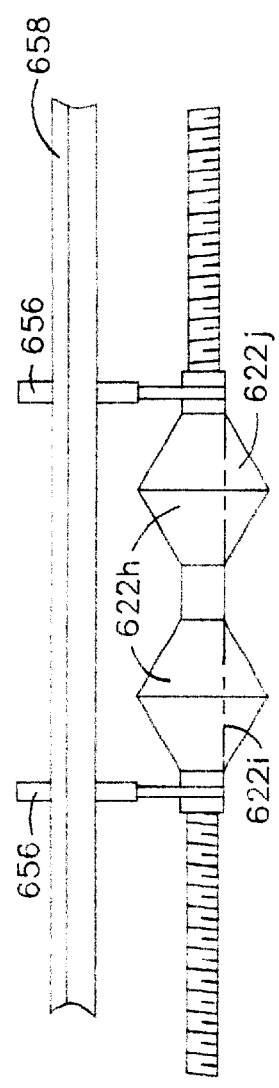
FIG. 76 is a diagrammatic top plan view of an adjustable web center region path defining roll.

Referring now to FIG. 76, there is shown an adjustable web center region roll 622h having first roll 622i and second roll 622j. The transverse position of roll 622i and 622j are controlled in the same manner as described above with respect to roll 622g and 622f. As FIG. 74 illustrates, there is a gap between roll 622g and 622f which allows adjustment of the rolls but does not affect the length of streamlines in this gap. Adjustable web center region roll 622h is designed to define the paths of the streamlines within the center gap of adjustable web edge region 622e. Rolls 622h and 622e are controlled concomitantly in order to effect the appropriate streamline path modifications across the entire layflat width of film 600. It is noted that some overlap between adjustable web center region rolls 622h and adjustable web edge region roll 622e may occur and that the shape of these rolls are designed accordingly.

In operation, the signal of each of layflat edge follower 634a and 634b is transmitted through signal lines 640 and are conditioned to interface with a computer or programmable controller. The measured layflat width may be averaged over a time span determined by the operator, yielding layflat width average values. The adjustable width between the respective rolls is then increased or decreased to the appropriate dimension in keeping with the average layflat width in order to align the streamline path defining geometry of the rolls with the appropriate streamlines.

Figure 77:
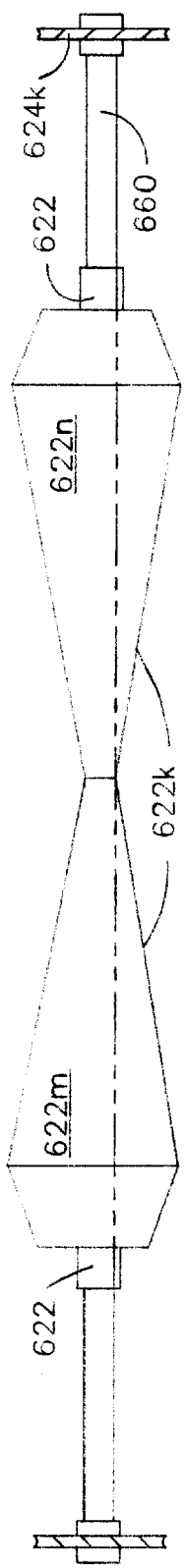
FIG. 77 is a diagrammatic view of a fixed width path defining roll.

Referring to FIG. 77, there is shown a fixed width roll 622k, which includes first roll 622m and second roll 622n. Although illustrated as separate pieces, fixed width roll 622k may be constructed as a single piece. Roll 622k is rotatably supported about shaft 660 by roll hubs 662. Fixed width roll 622k may be used in place of adjustable width rolls 622e and 622h when the lateral shrinkage is known and does not vary during the process. Under such circumstances, the streamline positions do not vary with the process, although they have been affected by the lateral shrinkage.

Rolls 622g and 622f, rolls 622i and 622j, and rolls 622m and 622n are symmetric about their axes of rotation. Thus, their cross-sectional shapes are identical to their profile, which is diagrammatically represented in FIGS. 70, 72 and 73 as linear, frustoconical shapes. The actual shapes of rolls 622g, 622f, 622i, 622j, 622m and 622n are not necessarily straight taper roll surfaces, but are configured so as to produce the desired modification, or increase, of the respective streamline lengths as indicated in accordance with my methods of approximation described above.

In layflat region path modification, the immersion of rolls 622e, 622h or 622k increases stresses in the film web. For this reasons, it is preferable that the number of rolls utilized and their respective depths of immersion be selected to avoid detrimental effects to the process and the film. Thus, multiple adjustable web edge rolls, adjustable web center rolls or fixed width rolls may be used. The rolls may be driven sufficiently to reduce the drag or inertia effects on the film without over running or actually driving the film.

Figure 78:
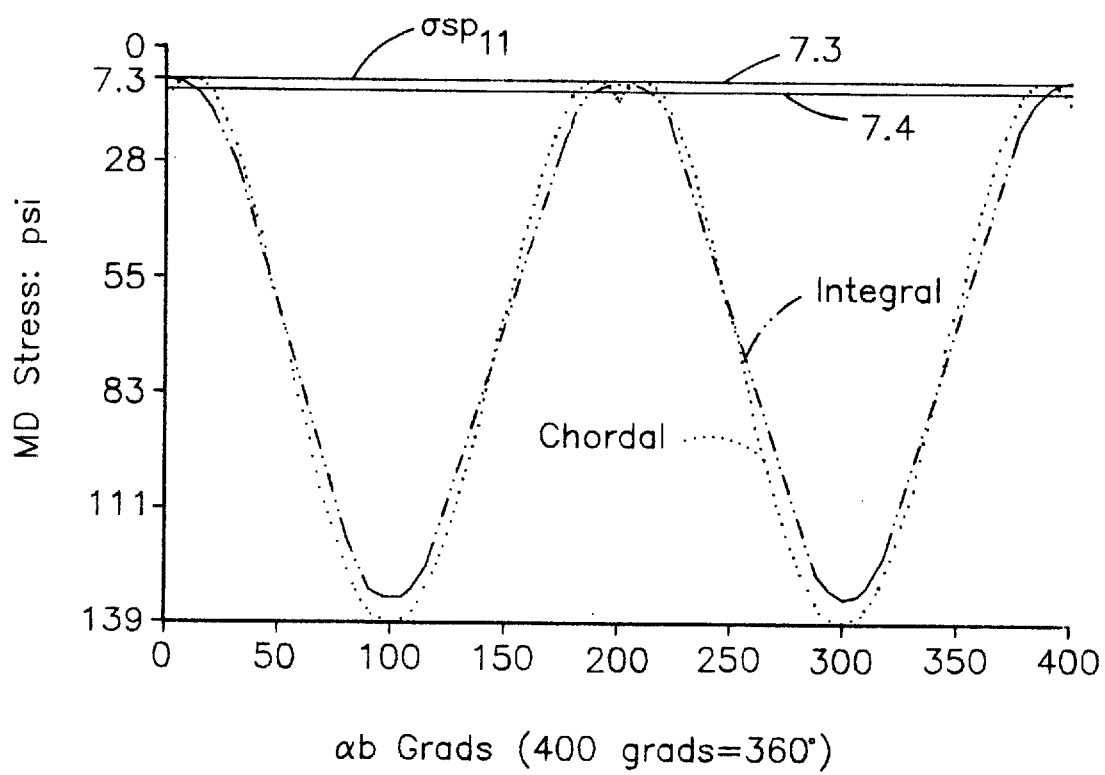
FIG. 78 is a graph illustrating machine direction stress for the A-Frame collapser of FIGS. 6, 7 and 8 after approximate equalization of streamline path lengths.

FIG. 78 illustrates the machine direction stresses for film being collapsed by the A-Frame collapser of FIGS. 6, 7 and 8, having a path defining device engaged. FIG. 78 also illustrates the pre-engagement stresses shown in FIG. 8. The machine direction stresses due to the internal bubble pressure, $\sigma sp_{11}$, is 7.3 psi. The total machine direction stresses range between 7.3 psi and 7.4 psi once the streamline path lengths have been approximately equalized. Although exact streamline path length equalization is desired, machining tolerances, positioning tolerances, etc. will prevent exact equalization. Machine direction stress variation ranges greater than 0.1 psi are acceptable, the determining criteria being the production of blown film with minimized or reduced quality defects as outlined above.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. For example, although the processing of the blown tube film has been illustrated in a vertical orientation, traveling upward, the invention may be utilized with blown tube films being processed in any orientation and traveling in any direction. The formulas may be multiplied by or added to other formulas or constants to achieve approximations in accordance with the equations presented herein and in accordance with my invention. It is intended that the scope of the invention be defined by the claims appended hereto.

What is claimed is:

1. An apparatus for minimizing shape change induced machine direction stress in a continuous blown tube film, said film moving in a predetermined direction between a first location and a second location, said first and second locations defining a tension isolated region of said film therebetween, said tension isolated region including an orientation region, said orientation region having a terminus, said tension isolated region including a shape change region intermediate said terminus and said second location, said apparatus comprising:

(a) a collapsing geometry defining a collapsing geometry boundary adapted to contact segmental portions of said film as said film travels in said shape change region, said collapsing geometry being configured to cause advancing differential elements of said film to follow respective streamlines, respective first segments of each said respective streamline being in contact with said collapsing geometry boundary; and (b) means for causing at least one respective second segment of each of a plurality of said streamlines to follow respective streamline paths such that the lengths of each said respective streamline path of said plurality of said streamlines between said terminus and said second location are approximately equal, each of said at least one respective second segments not being in contact with said collapsing geometry boundary.

2. A device for causing differential elements of a continuously moving blown tube film undergoing collapsing to follow respective streamline paths which are approximately equal in length, said film passing through a tube region and a collapsing region, said blown tube film having an interior and an exterior surface, said device comprising:

(a) a plurality of spaced apart internal film restricting surfaces disposed within said interior of said film, a respective gap being defined between adjacent internal film restricting surfaces;

(b) at least one external film restricting surface disposed external to said interior and aligned with said respective gap, said external film restricting surface being operable to engage said exterior surface of said film so as to cause a plurality of said differential elements to follow respective serpentine paths between said adjacent internal film restricting surfaces.

3. The device according to claim 2 wherein said external film restricting surface is moveable between a first position at which said external film restricting surface does not engage said film and a second position at which said external film restricting surface engages said film.

4. The device according to claim 2 wherein said internal film restricting surfaces are shaped complimentarily to said film.

5. The device of claim 2 wherein said internal film restricting surfaces are disposed within said tube region.

6. The device of claim 2 wherein said internal film restricting surfaces are disposed within said collapsing region.

7. The device of claim 6 wherein said film includes a sail section within said collapsing region, and wherein said internal film restricting surfaces are shaped complimentarily to said sail sections.

8. The device of claim 2 wherein said at least one of said at least one external restricting surface and at least one of said respective internal restricting surfaces cooperate to cause a plurality of said differential elements to follow respective serpentine paths whose lengths vary in dependence upon the circumferential positions of said respective streamlines.

9. A device for defining the streamline paths of a plurality of differential elements of a continuously moving blown film undergoing collapsing to a layflat configuration, said film passing through a tube region, a collapsing region, and a layflat region within a single tension isolated region, said device comprising:

(a) a plurality of spaced apart rolls disposed adjacent said film in said layflat region, a respective gap being defined between adjacent rolls, (b) at least one streamline path defining roll disposed on the opposite side of said film from said rolls aligned with said gap, said path defining roll being operable to engage said film and configured to cause a plurality of said differential elements of said film to follow respective serpentine paths between adjacent rolls, the respective lengths of said respective serpentine paths varying in dependence upon the circumferential position of said differential elements.

10. The device according to claim 9 wherein said at least one streamline path defining roll is moveable between a first position at which said path defining, roll does not engage said film and a second position at which said path defining roll engages said film.

11. The device according to claim 9 wherein at least a respective one of said at least one path defining roll comprises at least two rolls whose positions relative to each other may be varied.

12. The device according to claim 11, wherein said at least two rolls are disposed coaxially with each other.

13. The device according to claim 11, wherein said at least two rolls are adapted to be moved relative to each other in dependence upon the location of a respective edge of said blown film in said layflat region.

14. The device according to claim 13, further comprising at least one lay flat edge follower disposed adjacent said respective edge of said blown film, said lay flat edge follower configured to monitor the position of said respective edge of said blown film.

15. A device for defining the streamline paths of a plurality of differential elements of a continuous blown film moving in a predetermined direction between a first location and a second location, said first and second locations defining a tension isolated region of said film therebetween, said tension isolated region including an orientation region, said orientation region having a terminus, said tension isolated region including a shape change region intermediate said terminus and said second location, and a layflat region intermediate said shape change region and said second location, said device comprising:
(a) a plurality of spaced apart rolls disposed adjacent said film in said layflat region, a respective gap being defined between adjacent rolls,
(b) at least one streamline path defining roll disposed on the opposite side of said film from said rolls aligned with said gap, said path defining roll being operable to engage said film and configured to cause a plurality of said differential elements of said film to follow respective serpentine paths between adjacent rolls, the respective lengths of said respective serpentine paths varying in dependence upon the circumferential position of said differential elements.

16. The device of claim 15, wherein said predetermined direction is from said first location towards said second location.

17. The device according to claim 15 wherein said at least one streamline path defining roll is moveable between a first position at which said path defining roll does not engage said film and a second position at which said path defining roll engages said film.

18. The device according to claim 15 wherein at least a respective one of said at least one path defining roll comprises at least two rolls whose positions relative to each other may be varied.

19. The device according to claim 18, wherein said at least two rolls are disposed coaxially with each other.

20. The device according to claim 18, wherein said at least two rolls are adapted to be moved relative to each other in dependence upon the location of a respective edge of said blown film in said layflat region.

21. The device according to claim 20, further comprising at least one lay flat edge follower disposed adjacent said respective edge of said blown film, said lay flat edge follower configured to monitor the position of said respective edge of said blown film.

22. The apparatus of claim 1, wherein said predetermined direction is from said first location towards said second location.

23. An apparatus for processing continuous blown tube film, said film moving in a predetermined direction between a first location and a second location, said first and second locations defining a tension isolated region of said film therebetween, said tension isolated region including an orientation region, said orientation region having a terminus, said tension isolated region including a shape change region intermediate said terminus and said second location, said apparatus comprising:
(a) a collapsing geometry defining a collapsing geometry boundary adapted to contact respective segmental portions of said film as said film travels in said shape change region, said collapsing geometry being configured to cause advancing differential elements of said film to follow respective streamlines, respective first segments of each said respective streamline being in contact with said collapsing geometry boundary; and
(b) a plurality of members configured to contact said blown tube film and configured to cause at least one respective second segment of each of a plurality of said streamlines to follow respective streamline paths such that the lengths of each said respective streamline path of said plurality of said streamlines between said terminus and said second location are approximately equal, each of said at least one respective second segments not being in contact with said collapsing geometry boundary.

24. The apparatus of claim 23, wherein said predetermined direction is from said first location towards said second location.

25. An apparatus for processing continuous blown tube film, said film moving in a predetermined direction between a first location and a second location, said first and second locations defining a tension isolated region of said film therebetween, said tension isolated region including an orientation region, said orientation region having a terminus, said tension isolated region including a shape change region intermediate said terminus and said second location, said film including a plurality of differential elements which follow respective streamline paths, each of said differential elements having a respective associated reference path, each respective reference path having a length, the respective length of each respective reference path circumferentially varying, at least one of said respective reference paths being the longest, said apparatus comprising:
(a) a plurality of members configured to cause a plurality of said differential elements to follow respective streamline paths whose respective lengths between said terminus and said second location are different than the lengths of the respective associated reference paths between said terminus and said second location, said respective streamline paths being approximately equal in length to the length of the longest reference path between said terminus and said second location.

26. The apparatus of claim 25, wherein said predetermined direction is from said first location towards said second location.

* * * * *